(12) United States Patent
Horii et al.

(10) Patent No.: US 6,687,010 B1
(45) Date of Patent: Feb. 3, 2004

(54) RAPID DEPTH SCANNING OPTICAL IMAGING DEVICE

(75) Inventors: Akihiro Horii, Hachioji (JP); Mamoru Kaneko, Hanno (JP); Tadashi Hirata, Hachioji (JP); Hitoshi Mizuno, Koganei (JP)

(73) Assignee: Olympus Corporation (JP)

( * ) Notice: Subject to any disclaimer, the term of this patent is extended or adjusted under 35 U.S.C. 154(b) by 365 days.

(21) Appl. No.: 09/656,799

(22) Filed: Sep. 7, 2000

(30) Foreign Application Priority Data

Sep. 9, 1999 (JP) .......................... 11-256294
Mar. 21, 2000 (JP) ...................... 2000-078743

(51) Int. Cl.⁷ ................................. G01B 9/02
(52) U.S. Cl. ..................................... 356/479
(58) Field of Search ................... 356/479, 497

(56) References Cited

U.S. PATENT DOCUMENTS

| | | | |
|---|---|---|---|
| 4,865,029 A | * 9/1989 | Pankratov et al. | 606/4 |
| 5,323,767 A | * 6/1994 | Lafferty et al. | 600/109 |
| 5,383,467 A | * 1/1995 | Auer et al. | 600/342 |
| 6,069,698 A | * 5/2000 | Ozawa et al. | 356/511 |
| 6,310,687 B1 | * 10/2001 | Stumbo et al. | 356/317 |
| 6,335,522 B1 | * 1/2002 | Shimada et al. | 250/201.3 |
| 6,464,693 B1 | * 10/2002 | Andrews et al. | 606/15 |

FOREIGN PATENT DOCUMENTS

WO 98/52021 11/1998

* cited by examiner

Primary Examiner—Robert H. Kim
Assistant Examiner—Richard H. Kim
(74) Attorney, Agent, or Firm—Ostrolenk, Faber, Gerb & Soffen, LLP

(57) ABSTRACT

An optical imaging device includes a reference scanning unit offering a high signal-to-noise ratio and capable of scanning an object rapidly. An interference optical system can be realized inexpensively. In the optical imaging device, low coherent light passed through an optical coupler and another optical coupler, irradiated from an optical scanner probe, reflected from an observed point in a living tissue, returned to the optical coupler, propagated over a fourth SM optical fiber, and routed to another optical coupler shall be referred to as sample light. Light passed through an optical length variation optical system via the optical coupler and routed to the optical coupler shall be referred to as reference light. At this time, a difference between a delay time undergone by the sample light and a delay time undergone by the reference light is proportional to a difference between an optical length for the sample light and an optical length for the reference light. When the optical length difference falls within a coherence length, the sample light and reference light interfere with each other. An interfering signal is acquired into a computer through detectors, a differential amplifier, a demodulator, and an A/D converter.

7 Claims, 39 Drawing Sheets

FIG.19A FIG.19B
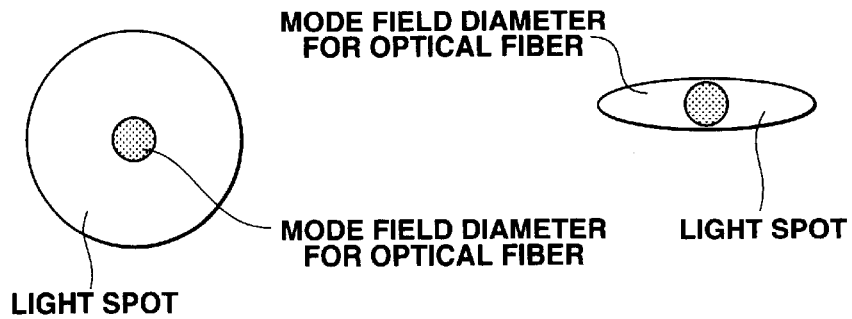
FIG.20
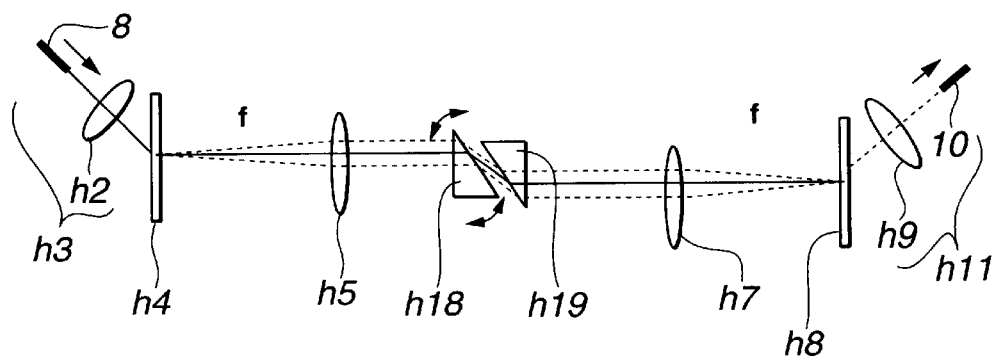
FIG.21
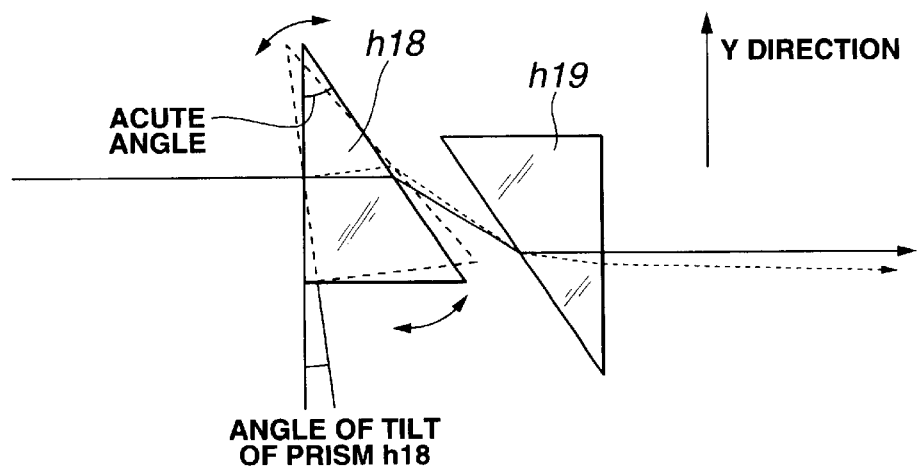

$\Delta\theta = \sin^{-1}(2\Delta nL/D)$ $\Delta n$ : DIFFERENCE IN REFRACTIVE INDEX BETWEEN PRISMS

FROM CONTROL UNIT 35

RAPID DEPTH SCANNING OPTICAL IMAGING DEVICE

This application claims benefit of Japanese Application No. Hei 11-256294 filed in Japan on Sep. 9, 1999, and Japanese Application No. 2000-78743 filed in Japan on Mar. 21, 2000, and Japanese Application No. 2000-154417 filed in Japan on May 22, 2000, the contents of which are incorporated by this reference.

BACKGROUND OF THE INVENTION

1. Field of the Invention

The present invention relates to an optical imaging device for irradiating low coherent light to an object, and constructing tomographic images of the object using information-bearing light scattered from the object.

2. Description of the Related Art

In recent years, optical coherent tomography (OCT) for constructing tomographic images of a tissue using low coherent light has been proposed in, for example, U.S. Patent Publication No. 5459570 and Patent Publication No. WO98/52021 as a modality for optically detecting and visualizing information of a living tissue to assess a lesion in the living tissue.

According to the U.S. Patent Publication No. 5459570, a reference mirror is advanced or withdrawn in order to detect light scattered or reflected from a specific depth in a living tissue. For constructing tomographic images of the living tissue, a light beam is irradiated to the living tissue for the purpose of scanning. Synchronously with the scanning, the reference mirror is advanced or withdrawn.

On the other hand, the patent publication No. WO98/52021 has proposed an optical coherent tomography (OCT) system capable of being driven with a voltage having several tens of kilohertz. According to a method described in the patent publication, a diffraction grating is used to disperse the spectrum of light for the purpose of detecting light scattered or reflected from a specific depth in a a living tissue. A galvanometer mirror or an acoustooptic modulator (AOM) may be used to irradiate light for the purpose of scanning, whereby the phase of reference light and the group velocity thereof are changed.

However, the U.S. Patent Publication No. 5459570 has revealed that since the reference mirror is relatively heavy, the frequency of a voltage to be applied to drive the reference mirror so as to advance or withdraw it by about 5 mm is limited to several tens of hertz. A continuous motion picture cannot therefore be produced. This discourages diagnosis of a living tissue in that image quality is poor due to blurring deriving from motions including heartbeats.

A Michelson interferometer may be employed. In this case, an optical coupler works most efficiently while offering a branching ratio of 1:1. Assuming that the power of a light source is P and the reflectance of light from an object is R, light returning to a detector is expressed as P×R/4. Assuming that the reflectance for a mirror is 1, the amount of light returning to the detector over a reference light path is expressed as P/4. The amount of light finally returning to the detector is expressed as (P×R/4+P/4). However, signal light that must be detected is detected through heterodyning and therefore expressed as $\sqrt{(P \times R/4 \times P/4)} = P\sqrt{(R/4)}$. The reflectance R observed in a living body is approximately $10^{-4}$ or less in general. The signal light is therefore very small for the amount of light returning to the detector. It is therefore hard to improve a signal-to-noise ratio. Moreover, 75% of feeble light reflected from a living body is abandoned. This also degrades the signal-to-noise ratio.

U.S. Patent Publication No. 3565335 has disclosed as a method for improving the signal-to-noise ratio using the Michelson interferometer. According to the disclosed method, light that returns to the detector is attenuated to the same extent as signal light by disposing an attenuator on the reference light path, and thus the amount of light returning to the detector is adjusted. However, this method has a drawback that light detected through heterodyning is also attenuated. The U.S. Patent Publication No. 3565335 has disclosed adoption of a Mach-Zehnder interferometer as a method superior in principles to the method of adopting the Michelson interferometer. However, the Mach-Zehnder interferometer is structured to move a corner mirror serving as an optical length varying means. In this case, it is hard to rapidly scan an object in a direction of its depth and observe the object in real time.

Furthermore, in the Michelson interferometer, up to a quarter of source light returns to the light source over the reference light path. The return light causes destruction of a low coherent light source realized with a superluminescence diode (SLD) or the like. The Michelson interferometer has a drawback that an expensive isolator or the like is usually needed to treat light of wavelengths falling outside a wavelength band assigned to optical communication (1.3 or 1.55 μm).

Furthermore, since the Michelson interferometer employs optical fibers, a polarization controller or the like must be used to match polarization of object light, that is, light to be irradiated to an object with polarization of reference light, that is, light used as a reference. This is mandatory to produce coherent light of a maximum power. However, assume that a reflection type rapid light delay line like the one described in "In Vivo Video Rate Optical Coherence Tomography" written by A. M. Rollins et. al (Optics Express, Vol. 3, No. 6, P219, 1998) is used in combination with a device having the property of causing polarization such as a diffraction grating. In this case, an incidence optical fiber and an emission optical fiber are identical to each other. Even when the reference light path, object light path, and polarization controllers lying on the reference light path and object light path respectively are adjusted, polarization of the reference light is not always matched with that of the object light with the use efficiency of the reference light held high. There is a possibility that only coherent light of a low power can be produced.

Furthermore, when the reflection type rapid delay line is adopted, light reflected from an end of an optical fiber or the surface of an optical device other than a movable mirror serves as return light. Noise light other than signal light required may therefore be generated. This also deteriorates the signal-to-noise ratio.

Moreover, when a reference arm is employed, a mirror is displaced rapidly relative to light in order to change the phase and group velocity of light. At this time, a phase change causes a Doppler shift. Therefore, when signal light received by a photodetector is detected through heterodyning, an interfering signal can be detected highly sensitively.

However, for rapidly displacing a galvanometer mirror or the like, it is necessary to drive the galvanometer mirror with a voltage proportional to the sine of an angle of displacement. In this case, the Doppler shift occurs at a rate proportional to the cosine of the angle of displacement that is regarded as the derivative of the Doppler shift to the angle of displacement. Moreover, a heterodyne frequency to be detected varies. Consequently, the signal-to-noise ratio is degraded. Otherwise, since light undergoing little Doppler shift is detected, the efficiency in detection is deteriorated.

SUMMARY OF THE INVENTION

An object of the present invention is to provide an optical imaging device having a rapid reference scanning means that offers a high signal-to-noise ration and enables realization of an inexpensive interferometer.

An optical imaging device in accordance with the present invention consists mainly of a light source, a light irradiating/receiving unit, a first light path member, a second light path member, a first optical branching unit, a second optical branching unit, a second light path member, a third light path member, a coupling unit, a detection unit, an optical length variation unit, and an image production unit.

The light source supplies low coherent light so that the low coherent light will be irradiated to an object and light reflected or scattered from the object will be used to construct tomographic images of the object.

The light irradiating/receiving unit irradiates the low coherent light supplied from the light source to the object, receives the light reflected or scattered from the object, and includes a first optical scanner block capable of scanning the object at least one-dimensionally in a direction of light reception or irradiation.

Over the first light path member, the low coherent light is routed to the object and the light reflected or scattered from the object is routed to the light irradiating/receiving unit.

Over the second optical path member, the low coherent light is routed.

The first optical branching unit is interposed between the light source and first optical scanner block, and branches the low coherent light supplied from the light source into the first optical scanner block and second light path member.

The second optical branching unit is incorporated in the first optical scanner block, and branches out the light reflected or scattered from the object from the first optical scanner block.

Over the third light path member, the reflected or scattered light branched out by the second optical branching unit is routed.

The coupling unit couples the low coherent light traveling over the second light path member with the reflected or scattered light traveling over the third light path member so that the low coherent light and reflected or scattered light will interfere with each other.

The detection unit detects the interference caused by the coupler to produce an interfering signal.

The optical length variation unit is coupled to one of the second and third light path members. The optical length variation unit varies at least one of a phase delay and a group delay of light by utilizing an incidence light path and an emission light path, which are mutually independent, and a light-transmissive optical element interposed between the incidence light path and emission light path. Thus, the optical length variation unit enables scanning of a point of interference in the optical-axis direction.

The image production unit processes the interfering signal detected by the detection unit to produce a tomographic image of the object.

The other features of the present invention and advantages thereof will be fully apparent from the description below.

BRIEF DESCRIPTION OF THE DRAWINGS

FIG. 1 to FIG. 9 are concerned with the first embodiment;

FIG. 1 shows the configuration of an optical imaging device;

FIG. 2 shows the components of an optical scanner probe and a rotational drive unit;

FIG. 3 schematically shows the components of an optical length variation optical system;

FIG. 5 is a graph expressing an example of a group delay length observed when a center wavelength ray of light passes through the wedged prism and an example of a beat frequency of an interfering signal as functions of time;

FIG. 6 shows the first example of the wedged prism;

FIG. 7 shows the second example of the wedged prism;

FIG. 8 is an explanatory diagram concerning a means for rotating the wedged prism;

FIG. 9 is an explanatory diagram concerning a variant of the means for rotating the wedged prism;

FIG. 10 to FIG. 14 are concerned with the second embodiment;

FIG. 10 schematically shows optical elements located behind a second diffraction grating in an optical length variation optical system;

FIG. 11 is an explanatory diagram showing a state in which light emitted from the second diffraction grating makes an elliptic motion along with the rotation of a wedged prism;

FIG. 13 is a graph indicating the diameter of light, which makes an elliptic motion and has passed through two cone lenses, in a direction parallel to the yz plane and the diameter thereof in a direction parallel to the x axis with respect to the distance between the two cone lenses;

FIG. 14 is an explanatory diagram showing a variant of a cone lens;

FIG. 15 schematically shows the components of an optical length variation optical system;

FIG. 16 is an explanatory diagram showing a major portion of the optical length variation optical system;

FIG. 17 is an explanatory diagram showing the state of light emitted from a second diffraction grating when an angle φ between two glasses has changed;

FIGS. 18A to FIG. 19B are concerned with the fourth embodiment;

FIG. 18A shows optical elements located behind a second diffraction grating in an optical length variation optical system and seen from the second axis.

FIG. 19A is a first explanatory diagram showing the shape of a light spot at an end of an optical fiber included in a light pickup block, and a mode field diameter for the optical fiber, and FIG. 19B is a second explanatory diagram showing the shape of the light spot at the end of the optical fiber included in the light pickup block, and the mode field diameter for the optical fiber;

FIGS. 20 to FIG. 23 are concerned with the fifth embodiment;

FIG. 20 schematically shows the components of an optical length variation optical system;

FIG. 21 is an explanatory diagram concerning a major portion of the optical length variation optical system;

FIG. 22 is a graph indicating a phase angle of light at an incident point on a front prism in relation to an angle of tilt by which the front prism is tilted relative to a first diffraction grating;

FIG. 23 schematically shows the components of a variant of the optical length variation optical system;

FIG. 24 shows an optical tomography structure observation system including an optical length variation optical system in accordance with the sixth embodiment;

FIG. 25 schematically shows the components of the optical length variation optical system in accordance with the sixth embodiment;

FIG. 26 is an explanatory diagram showing the disposition of a wedged prism included in the optical length variation optical system in accordance with the sixth embodiment;

FIG. 27 to FIG. 34 are concerned with the seventh embodiment;

FIG. 27 shows the components of an optical length variation optical system;

FIG. 28 shows the structure of an optical scanning means;

FIG. 29 is the first explanatory diagram concerning actions to be performed in the optical length variation optical system;

FIG. 31 shows the structure of the first variant of the optical scanning means;

FIG. 33 shows the optical elements of the first variant of the optical length variation optical system;

FIG. 34 shows the structure of an optical block;

FIG. 35A to FIG. 37 are concerned with the eighth embodiment;

FIG. 35A is the first diagram showing the components of an optical length variation optical system.

FIG. 36 shows the structure of a rotary disk;

FIG. 37 shows the structure of a variant of the rotary disk;

FIG. 38 shows the components of an optical length variation optical system;

FIG. 39 is an explanatory diagram concerning a rotary disk;

FIG. 40 is an explanatory diagram concerning the first variant of the rotary disk;

FIG. 41 is an explanatory diagram concerning the second variant of the rotary disk;

FIG. 42 shows the components of an optical length variation optical system;

FIG. 43 shows the components of a variant of the optical length variation optical system;

FIG. 44 shows in detail the components of a variant of the optical length variation optical system;

FIG. 46 shows in detail the components of an optical coupler, an optical scanner probe, a scanning means, and a scanning drive unit;

FIG. 47 shows the contacts of a connector (to be joined to the probe);

FIG. 48 is an explanatory diagram concerning a method of treating or marking a target, which is visualized by OCT, using a laser diode (LD) for treatment or marking;

FIG. 49 is a flowchart describing the method of treating or marking a target, which is visualized by OCT, using the laser diode (LD) for treatment or marking;

FIG. 50 graphically shows the strength of a signal fed to a computer by an A/D converter after an interfering signal acquired by scanning an object in the direction of its depth with a light propagation time changed using an optical length variation optical system is demodulated by a demodulator;

FIG. 51 graphically presents a method of effectively compensating the signal strength shown in FIG. 50 especially in a living body;

FIG. 53 shows the structures of the optical scanner probe and scanning means;

FIG. 54 shows the structure of a variant of the scanning means;

FIG. 55 shows a gradient index lens seen in the optical-axis direction;

FIG. 56 shows the structures of an optical scanner probe and a scanning means;

FIG. 57 is a sectional view showing an A—A cutting plane of the structure shown in FIG. 56;

FIG. 58 shows the structure of a major portion of an optical imaging device;

FIG. 59 is an explanatory diagram concerning the first variant of an optical scanner probe;

FIG. 60 is an explanatory diagram concerning the second variant of the optical scanner probe;

FIG. 61 is an explanatory diagram concerning the third variant of the optical scanner probe;

FIG. 62 is a sectional view showing a cutting plane containing a stationary mirror and extending along the optical axis;

FIG. 63 shows the configuration of an optical imaging device;

FIG. 64 shows the structure of an optical system located in the distal part of an optical scanner probe included in the optical imaging device;

FIG. 65 shows the structure of a variant of the optical system located in the distal part of the optical scanner probe included in the optical imaging device;

FIG. 66 shows an arrangement for multiplexing two low coherent light beams to produce light of a wider spectrum;

FIG. 67 shows an arrangement for multiplexing two low coherent light beams to finally produce light whose spectrum displays the normal distribution;

FIG. 68 is an explanatory diagram concerning an example of realizing multiplexing of light beams highly efficiently;

FIG. 69 shows a component of an optical system included in the distal part of an optical scanner probe;

FIG. 70 shows a component of the first variant of the optical system included in the distal part of the optical scanner probe;

FIG. 71 shows a component of the second variant of the optical system included in the distal part of the optical scanner probe;

FIG. 72 shows the components of a major portion of an optical system included in an optical imaging device;

FIG. 73 shows the first variant of the optical system;

FIG. 74 shows the second variant of the optical system;

FIG. 75 shows the configuration of an optical imaging device having an optical scanner probe, an optical scanning means, and a light propagation time changing means for a reference light path incorporated in the distal part of an endoscope;

FIG. 76 shows the structure of a disk; and

FIG. 77 is an explanatory diagram concerning a two-dimensional dimensional image whose two dimensions are associated with a lateral direction determined with the disk and a depth direction.

DESCRIPTION OF THE PREFERRED EMBODIMENTS

First Embodiment (Constituent Features)

Figure 1:
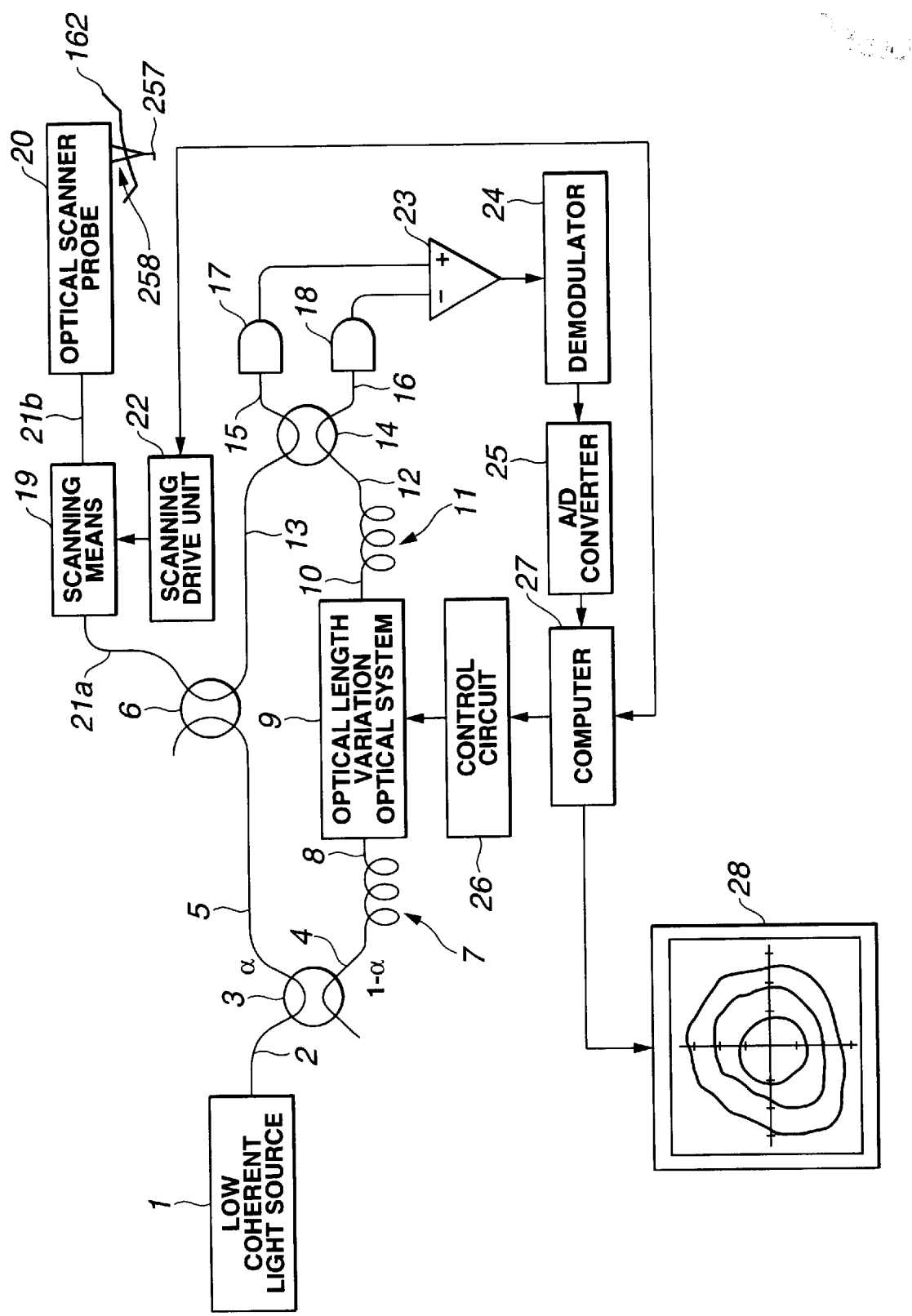

An optical imaging device shown in FIG. 1 has a low coherent light source 1 such as a super-luminescent diode (SLD). Light emanating from the low coherent light source 1 and having a wavelength of, for example, 1300 nm, requires a coherence length of, for example, about 15 $\mu$m, and exhibits low coherence that is of the level of producing interference within only a narrow range on an object. For example, assuming that the light is bifurcated into two light beams and then reunited, only when a difference between the optical lengths for the two beams from the point of bifurcation to the point of reunion is about 15 $\mu$m, the beams interfere with each other.

The light emanating from the low coherent light source 1 is routed to a first single-mode (hereinafter SM) optical fiber 2, and branched into a second SM optical fiber 4 and a third SM optical fiber 5 by an optical coupler 3. The optical coupler 3 branches the light on the first SM optical fiber 2 into the second SM optical fiber 4 and third SM optical fiber 5 at a branching ratio of (1−α): α. The light routed to the third SM optical fiber 5 has substantially a half thereof routed to a fifth SM optical fiber 21a by an optical coupler 6, passes through a scanning means 19, and impinges on the other end of a fifth SM optical fiber 21b. The light routed to the fifth SM optical fiber 21b is propagated to an optical scanner probe 20, and irradiated to a living tissue 162 through the tip of the optical scanner probe 20. Part of light reflected from the living tissue 162 returns to the optical scanner probe 20. The return light is propagated over the fifth SM optical fiber 21b and 21a, branched by the optical coupler 6, and routed to the fourth SM optical fiber 13.

On the other hand, the light routed to the second SM optical fiber 4 passes through a polarization controller 7, and is routed to an optical length variation optical system 9 over an incidence SM optical fiber 8. An optical delay time by which the optical length variation optical system 9 delays the passage of light from the incidence SM optical fiber 8 to an emission SM optical fiber 10 is controlled by a control circuit 26. The light routed to the emission SM optical fiber 10 via the optical length variation optical system 9 is routed to a sixth SM optical fiber 12 via a polarization controller 11. The light beams routed to the fourth SM optical fiber 13 and sixth SM optical fiber 12 are branched substantially evenly into an SM optical fiber 15 and an SM optical fiber 16 by an optical coupler 14. The resultant beams are fed to a detector 17 and a detector 18 respectively that are realized with photodiodes or the like, whereby the intensities of the beams are detected. Light signals output from the detectors 17 and 18 are amplified by a differential amplifier 23. The differential amplifier 23 calculates a difference between the outputs of the detectors 17 and 18, and amplifies the difference. Therefore, an interfering signal is amplified to have double strength, and the other in-phase optical noises are canceled out. An output of the differential amplifier 23 is demodulated by a demodulator 24, digitized by an A/D converter 25, and fed to a computer 27.

The scanning means 19 can scan a point of emission or incidence 258 on a living body to which the optical scanner probe irradiates light, when being driven by a scanning drive unit 22.

Figure 2:
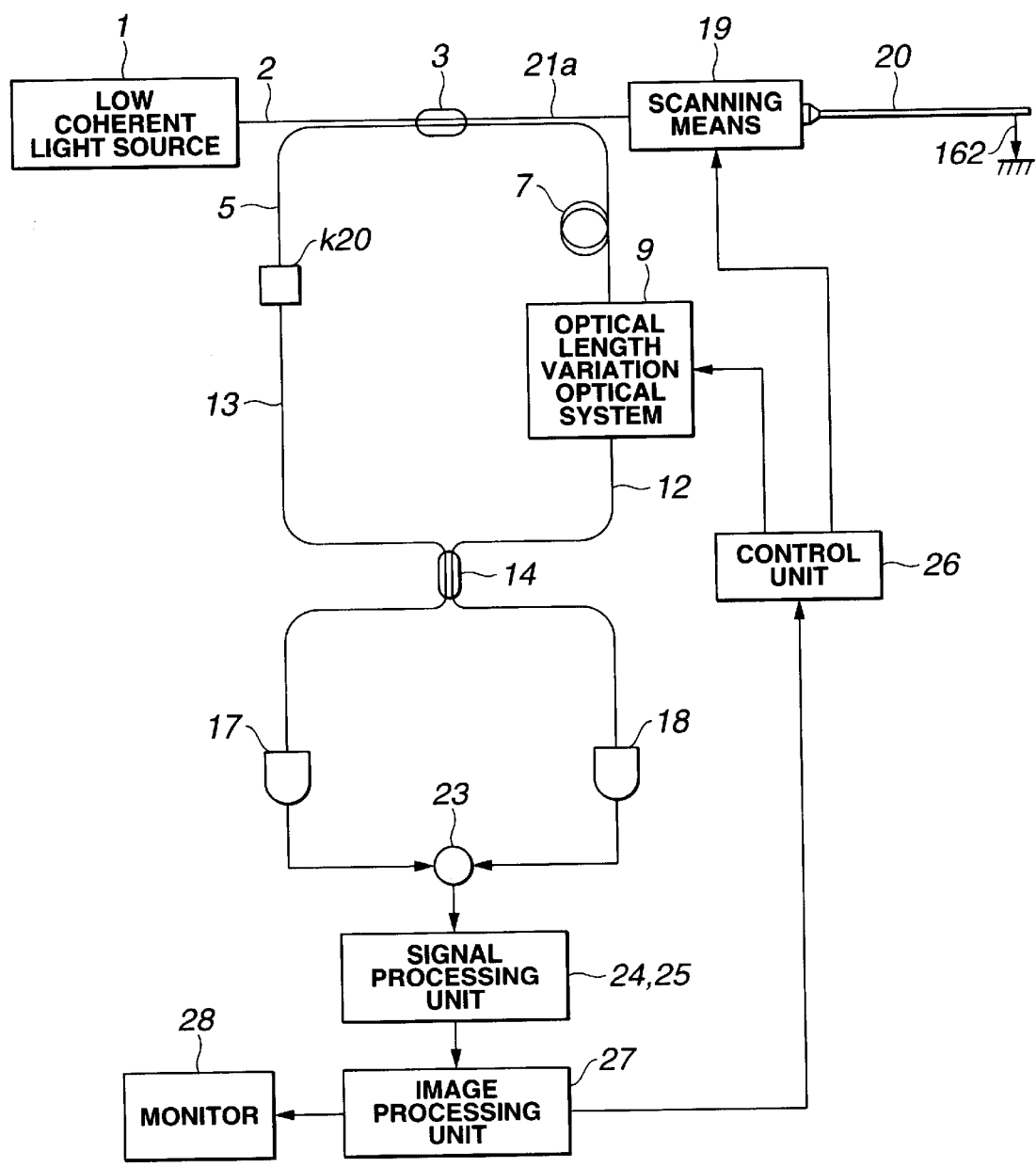

FIG. 2 shows a variant of the optical imaging device shown in FIG. 1. The same reference numerals are assigned to the components identical to those shown in FIG. 1. Only components different from those shown in FIG. 1 will be described below.

Light emanating from the low coherent light source 1 is routed to the first SM optical fiber 2, and branched into the second SM optical fiber 4 and fifth SM optical fiber 21a by the optical coupler 3. Light routed to the fifth SM optical fiber 21a is propagated to the optical scanner probe 20 via the scanning means 19. Part of light reflected from a living tissue returns to the optical scanner probe 20, and passes through the scanning means 19 over the fifth SM optical fiber 21a. The light is then branched by the optical coupler 3 and routed to the third SM optical fiber 5.

The light routed to the third SM optical fiber 5 is routed to the fourth SM optical fiber via a phase modulating means k20. Moreover, light routed to the second SM optical fiber 4 passes through the polarization controller 7, is routed to the optical length variation optical system 9 over the incidence SM optical fiber 8, and then routed to the sixth SM optical fiber 12. The light beams routed to the fourth SM optical fiber 13 and sixth SM optical fiber 12 are substantially evenly branched into the SM optical fiber 15 and SM optical fiber 16, and fed to the detectors 17 and 18 respectively. A signal processing unit including the demodulator 24 and A/D converter 25 processes an interfering signal. The subsequent components are identical to those shown in FIG. 1. The configuration shown in FIG. 2 requires only one optical coupler, and enables manufacturing of an inexpensive optical imaging device.

Prior to a description of embodiments of the present invention, the principles of the optical length variation optical system will be described below.

The present invention has applied Fourier transform described below to an optical system.

Assume that a light signal given as a function x(t) that is a function of time is Fourier-transformed to be defined as $X(\omega)$ in an angular frequency domain $\omega$.

$$x(t) \Leftrightarrow X(\omega)$$

Assuming that the angular frequency components of the resultant signal expressed as $X(\omega)$ are phase-modulated linearly by a gradient Tg, the phase modulation is expressed as follows:

$$X(\omega) \cdot \exp(-i\omega Tg)$$

where i denotes an imaginary unit.

When the modulated signal is inverse Fourier-transformed, it is defined in a time domain as follows:

$$x(t-Tg)$$

This signifies that when a time-varying signal is Fourier-transformed, if the angular frequency components of the signal are phase-modulated linearly by a gradient –Tg, the modulated signal lags by Tg in real time.

The present invention adopts the principles described below. Namely, light incident on the optical length variation optical system is dispersed into angular frequency components. Thereafter, the angular frequency components are phase-modulated linearly by the gradient Tg. At this time, a time delay of a light signal emitted from the optical length variation optical system (referred to as a group delay) is varied by changing the gradient Tg time-sequentially.

A value cTg (where c denotes a light velocity in a vacuum) indicating a length comparable to the group delay Tg is referred to as a group delay length Lg. When the group delay length Lg changes with the passage of time, it signifies that an optical coherence tomography (OCT) system is scanning a point of interference on a sample.

Figure 3:
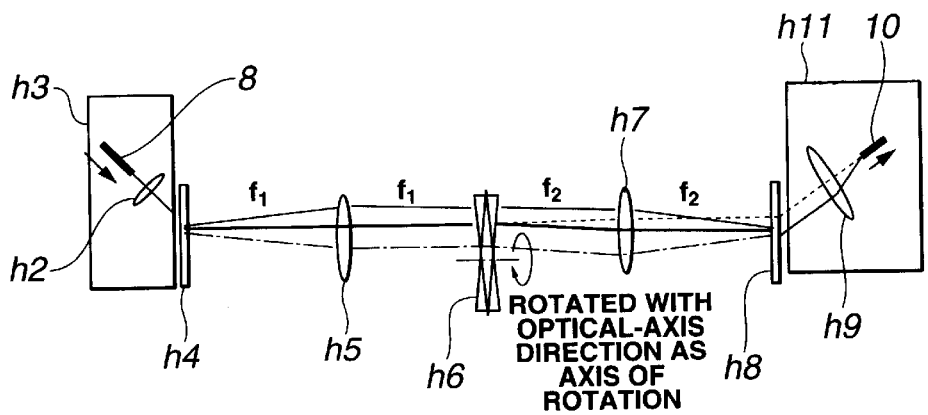

The optical length variation optical system 9 employed in an optical imaging device of the present embodiment that is realized as an optical tomography structure observation device consists mainly of, as shown in FIG. 3, a light introduction block h3, a pair of a first diffraction grating h4 and first positive lens h5, a wedged prism h6, a pair of a second positive lens h7 and a second diffraction grating h8, and a light pickup block h11. The light introduction block h3 is composed of the incidence SM optical fiber 8 and a third positive lens h2 offering a positive power. The first diffraction grating h4 serves as a spectrum dispersion element for spatially dispersing the spectrum of light. The first positive lens h5 offers a positive power. The wedged prism h6 serves as a phase modulation element for substantially linearly changing the phases of the angular frequency components of light dispersed by the spectrum dispersion element. The second positive lens h7 serves as a spectrum reuniting element for reuniting the phase-modulated angular frequency components of the spatially dispersed light into single light, and offers a positive power. The fourth positive lens h9 offers a positive power. These optical elements are optically interconnected.

The wedged prism h6 is made of a glass that is a light-transmissive material.

According to the present embodiment, the first positive lens h5 and second positive lens h7 are realized with lenses providing the same focal length. The first positive lens h5 and second positive lens h7 are arranged so that the optical axes thereof will be aligned with each other. The first diffraction grating h4 is located substantially at the position of the front focus of the first positive lens h3. The wedged prism h6 is located substantially at the position of the rear focus of the first positive lens h5 and the front focus of the second positive lens h7. The second diffraction grating h8 is located substantially at the position of the rear focus of the second positive lens h7.

The wedged prism h6 is disposed to be able to rotate with a direction substantially parallel to the direction of propagation of light as an axis of rotation. The axis of rotation of the wedged prism h6 is deviated from a point on which a ray of light introduced from the light introduction block h3 and having the same wavelength as the center wavelength of the light impinges.

Now, a coordinate system will be defined for the optical length variation optical system 9 in accordance with the present embodiment as described below. Namely, the axis of rotation of the wedged prism h6 shall be regarded as the z axis of the coordinate system. A direction in which the slits of the diffraction gratings h4 and h8 extend shall be regarded as the x axis thereof. A direction perpendicular to the x and z axes shall be regarded as the y axis thereof. At this time, the optical axes of the first positive lens h5 and second positive lens h7 shall be set parallel to the z axis.

The orientation of the wedged prism h6 will be determined so that when the wedged prism h6 is rotated, the absolute values of the lengths of vectors P1 and P2 will not change. At this time, the vectors P1 and P2 are provided as the orthogonal projections of a unit vector N1 normal to the face of the wedged prism h6 and a unit vector N2 normal to the back thereof to the xy plane.

The normal unit vectors N1 and N2 shall have directions thereof determined so that the directions will meet the direction of propagation of light at acute angles with an intersection between the z axis and the face or back of the wedged prism h6 as an origin.

Figure 4A:
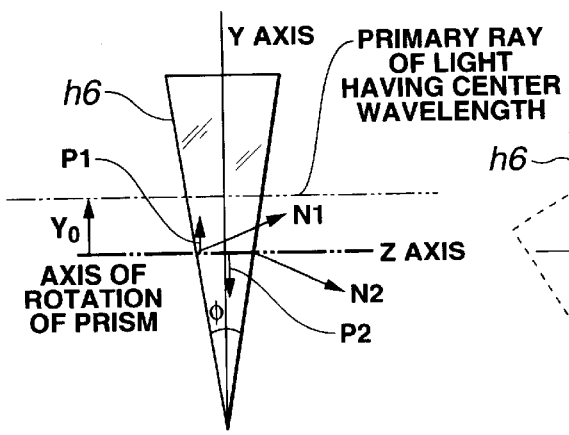
FIG. 4A is a first explanatory diagram showing the disposition and movement of a wedged prism included in the optical length variation optical system.
Figure 4B:
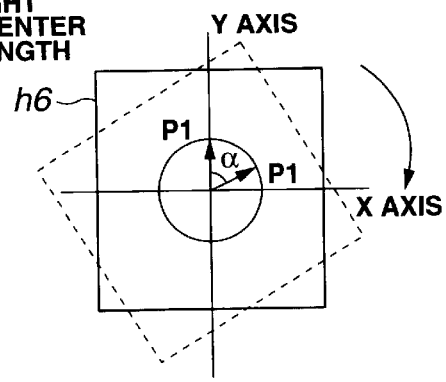
FIG. 4B is a second explanatory diagram showing the disposition and movement of the wedged prism included in the optical length variation optical system.

Specifically, the disposition and movement of the wedged prism h6 is determined as shown in FIG. 4A to FIG. 4B. A solid line in FIG. 4B indicates a state of the wedged prism h6 seen along the z axis at a certain time instant. FIG. 4A shows a state of the wedged prism h6 seen along the x axis at the same time instant as the time instant at which the state shown in FIG. 4B is attained.

Figure 4C:
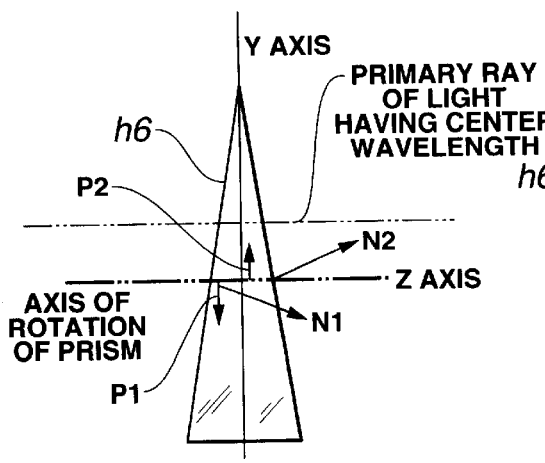
FIG. 4C is a third explanatory diagram showing the disposition and movement of the wedged prism included in the optical length variation optical system.
Figure 4D:
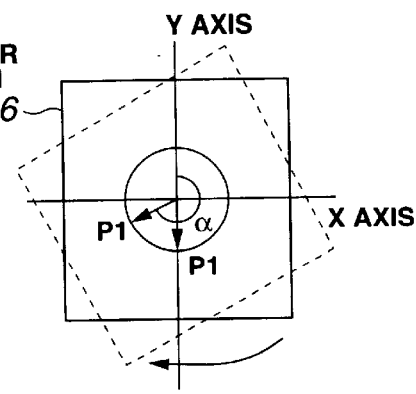
FIG. 4D is a fourth explanatory diagram showing the disposition and movement of the wedged prism included in the optical length variation optical system.

When a little time elapses with the state shown in FIG. 4A maintained, the wedged prism h6 rotates to enter a state indicated with a dashed line in FIG. 4B when seen along the z axis. When a more time elapses, the wedged prism h6 further rotates to enter a state indicated with a solid line in FIG. 4D when seen along the z axis or a state shown in FIG. 4C when seen along the x axis. When a more time elapses, the wedged prism h6 enters a state indicated with a dashed line in FIG. 4D. When a still more time elapses, the wedged prism h6 returns to the state indicated with the solid line in FIG. 4A or FIG. 4B. This movement is repeated.

Operations to be exerted by the optical length variation optical system 9 employed in the present embodiment and having the foregoing components will be described below.

When the wedged prism h6 is rotated, the gradient by which the angular frequency components of light are phase-modulated by the wedged prism h6 changes. Accordingly, the group delay varies time-sequentially. Consequently, a point of interference on a sample that is an object can be varied with the passage of time. Thus, the structure of the object can be observed through tomography.

When the wedged prism h6 is rotated, the phase of a center frequency component of incident light fed from the light introduction block h3 changes time-sequentially. The center frequency of light fed from the light pickup block h11 is therefore different from the center frequency of light introduced by the light introduction block h3. Therefore, when sample light and reference light interfere with each other, a beat occurs. This enables optical heterodyne detection.

Now, phase modulation performed by the wedged prism h6, varying of a group delay performed thereby, and a center frequency shift will be described below.

According to the present embodiment, the first diffraction grating h4 and wedged prism h6 are located at the positions of the front focus and rear focus of the first positive lens h5. Information-bearing light passing through the first diffraction grating h4 is Fourier-transformed on the surface of the wedged prism h6.

Moreover, the wedged prism h6 and second diffraction grating h8 are located at the positions of the front focus and rear focus of the second positive lens h7. Therefore, when light is Fourier-transformed on the surface of the wedged prism h6, light is inverse Fourier-transformed on the surface of the second diffraction grating h8.

The first diffraction grating h4 disperses light having a spectrum. The wedged prism h6 distributes the angular frequency components of the light incident on the first diffraction grating h4 along the y axis.

Light of a wavelength k falling on the first diffraction grating h4, of which slits are arranged at a spatial frequency N (an inverse number of the number of slits constituting the grating), at an angle $\theta i$ is diffracted at an angle $\theta$ expressed as follows:

$$\sin \theta - \sin \theta i = mN\lambda$$

where m denotes an integer and, herein, equals 1.

Assuming that the center wavelength of light introduced from the light introduction block h3 is $\lambda o$, an angle $\Delta\theta$ between light of a wavelength $\lambda o$ emitted from the first diffraction grating h1 and light of a wavelength $\lambda=\lambda o+\Delta\lambda$ is expressed as the formula (1) presented below.

$$\Delta\theta = N\Delta\lambda/\cos\theta \quad (1)$$

A distance between the first diffraction grating h4 and the first positive lens h5 and a distance between the first positive lens h5 and the wedged prism h6 are equal to the focal length f1 for the first positive lens h5. From this viewpoint, a difference $\Delta Y (\Delta\lambda)$ between the point on the wedged prism h6 of the light of the wavelength $\lambda o$ and the point thereon of the light of the wavelength $\lambda=\lambda o+\Delta\lambda$ is expressed as the formula (1.1) presented below.

$$\Delta Y(\Delta\lambda) = f1 \cdot \Delta\theta \quad (1.1)$$

When the formula (1) is assigned as $\Delta\theta$ to the formula (1.1), the formula (2) presented below is drawn out.

$$\Delta Y(\Delta\lambda) = f1 \cdot N \cdot \Delta\lambda/\cos\theta \quad (2)$$

Light of the wavelength $\lambda=\lambda o$ passes through a point on the wedged prism h6 off the axis of rotation of the wedged prism h6. Assuming that the point through which the light of the wavelength $\lambda=\lambda o$ passes is Yo, a point $Y(\Delta\lambda)$ on the wedged prism h6 through which the light of the wavelength $\lambda=\lambda o+\Delta\lambda$ passes is expressed as the following formula (3):

$$Y(\Delta\lambda) = Yo + \Delta Y(\Delta\lambda) = Yo + f \cdot N \cdot \Delta\lambda/\cos\theta \quad (3)$$

where f denotes a focal length for the first positive lens h5 and second positive lens h7. Namely, the focal length f equals the focal length f1 for the first positive lens h5 and the focal length f2 for the second positive lens h7.

Assume that an angle between a vector P1 (or P2) defined by producing an orthogonal projection of a point on the wedged prism h6 and the y axis is $\alpha$, and an angle between the unit vector N1 and unit vector N2 normal to the face and back of the wedged prism h6 is $\phi$. Now, the optical length for light traveling from a point on the wedged prism h6 through which the light passes to a point on the second diffraction grating h8 at which the light reaches will be discussed below.

For light passing through the axis of rotation of the wedged prism h6, the optical length does not vary despite rotation of the wedged prism h6. Assuming that $\phi << \pi/2$, a difference Z(Y) in the optical length between light passing through a point separated by $Y(\lambda)$ from the axis of rotation of the wedged prism h6 and light passing through the axis of rotation of the wedged prism h6 is approximated according to the formula (4) as follows:

$$Z(Y) = Y(\lambda) \cdot (n-1)\phi\cos\alpha \quad (4)$$

where n denotes the refractive index of the wedged prism h6.

A point on the wedged prism h6 through which light of a center frequency passes is Yo. A phase difference $\psi(\lambda, \alpha)$ between light of a wavelength $\lambda o$ that travels when $\alpha=0$, and light of a wavelength $\lambda o+\Delta\lambda$ that travels when $\alpha$ assumes any value is expressed as follows:

$$\psi(\lambda, \alpha) = 2\pi \cdot Z(Y)/\lambda o$$

When the formula (4) is assigned to the above formula, $$\psi(\lambda, \alpha) = (2\pi/\lambda o) \cdot (Yo+\Delta Y) \cdot (n-1)\phi\cos\alpha$$

When the term $(Yo+\Delta Y)$ is rewritten using the formula (3), $$\psi(\lambda, \alpha) = (2\pi/\lambda o) \cdot (Yo+f \cdot N\cdot\cos\theta) \cdot K\cdot\cos\alpha \quad (5)$$

where K is substituted for $(n-1)\phi$.

For estimating a group delay, it is necessary to express a phase as a function of an angular frequency component of light. Therefore, the light of the wavelength $\lambda$ is converted into an angular frequency component $\omega$. A phase difference ψ(ω, α) between a center angular frequency component ωo of light traveling when α=0 and an angular frequency component ω=ωo+Δω traveling when a assumes any value is expressed as the following formula (6):

$$\psi(\omega, \alpha) = Y_o \cdot K \cdot \omega \cdot \cos\alpha/c - 2\pi \cdot (K/\cos\theta) \cdot f \cdot N \cdot \cos\alpha \cdot (\Delta\omega/\omega o) \quad (6)$$

where c denotes a light velocity in a vacuum.

The formula (6) signifies that the wedged prism h6 linearly changes the phase of the angular frequency component ω of light. This demonstrates that the wedged prism h6 exerts an operation of varying a group delay.

A group delay length Lg is provided as c×Tg (where Tg denotes a group delay). Moreover, Tg=−dφ(ω)/dω|ω=ωo. Therefore, the group delay length Lg may be expressed as the formula (7) below.

$$Lg = -K \cdot Y_o \cdot \cos\alpha + K \cdot f \cdot N \cdot (\lambda o/\cos\theta) \cdot \cos\alpha \quad (7)$$

When the wedged prism h6 is rotated (α is varied), cos α changes from −1 to +1. The group delay length Lg changes within a range expressed below.

$$2K|f \cdot N\lambda o/\cos\theta - Y_o|$$

This signifies that a point of interference at which sample light and reference light interfere with each other can be scanned by a length expressed below.

$$\Delta Ls = K|f \cdot N \cdot \lambda o/\cos\theta - Y_o|$$

According to the present embodiment, sample light reciprocates. A displacement of the point of interference at which the sample light and reference light interfere with each other corresponds to a half of a change in the group delay length.

By the way, a phase delay length Lp for a center wavelength ray of light is provided as c×Tp (where Tp denotes a phase delay). Moreover, Tp=ψ(ωo)/ωo. When the formula (6) is rewritten using Tp=ψ(ωo)/ωo, the phase delay length Lp is expressed as the formula (8) below.

$$Lp = K \cdot Y_o \cdot \cos\alpha \quad (8)$$

According to the present embodiment, Yo≠0. Therefore, when the wedged prism h6 is rotated, α varies. Consequently, the phase delay length Lp changes time-sequentially. In other words, a Doppler shift occurs.

A Doppler shift ΔF undergone by a center frequency ray of light is expressed as follows:

$$\Delta F = -(1/\lambda o) \cdot dLp/dt$$

where t denotes a time instant.

According to the present embodiment, sample light is not modulated. Therefore, when the sample light and reference light interfere with each other, an interfering signal is induced as a beat having a frequency expressed below.

$$Fb = (1/\lambda o) \cdot |dLp/dt|$$

This enables optical heterodyne detection.

For example, a case where the wedged prism h6 is rotated at a uniform rotating speed of Rr rotations per unit time will be discussed below.

Since the wedged prism h6 rotates at the speed of Rr rotations per unit time, a is calculated as follows:

$$\alpha = 2\pi Rr \cdot t + \alpha o$$

where αo denotes an angle of tilt of the wedged prism h6 with respect to the y axis observed at a time instant t=0.

A group delay length Lg(t) at a time instant t and a beat frequency ΔFb(t) of an interfering signal are provided as described below.

$$Lg(t) = -K \cdot \{Y_o - f \cdot N \cdot (\lambda o/\cos\theta)\} \cdot \cos(2\pi Rr \cdot t + \alpha o) \quad (9)$$

$$\Delta Fb(t) = 12\pi \cdot R \cdot K \cdot (Y_o/\lambda o) \cdot \sin(2\pi Rr \cdot t + \alpha o) \quad (10)$$

The formulae (9) and (10) demonstrate that the group delay length Lg changes in proportion to the cosine of an angle of rotation of the wedged prism, and that the beat frequency ΔFb(t) varies in proportion to the sine thereof.

Figure 5:
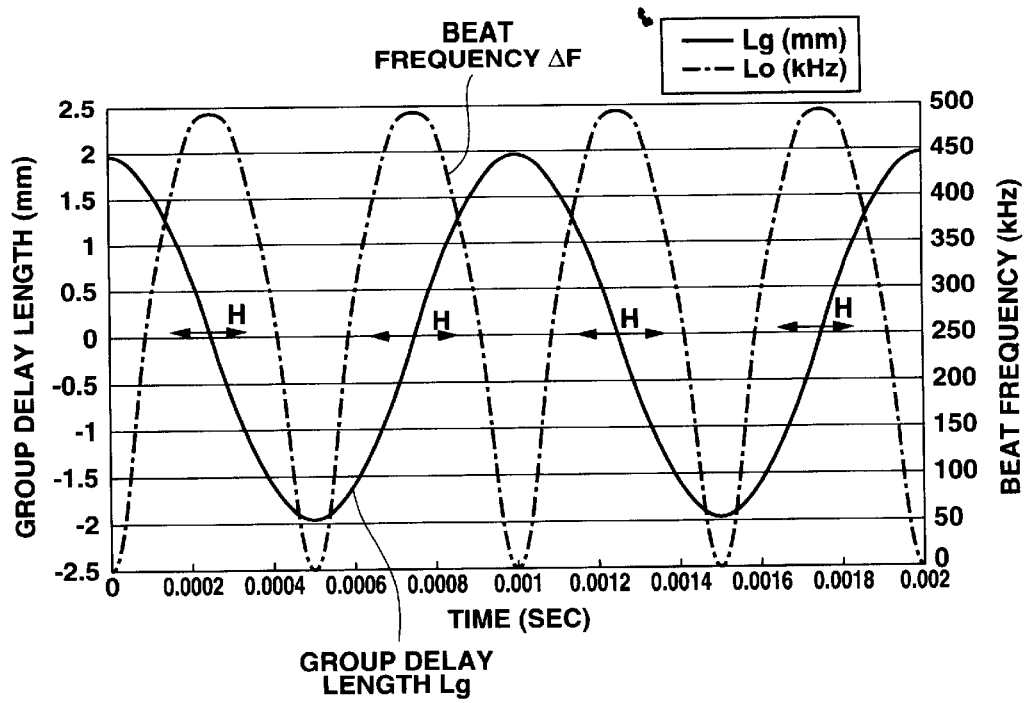

FIG. 5 shows the group delay length and the beat frequency of the interfering signal as functions of time in a practical case where:

the first positive lens h5 and second positive lens h7 offer a focal length f of 50 mm;

the first diffraction grating h4 and second diffraction grating h8 exhibit a spatial frequency N of 600 slits per mm;

the wedged prism h6 has an angle φ of 6°;

the wedged prism h6 offers a refractive index n of 1.5;

the low coherent light source supplies light whose center wavelength λ0 is 1.31 μm;

the wedged prism h6 is rotated at a rotating speed R of 1000 rps; and the depth at the point Yo on the wedged prism h6 through which the center wavelength ray of the light passes is 2 mm.

Referring to FIG. 5, when α=±π/2, a frequency shift in a beat remains limited over a relatively wide domain H. Moreover, FIG. 5 demonstrates that the optical length (group delay length) varies nearly linearly with the passage of time.

Next, the light pickup block h11 will be described below.

As long as an optical length variation optical system has the same optical elements like the aforesaid ones employed in the present embodiment, the focal lengths for the second positive lens h7 and fourth positive lens h9 should preferably meet the condition provided as the following conditional expression (11):

$$NA > f2(n-1)\phi/f4 \quad (11)$$

where f2 denotes the focal length for the second positive lens h7, f4 denotes the focal length for the fourth positive lens h9, n denotes an acute angle of the wedged prism h6 (angle between the normal unit vector N1 and the normal unit vector N2), and NA denotes the numerical aperture of the emission SM optical fiber 10.

The conditional expression (11) provides a condition to be met so that light converged by the fourth positive lens h9 will be gathered on the emission SM optical fiber 10 included in the light pickup block h11.

If the focal lengths for the two positive lenses h7 and h9 are deviated from those meeting the conditional expression (11), an angle at which incident light meets the emission SM optical fiber 10 included in the light pickup block becomes so large that the light cannot travel over the optical fiber.

This phenomenon will be described below. According to the present embodiment, the wedged prism h6 bends light. Light impinging on the second diffraction grating h8 makes a rotational motion along the circumference of a circle having a predetermined radius along with the rotation of the wedged prism h6. The radius R is expressed as the formula (12) below.

$$R = f2 \cdot (n-1)\phi \quad (12)$$

Light emitted from the second diffraction grating h8 is bent on the yz plane relative to incident light but not bent on the xz plane. The light emitted from the second diffraction grating h8 therefore makes an elliptic motion. The major axis of an ellipse is contained in the xz plane. A radius Rx on the major axis is expressed as a formula below whose right side is the same as the formula (12).

$$Rx = f2 \cdot (n-1)\phi$$

A radius Ry on the minor axis is provided as follows:

$$Ry = R|\cos \beta|$$

where $\beta$ denotes an angle at which the principal ray of light incident on the second diffraction grating h8 having the same wavelength as the center wavelength of the incident light meets light emitted from the second diffraction grating h8.

Consequently, when light traverses the xz plane, the diameter of light incident on the fourth positive lens h9 becomes maximum. The maximum angle of incidence $\gamma$ of light incident on the emission SM optical fiber 10 is provided as the formula (13) below.

$$\gamma = Rx/f4$$

$$\gamma = f2 \cdot (n-1)\phi/f4 \quad (13)$$

Light meeting an SM optical fiber having a numerical aperture NA at an angle larger than $\gamma max = \sin^{-1}(NA)$ does not travel over the SM optical fiber. For constantly acquiring light over such an optical fiber, the formula (14) below must be met.

$$\gamma max = \gamma \quad (14)$$

In general, the SM optical fiber has a numerical aperture of 0.2 or less. The maximum angle of incidence, $\gamma max$, can therefore be approximated to the numerical aperture NA. A condition described below may therefore be established.

$$NA \text{ approximate to } \gamma max > \gamma = f2 \cdot (n-1)\phi/f4$$

Consequently, the focal lengths for the second positive lens h7 and fourth positive lens h9 must meet the conditional expression (11). The condition provided by the conditional expression (11) is a minimum condition to be met so that light will be gathered on the emission SM optical fiber 10 included in the light pickup block h11. In practice, for improving the efficiency in gathering light on the emission SM optical fiber 10 included in the light pickup block h11, the condition provided by the conditional expression (15) below should preferably be met.

$$0.7NA > f2 \cdot (n-1)\phi/f4 \quad (15)$$

In the optical length variation optical system employed in the present embodiment, the focal length f3 for the third positive lens h2 offering a positive power and being included in the light introduction block h3 and the focal length f4 for the fourth positive lens h9 offering a positive power and being included in the light pickup block h11 should preferably meet the condition provided by the following conditional expression (16):

$$0.5 < Di \cdot f4/(Do \cdot f3) < 10 \quad (16)$$

where Di denotes a mode field diameter for the incidence SM optical fiber 8, and Do denotes a mode field diameter for the emission SM optical fiber 10.

The conditional expression (16) provides a condition to be met to prevent the efficiency in gathering light on the emission SM optical fiber 10 included in the light pickup block h11 from being degraded drastically.

The smallest spot size (waist size) Wo of light converged through the fourth positive lens h9 included in the light pickup block h11 may be approximated to the mode field diameter Di by which light is distributed on the end surface of the emission SM optical fiber 10 as expressed by the formula below. At this time, consideration is taken into the fact that the optical system interposed between the first diffraction grating h4 and second diffraction grating h8 is an afocal optical system offering a power of 1.

$$Wo = Di \cdot f4/f3$$

For efficiently gathering light converged on the fourth positive lens h9 onto the emission SM optical fiber, the spot size Wo of the light gathered on the emission SM optical fiber 10 should be agreed with the mode field diameter Do for the emission SM optical fiber 10 to the greatest possible extent.

When $Di \cdot f4/(f3 \cdot Do) > 10$, the spot size Wo of light gathered on the emission SM optical fiber 10 gets much larger than the mode field diameter Do for the optical fiber. This leads to a drawback that the efficiency in gathering light on the fiber is degraded drastically.

Moreover, when $Di \cdot f4/(f3 \cdot Do) < 0.5$, the numerical aperture of the emission SM optical fiber 10 relative to incident light gets too large. The drawback that the efficiently in gathering light on the fiber is degraded drastically manifests.

Next, the size of the wedged prism h6 employed in the present embodiment will be described below.

At the position of the wedged prism h6, light spatially spreads due to the operations of the first diffraction grating h4 and first positive lens. The size $\Delta Ybr$ of the wedged prism h6 is expressed using the formula (2) as follows:

$$\Delta Ybr = f1 \cdot N \cdot \Delta\lambda br/\cos\theta \quad (17)$$

where $\Delta br$ denotes an interval in wavelength of light incident on the optical length variation optical system.

In terms of the full width at a half maximum (FWHM) $\Delta\lambda_{FWHM}$ of light, light employed in the optical coherence tomography (OCT) system is light whose FWHM ranges from several tens of nanometers to several hundreds of nanometers. If the actual interval in wavelength of light $\Delta\lambda br$ were thought to be several times larger than $\Delta\lambda_{FWHM}$, it would be several hundreds of nanometers. Moreover, the spatial frequency of a diffraction grating ranges from several hundreds of slits per millimeter to several thousands of slits per millimeter. The focal length for a positive lens is about several hundreds of millimeters at most. $\Delta Ybr$ therefore ranges from about several millimeters to about several tens of millimeters. The wedged prism h6 can thus be designed compactly.

According to the present embodiment, there is provided a transmission type optical length variation optical system having a small working assembly, easily controllable, capable of varying an optical length within a wide range that determines a scanned range, and enabling scanning at a high speed.

Moreover, the optical scanner probe may be different in length among products, or an object must be observed beyond the scanned range determined by the wedged prism h6. In this case, the light introduction block h3 should merely be moved along the optical axis in order to adjust the optical length.

Moreover, assuming that the distances between the diffraction grating h4 and first lens h5 and between the diffraction grating h8 and second lens h7 are 11 and 12 respectively, they are substantially equal to the focal lengths f1 and f2 for the lenses. If the lengths of an SM optical fiber and a light path in the air over which object light is propagated are difference from the lengths of those over which reference light is propagated, the coherence length may be increased due to dispersion occurring on the SM optical fibers.

The distances 11 and 12, an angle of incidence at the diffraction grating h6, and an angle of emission at the diffraction grating h8 may be adjusted by rotating at least one or both of the diffraction grating h4 and diffraction grating h8 about the optical axis. Thus, dispersion occurring on the SM optical fibers can be compensated.

The diffraction gratings h4 and h8 shown in FIG. 3 may be replaced with another dispersion elements. Even in this case, the optical elements can be arranged in the same manner as those described above.

Figure 6:
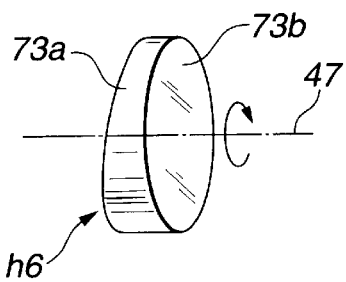
Figure 7:
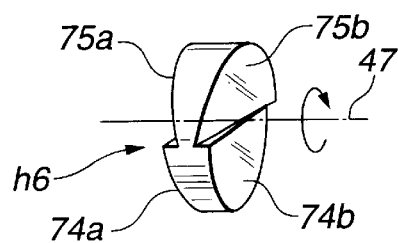

FIG. 6 and FIG. 7 show examples of the wedged prism h6. The example shown in FIG. 6 is composed of polished planes 73a and 73b opposed to each other and disposed obliquely to an axis of rotation 47. Alternatively, either of the planes 73a and 73b may be disposed perpendicularly to the optical axis.

The example shown in FIG. 7 is composed of a pair of inclined planes 74a and 74b opposed to each other and a pair of inclined planes 75a and 75b opposed to each other. By thus dividing planes to increase the number of pairs of opposed planes, the number of scans to be performed in a depth direction per turn made by a prism can be increased from two reciprocating motions to four reciprocating motions. Moreover, the scanning speed in the depth direction can be raised. This advantage is intensified with an increase in the number of pairs of planes.

Figure 8:
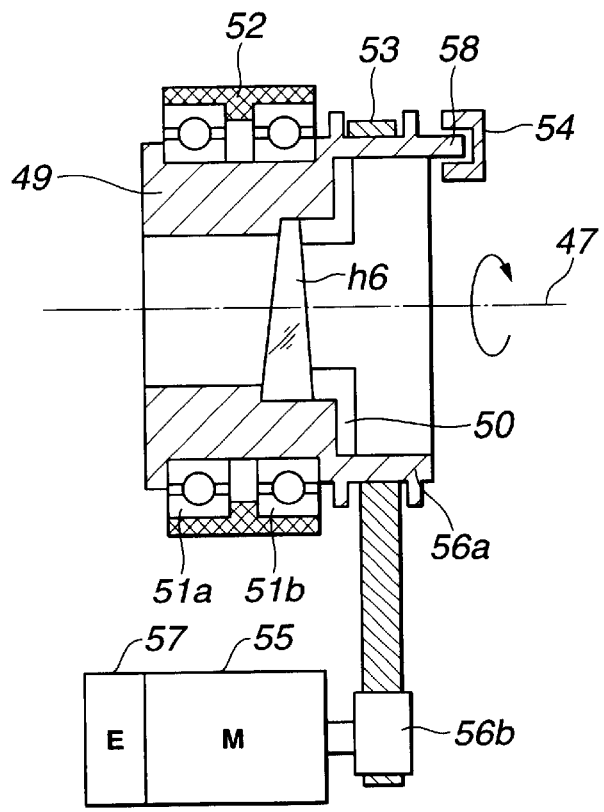

Referring to FIG. 8, a means for rotating the wedged prism h6 will be described below. As shown in FIG. 8, the wedged prism h6 is clamped by a prism base 49 and a prism pressure 50. The prism base 49 is locked in a housing 52 using bearings 51a and 51b so that it can be rotated freely. The housing 52 is fixed and positioned to a support base of the optical length variation optical system that is not shown. The prism base 49 has a synchronous pulley 56a that is engaged with a synchronous belt 53. The other end of the synchronous belt 53 is engaged with a synchronous pulley 56b. The pulley is connected to a motor 55 having an encoder 57 attached thereto. The synchronous pulley 56a has a sheet interceptor 58 whose position can be detected using a photo-interrupter 54.

The motor 55 causes the synchronous pulley 56b to rotate. The rotation is conveyed to the synchronous pulley 56a by the synchronous belt 53, whereby the prism base 49 is rotated. This causes the wedged prism h6 to rotate about the axis of rotation 47. The rotating speed of the motor 55 is detected by the encoder 57 and confined to a certain speed. Moreover, the position of the sheet interceptor 58 is detected using the photo-interrupter 54 in order to detect a home position of the rotating prism base 49. The encoder 57 is used to detect an angle of rotation of the wedged prism h6 from the position of the sheet interceptor 58. Thus, the current angle of rotation of the prism is detected.

The angle of rotation of the prism can thus be detected accurately. A scanned point and an acquired interfering signal can be accurately associated with each other. Since the prism can be rotated on a stable basis, a Doppler shift derived from a variation of the optical length can be controlled accurately.

Figure 9:
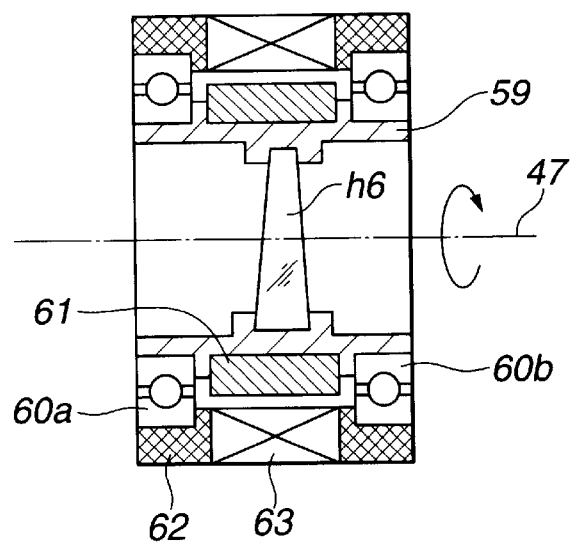

The means for rotating the wedged prism h6 is not limited to the structure shown in FIG. 8 but may be structured as shown in FIG. 9. Specifically, as shown in FIG. 9, the wedged prism h6 may be held and locked in an inner ring 59 of a hollowed brushless motor. The motor consists of the inner ring 59, the housing 62, a permanent magnet 61 embedded in the inner ring 59, a coil 63 embedded in the housing 62, and bearings 60a and 60b for holding the inner ring 59 so that the inner ring 59 can rotate freely relative to the housing 62. When the motor is rotated, the wedged prism h6 is rotated about the axis of rotation 47 of the motor. A compact magnet that is not shown may be embedded in the inner ring of the motor and a Hall element that is not shown may be opposed to the compact magnet, whereby an encoder may be constructed to control the rotating speed. Moreover, the sheet interceptor 58 and photo-interrupter 54 shown in FIG. 8 or a pattern of shades formed on the inner ring and a reflection type photo-interrupter for detecting the pattern may be used to detect the home position of the wedged prism h6.

The structure shown in FIG. 9 can provide the same advantage as the one shown in FIG. 8. Moreover, the structure shown in FIG. 9 can rotate the wedged prism at a speed of up to sixty thousand rotations per minute. This enables rapid scanning. Consequently, it becomes possible to acquire information in real time. Since it is hard to prevent a body motion, whether information can be acquired in real time is an important criterion on determining application of an optical imaging device to a living body. Moreover, an optical length variation optical system can be designed compactly.

(Operations)

Next, operations to be exerted by the present embodiment having the aforesaid components will be described with reference to FIG. 1.

Light passing through the optical coupler 3 and optical coupler 6 is emitted to a specified point (point of observation 257) in a living tissue through the optical scanner probe 20, reflected from the point, and returned to the optical coupler 6. The light is then fed to the optical coupler 14 over the fourth SM optical fiber 13. This light shall be referred to as sample light. Another light passing through the optical coupler 3 and optical length variation optical system 9 and reaching the optical coupler 14 shall be referred to as reference light. A difference between the optical lengths for the sample light and reference light is proportional to a difference between the delay times undergone by the sample light and reference light. When the difference in optical length falls within the coherence length of light emanating from the light source, the sample light and reference light interfere with each other. A resultant interfering signal is acquired by the detectors 17 and 18 and fed to the computer 27 by way of the differential amplifier 23, demodulator 24, and A/D converter 25. When the control circuit 26 changes the delay time to be produced by the optical length variation optical system 9, the point of observation 257 moves accordingly in a direction of emission or incidence of light irradiated from the optical scanner probe. When the point of observation 257 is moved continuously, one-dimensional information of the intensity of reflection in a depth direction of light from the living tissue 162 can be acquired. Moreover, when the scanning drive unit 22 is used to scan a point of light emission or incidence 258, a two-dimensional image having as its two dimensions the depth direction and the direction of scanning can be produced. The image is reconstructed using the computer 27 and displayed on the monitor 28.

(Advantages)

As mentioned above, according to the present invention, since a Mach-Zehnder interferometer type optical system is employed, a majority of light can be branched out to be irradiated to an object from which feeble light is reflected. The amount of signal light reflected from the object can be increased, though it is affected by a signal-to-noise ratio offered by an optical imaging device. The signal-to-noise ratio can be improved by optimizing the branching ratio of light. Moreover, since a difference frequency is detected through heterodyning, all the components of a light signal other than a heterodyne frequency component can be removed and the signal-to-noise ratio can be improved.

Moreover, the amount of light returning to the light source is so small that an expensive isolator is unnecessary. This results in an inexpensive optical imaging device.

Furthermore, since an optical length variation optical system is realized with a transmission type optical system, reflection of light from the optical elements of the optical system will not affect an interfering signal. This results in a negligible optical noise and an improved signal-to-noise ratio.

Moreover, a polarization controller is placed in both the incidence and emission stages of the optical length variation optical system. Even if the optical length variation optical system has the property of causing polarization, the polarization controller located in the incidence stage should merely be adjusted according to the property of causing polarization of the optical length variation optical system. By the way, the polarization controller located in the emission stage is adjusted according to the property of causing polarization of an object. Thus, the degree of polarization of sample light returning from the object and that of polarization of reference light can be agreed with each other without the necessity of sacrificing the efficiency of the optical length variation optical system. This results in highly coherent light.

Second Embodiment

The second embodiment is a variant of the first embodiment in terms of the optical elements located behind a second diffraction grating included in an optical length variation optical system.

Figure 10:
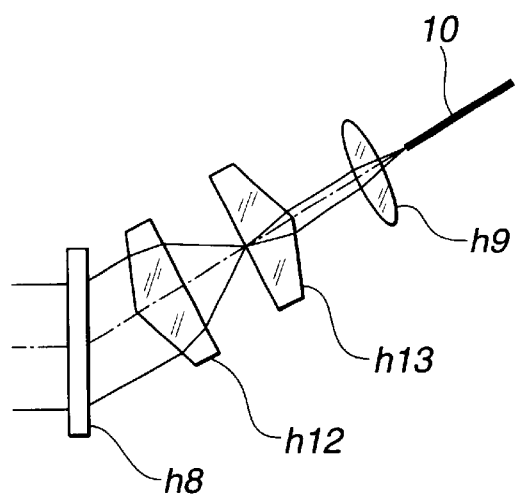

FIG. 10 schematically shows the arrangement of optical elements located behind a second diffraction grating included in an optical length variation optical system employed in the second embodiment. The optical elements located ahead of the second diffraction grating h8 are identical to those employed in the first embodiment. Illustration of the optical elements will therefore be omitted. Moreover, the other components of a tomographic observation/diagnosis device realized with an optical imaging device in accordance with the present embodiment other than the optical length variation optical system are identical to those of the first embodiment. An overall configuration of an optical coherent tomography system including the optical imaging device will therefore be omitted.

The optical length variation optical system employed in the second embodiment has the second diffraction grating h8 followed by a first cone lens h12, a second cone lens h13, a fourth positive lens h9 offering a positive power, and an emission SM optical fiber 10.

What is referred to as a cone lens is a lens whose one surface is flat and whose the other surface is conical.

Operations to be exerted by the present embodiment will be described below.

As described in relation to the first embodiment, for gathering light on the emission SM optical fiber 10, the angle γ of incident light with respect to the emission SM optical fiber 10 must be smaller than the numerical aperture NA of the optical fiber, that is, NA>γ. As long as the diameter of a spot of light incident on the emission SM optical fiber 10 does not vary, as γ is set to a smaller value, the efficiency in gathering light on the emission SM optical fiber 10 improves.

Figure 11:
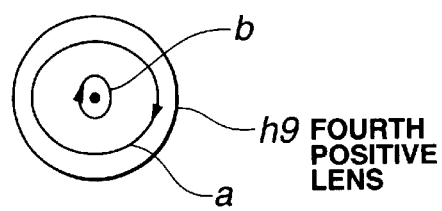

According to the present embodiment, similarly to the first embodiment, light emitted from the second diffraction grating h8 is allowed to make an elliptic motion denoted with a in FIG. 11 along with the rotation of the wedged prism.

By the way, the maximum angle γ of incident light with respect to the emission SM optical fiber 10 has a relationship expressed below to the radius R along the major axis of a spot of light making an elliptic motion and falling on the fourth positive lens h9.

$$\gamma = R/f4$$

Therefore, as the focal length f4 for the fourth positive lens h9 is increased, the maximum angle γ is decreased.

However, when the focal length f4 for the fourth positive lens h9 is increased, the minimum spot size (waist size) Wo of light converged on the fourth positive lens h9 increases as described in relation to the conditional expression (3) employed in the first embodiment. This disables improvement of the efficiency in gathering light.

If the radius R along the major axis of a spot of light making an elliptic motion and falling on the fourth positive lens h9 can be decreased as denoted with reference symbol b in FIG. 11, the maximum angle γ can be decreased without the necessity of increasing the focal length f4 for the fourth positive lens 9. Consequently, the efficiency in gathering light on the emission SM optical fiber 10 can be improved.

According to the present embodiment, an optical system composed of the two cone lenses h12 and h13 is adopted as a means for decreasing the radius R along the major axis of a spot of light making an elliptic motion and falling on the fourth positive lens h9.

Figure 12A:
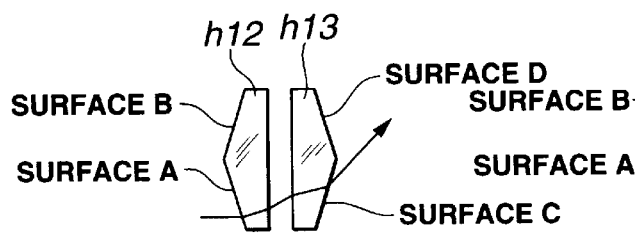
FIG. 12A is an explanatory diagram showing a path along which light passes through two cone lenses that are located mutually closely.
Figure 12B:
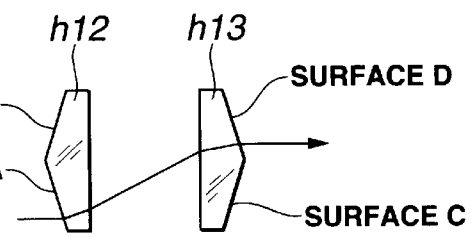
FIG. 12B is an explanatory diagram showing a path along which light passes through two cone lenses that are separated from each other.

FIG. 12A shows a trajectory followed by light when the two cone lenses h12 and h13 are located mutually closely. FIG. 12B shows a trajectory followed by light when the two cone lenses h12 and h13 are separated from each other.

When the two cone lenses h12 and h13 are located mutually closely, light incident on surface A (or surface B) impinges on surface C (or surface D). Light getting out of the second cone lens h13 is not parallel to the light incident on the first cone lens h12, and will therefore not fall on the emission SM optical fiber 10. However, when the two cone lenses h12 and h13 are separated from each other, light incident on surface A (or surface B) passes through surface D (or surface C). When the two cone lenses h12 and h13 are separated from each other by a predetermined distance, light getting out of the cone lens h13 becomes parallel to light incidence on the cone lens h12. The light is then converged on the fourth positive lens h9 located behind the cone lens h13, and can therefore be gathered on the emission SM optical fiber 10.

Figure 13:
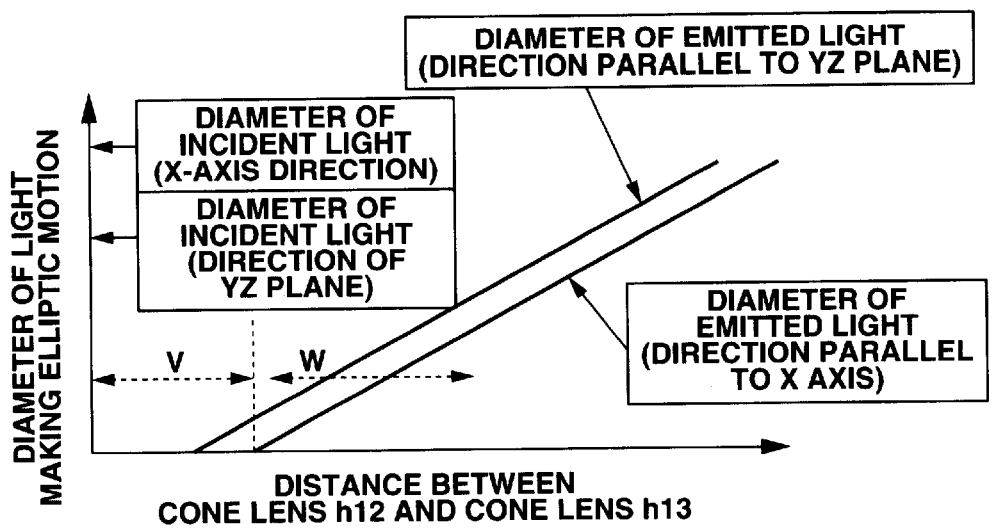

FIG. 13 is a graph indicating the diameter in a direction parallel to the yz plane of light making an elliptic motion and passing through the cone lenses, and the diameter in a direction parallel to the x axis thereof in relation to the distance between the first cone lens h12 and second cone lens h13 that is a variant. Herein, a domain V contains too small values assumed by the distance between the two cone lenses h12 and h13, and causes the second cone lens h13 to radiate light. The domain V disables gathering of light on the emission SM optical fiber 10 as described in conjunction with FIG. 12A and FIG. 12B. However, when the two cone lenses h12 and h13 are separated from each other little by little, it is found that there is a domain making the diameters along the major and minor axes of a spot of light, which passes through the second cone lens h13 and makes an elliptic motion, smaller than those of light that has not yet passed through the first cone lens h12.

According to the present embodiment, the distance between the first cone lens h12 and second cone lens h13 is set to any value within the domain making the diameters along the major and minor axes of a spot of light, which makes an elliptic motion, smaller. Therefore, even if the focal length for the fourth positive lens h9 is small, the angle γ of incident light with respect to the emission SM optical fiber 10 can be made smaller. Consequently, the efficiency in gathering light on the emission SM optical fiber 10 can be improved drastically.

Figure 14:
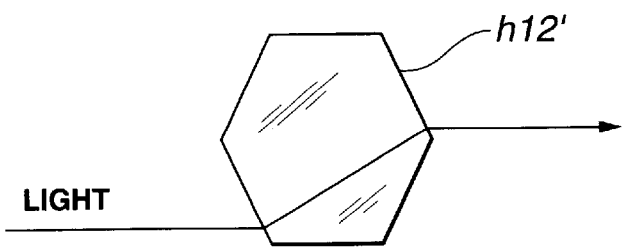

According to the present embodiment, the two cone lenses h12 and h13 are used in combination in order to decrease the diameter of light making an elliptic motion. Alternatively, as shown in FIG. 14, one cone lens h12 whose both surfaces are conical may be substituted for the cone lenses h12 and h13. Nevertheless, the same advantages as those of the second embodiment can be provided.

Third Embodiment

The third embodiment has a wedged prism, which serves as a phase modulation element included in an optical length variation optical system employed in the first embodiment, replaced with another optical element.

Figure 15:
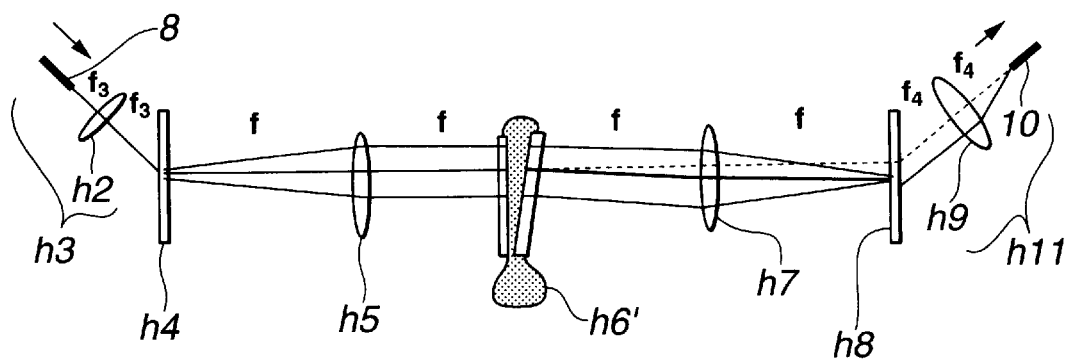
FIGS. 15 to FIG. 17 are concerned with the third embodiment.

FIG. 15 schematically shows the components of an optical length variation optical system in accordance with the present embodiment. The other components of a tomographic observation/diagnosis device realized with an optical imaging device in accordance with the present invention other than the optical length variation optical system are identical to those of the first embodiment. An overall configuration of an optical coherence tomography system including the optical imaging device will therefore be omitted.

The optical length variation optical system in accordance with the present embodiment consists mainly of a light introduction block h3, a pair of a first diffraction grating h4 and a first positive lens h5, a prism h6', a pair of a second positive lens h7 and a second diffraction grating h8, and a light pickup block h11. The light introduction block h3 is composed of an incidence SM optical fiber 8 and a third positive lens h2 offering a positive power. The first diffraction grating h4 serves as a spectrum dispersing element for spatially dispersing the spectrum of light, and the first positive lens h5 offers a positive power. The prism h6' serves as a phase modulation element for substantially linearly changing the phases of angular frequency components of the light dispersed by the spectrum dispersing element. The second positive lens h7 serves as a spectrum reuniting element for reuniting the phase-modulated angular frequency components of the spatially dispersed light into single light, and offers a positive power. The fourth positive lens h9 offers a positive power. These optical elements are optically interconnected.

According to the present embodiment, the first positive lens h5 and second positive lens h7 are realized with lenses offering the same focal length. The first positive lens h5 and second positive lens h7 are arranged so that their optical axes will be aligned with each other. The first diffraction grating h4 is located substantially at the position of the front focus of the first positive lens h3. The prism h6' is located substantially at the position of the rear focus of the first positive lens h5 and the front focus of the second positive lens h7. The second diffraction grating h8 is located substantially at the position of the rear focus of the second positive lens h7.

Figure 16:
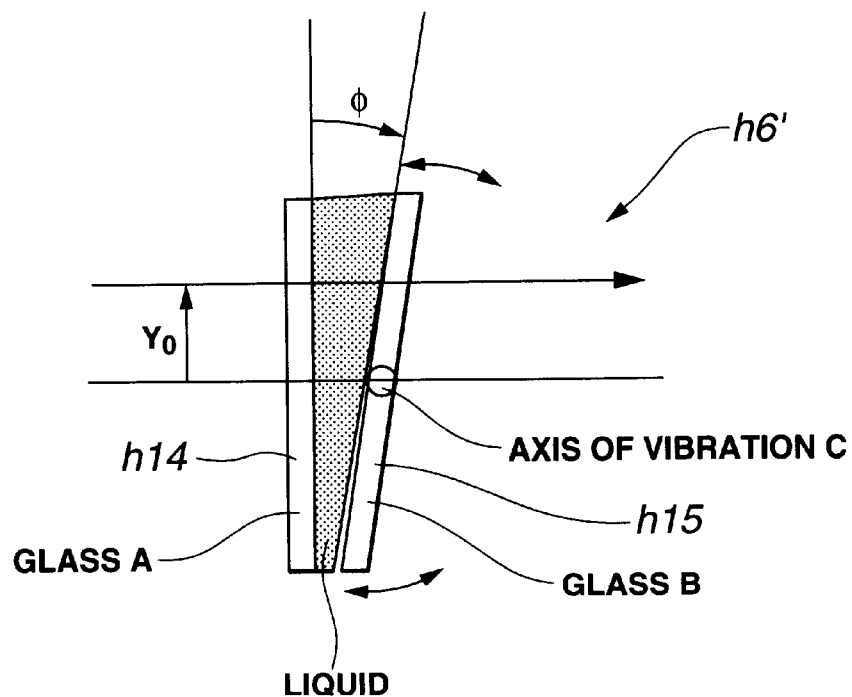

The prism h6' has, as shown in FIG. 16, a light-transmissive liquid sandwiched between glasses h14 and h15 whose at least two surfaces are flat and light-transmissive. An angle φ between the two light-transmissive glasses can be changed with the passage of time. The glass h14 facing the first diffraction grating h4 is stationary. The glass h15 facing the second diffraction grating h8 can be vibrated relative to an axis C facing in the same direction as the slits constituting the first diffraction grating h4 and second diffraction grating h8.

For vibrating the glass h15, for example, the glass h15 may be attached to a shaft having a galvanometer mechanism. Any other method may be adopted as long as an angle between the glass h14 and glass h15 can be changed.

A group delay produced by the prism h6' serving as a phase modulation element employed in the present embodiment will be described below.

According to the present embodiment, the same coordinate system as that employed in the first embodiment is defined on the prism h6'. A difference Z in optical length between light passing through the axis of vibration C of the glass h15 and light passing through a point at a height Y is expressed as follows:

$$Z=(n-1) \cdot Y \cdot \phi$$

where n denotes the refractive index of a light-transmissive liquid, and φ denotes an angle between the glass h14 of the prism h6' and the glass h15 thereof.

A height at which a ray of light having the same wavelength as the center wavelength of the light passes through the prism h6' shall be Y. The spatial frequency of a grating (inverse number of the number of slits constituting a grating) shall be N. An angle between a normal to the back of the first diffraction grating h4 and a direction in which the center wavelength ray is emitted shall be θ. The center wavelength of low coherent light shall be λo. A focal length for the first positive lens h5 and second positive lens h7 shall be f. In this case, a phase difference ψ(ω) between a ray of an angular frequency ω and a ray of an angular frequency ω=ωo+Δω is expressed as the formula (18) below.

$$\psi(\omega)=Yo \cdot (n-1) \cdot \omega \cdot \phi/c - 2\pi \cdot (n-1) f \cdot N \cdot \phi \cdot \alpha \omega / (\omega o \cdot \cos \theta) \quad (18)$$

The formula (18) demonstrates that the prism h6' whose glasses h14 and h15 meet at the angle φ linearly changes the phase of the ray of the angular frequency ω, and that the prism h6' exerts an operation of varying a group delay.

Similarly to the first embodiment, phase modulation performed by the prism h6', varying of a group delay achieved thereby, and shifting of a center frequency will be discussed. A group delay length Lg, a phase delay length Lp, and a shift in the center frequency of light ΔF are expressed as the formulae (19) to (21) below.

$$Lg=-(n-1) \cdot Yo \cdot \phi + (n-1) \cdot f \cdot N \cdot (\lambda o / \cos \theta) \cdot \phi \quad (19)$$

$$Lp=(n-1) \cdot Yo \cdot \phi \quad (20)$$

$$\Delta F=-(n-1) \cdot Yo \cdot d\phi/dt \quad (21)$$

Consequently, when the angle between the glasses h14 and h15 can be changed time-sequentially, the group delay can be varied. Eventually, the optical length for reference light in an optical tomography structure observation device can be varied.

Moreover, the axis of vibration C of the glass h15 may be deviated from a point through which a ray of light having the same wavelength as the center wavelength of the light passes in order to time-sequentially vary the phase delay to be undergone by the center wavelength ray. Consequently, the center wavelength ray undergoes a Doppler shift. The center wavelength ray is synthesized with sample light, whereby a beat is generated. This enables optical heterodyne detection.

A way of time-sequentially changing the angle φ between the glasses h14 and h15 is, for example, to change the angle φ so that a curve indicating the angle φ as a function of time will be plotted like a sine wave or chopping wave.

Figure 17:
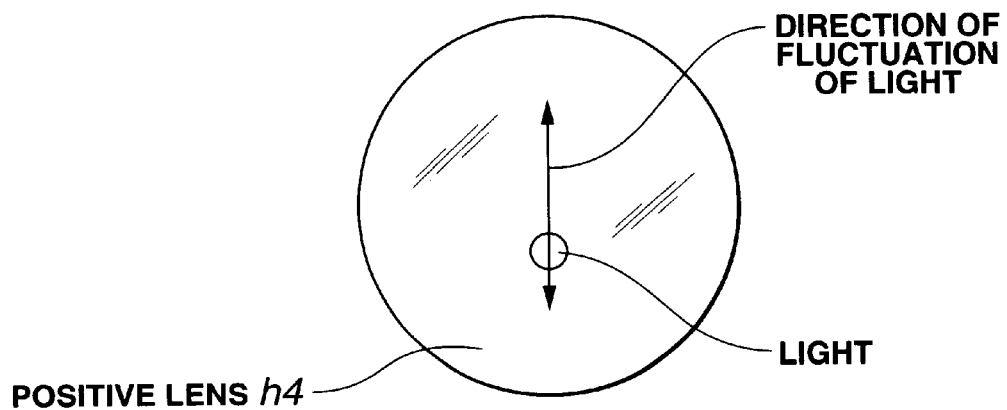

According to the present invention, when the angle φ between the glasses h14 and h15 changes, light emitted from the second diffraction grating h8 moves along a straight line as shown in FIG. 17. This causes the angle of incidence γ of light falling on the emission SM optical fiber 10 via the fourth positive lens h9 to change.

For gathering light emitted from the fourth positive lens h9 on the emission SM optical fiber 10, the focal length f2 for the second positive lens h7 and the focal length f4 for the fourth positive lens h9 should preferably meet the condition provided by the following conditional expression (22):

$$NA > f2(n-1)\Delta\phi max/(2 \cdot f4) \quad (22)$$

where Δ+max denotes a maximum change in the angle φ between the glasses h14 and h15 that are two light-transmissive plates.

In case the condition provided by the conditional expression (22) is not met, when the angle φ between the glasses h14 and h15 of the prism h6' is changed, the angle of incidence γ of light with respect to the emission SM optical fiber 10 may be so large that the light will not partly be gathered on the emission SM optical fiber 10.

For improving the efficiency in gathering light on the emission SM optical fiber 10 despite a change in the angle φ between the glasses h14 and h15, the condition provided by the conditional expression (23) below should preferably be met.

$$0.7NA > f2(n-1)\Delta\phi max/(2 \cdot f4) \quad (23)$$

From the same viewpoint as that described in relation to the first embodiment, it is required to decrease the mode field diameter for the emission SM optical fiber 10 and the spot size of light converged on the fourth positive lens h9. This is intended to prevent the efficiency in gathering light on the emission SM optical fiber 10 from being degraded terribly. Therefore, the focal length f3 for the third positive lens h2 included in the light introduction block h3 and the focal length f4 for the fourth positive lens h9 included in the light pickup block h11 should preferably be set to values meeting the condition provided by the following conditional expression (24):

$$0.5 < Di \cdot f4/(Do \cdot f3) < 10 \quad (24)$$

where Di denotes the mode field diameter for the incidence SM optical fiber 8 included in the light introduction block h3, and Do denotes the mode field diameter for the emission SM optical fiber 10 included in the light pickup block h11.

According to the present embodiment, an angle of vibration at which the glass h15 is vibrated may not be large. Nevertheless, as long as the focal length f for the first positive lens h5 and second positive lens h7 is large enough, a scanned length determined with a variation of an optical length can be increased. The glass should merely be vibrated at so small an angle of several tens of milliradians. Consequently, an object can be scanned over a sufficiently large length.

The small magnitude of vibration of the glass provides the merit that the glass can be vibrated quickly and controlled on a stable basis.

Consequently, the employment of a prism like the one employed in the present embodiment makes it possible to realize a transmission type optical length variation optical system having a small working assembly, easily controllable, and capable of varying an optical length within a wide range that determines a wide scanned range. Eventually, rapid scanning is enabled.

According to the present embodiment, the glass h14 is stationary and the glass h15 is vibratory. Alternatively, the glass h14 may be vibratory, and the glass h15 may be stationary. Otherwise, both the glass h14 and glass h15 may be vibrated simultaneously. Nevertheless, the same advantages as those described above can be provided.

Fourth Embodiment

The fourth embodiment is identical to the third embodiment except the components of the light pickup block h11 located behind the second diffraction grating h8.

Figure 18A:
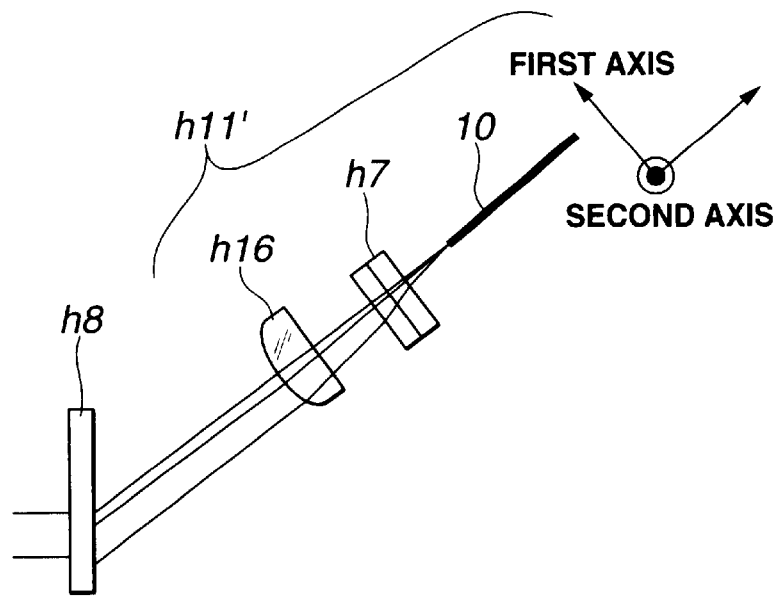
Figure 18B:
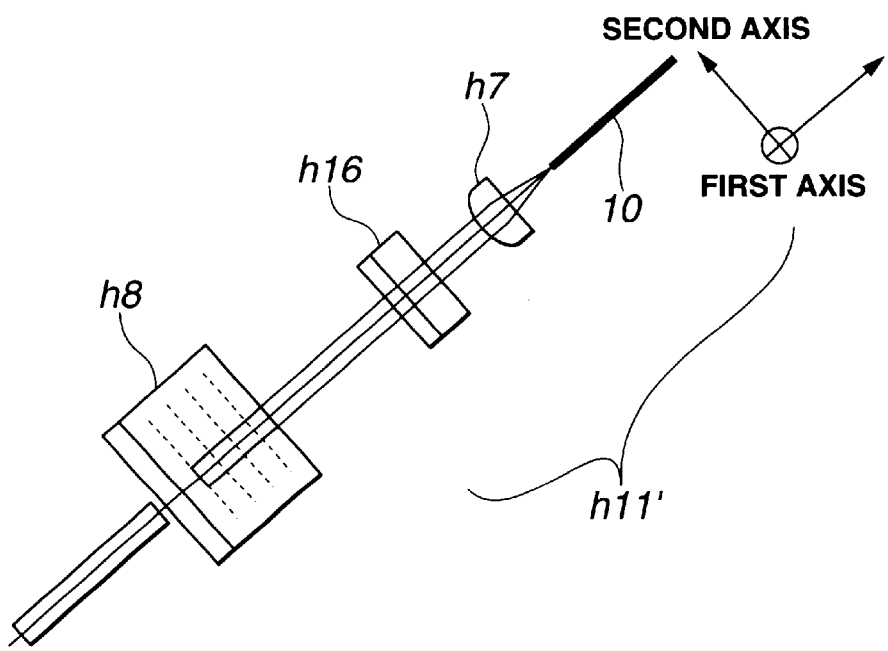
FIG. 18B shows the optical elements located behind the second diffraction grating in the optical length variation optical system and seen from the first axis.

FIG. 18A and FIG. 18B schematically show the arrangement of optical elements located behind the second diffraction grating h8 included in an optical length variation optical system employed in the present embodiment. FIG. 18A shows the optical elements seen along the second axis, and FIG. 18B shows the optical elements seen along the first axis.

According to the present embodiment, the second axis is defined in a direction perpendicular to the direction of light spatially dispersed by a spectrum dispersing element, or in other words, a direction parallel to the direction of slits constituting the first diffraction grating. The first axis is defined perpendicularly to the second axis.

The optical elements located ahead of the second diffraction grating h8 are identical to those employed in the first embodiment. The illustration of the optical elements will therefore be omitted. Moreover, all the components of a tomographic observation/diagnosis device realized with an optical imaging device in accordance with the present invention other than the optical length variation optical system are identical to those of the first embodiment. An overall configuration of an optical coherence tomography system including the optical imaging device will therefore be omitted.

According to the present embodiment, a light pickup block h11' located behind the second diffraction grating h8 is composed of a lens h16, a lens h17, and an emission SM optical fiber 10. The lend h16 offers a positive power in the direction of the first axis but offers no power in the direction of the second axis perpendicular to the first axis. The lens h17 offers no power in the direction of the first axis but offers a positive power in the direction of the second axis.

The lens h16 is a cylindrical lens whose back is a flat surface and whose face is shaped cylindrically with a direction parallel to the second axis as an axis.

The lens h17 is a cylindrical lens whose back is a flat surface and whose face is shaped cylindrically with a direction parallel to the first axis as an axis.

The lens h16 and lens h17 are arranged so that a beam waist in the first-axis direction of light having passed through the lenses and a beam waist in the second-axis direction thereof will coincide with the end surface of the emission SM optical fiber 10.

Focal lengths for the lens h16 and lens h17 should preferably be determined as described below.

For gathering light on the emission SM optical fiber 10 included in the light pickup block h11', the focal length f4a in the first-axis direction for the lens h16 is determined to meet the condition provided by the following conditional expression (25):

$$NA > f2(n-1)\Delta\phi max/(2 \cdot f4a) \tag{25}$$

where $\Delta\phi max$ denotes a maximum change in an angle $\phi$ between the two light-transmissive plates.

In case the condition provided by the conditional expression (25) is not met, when the angle $\phi$ between the glasses h14 ande h15 onstituting the prism h6' shown in FIG. 15 is increased, the angle of incidence of light with respect to the emission SM optical fiber 10 becomes too large. Therefore, part of the incident light is not gathered on the emission SM optical fiber 10.

Furthermore, for preventing the efficiency in gathering light on the emission SM optical fiber 10 from being degraded terribly, the focal length f3 for the third positive lens included in the light introduction block, the focal length f4a in the first-axis direction for the lens h16 included in the light pickup block h11', and the focal length f4b in the second-axis direction for the lens h17 should preferably be set to values meeting the conditions provided by the following conditional expressions (26) and (27):

$$0.25 < Di \cdot f4a/(Do \cdot f3) < 10 \tag{26}$$

$$0.5 > Di \cdot f4b/(Do \cdot f3) < 5 \tag{27}$$

where Di denotes the mode field diameter for the SM optical fiber included in the light introduction block, and Do denotes the mode field diameter for the emission SM optical fiber 10 included in the light pickup block.

For realizing a large change in a group delay length Lg, the focal length f2 for the second positive lens must be increase d according-to the formula (19). Alternatively, the maximum change $\Delta\phi max$ in the angle $\phi$ between the glasses h14 and h15 that are two light-transmissive plates must be increased. Assume that ordinary lenses are used as the lenses h16 and h17 included in the light pickup block h11' in the optical length variation optical system. In this case, if the focal length f2 and maximum change $\Delta\phi max$ are increased, the focal lengths for the lenses h16 and h17 included in the light pickup block h11' must be increased in order to meet the condition provided by the conditional expression (22).

However, when the focal lengths for the lenses h16 and h17 are increased, the size of a light spot on the end surface of the emission SM optical fiber 10 included in the light pickup block h11' becomes, as shown in FIG. 19A, too large for the mode field diameter for the emission SM optical fiber 10. This degrades the efficiency in gathering light on the emission SM optical fiber 10.

According to the present embodiment, the powers of the lenses h16 and h17 in the first-axis direction can be determined independently of those in the second-axis direction. As for the first-axis direction in which light fluctuates, the focal length in the first-axis direction for the lens h16 is determined to meet the conditions provided by the conditional expressions (25) and (26). As for the second-axis direction in which light does not fluctuate, the focal length in the second-axis direction for the lens h17 is determined to meet the condition provided by the conditional expression (27). Consequently, the light spot of on the end surface of the optical fiber included in the light pickup block becomes as shown in FIG. 19B. The size of the light spot is approximated to the mode field diameter for the emission SM optical fiber 10 included in the light pickup block h11'. This leads to drastic improvement of the efficiency in gathering light on the emission SM optical fiber.

According to the present invention, an optical length variation optical system capable of varying an optical length within a wide range that determines a wide scanned length can be realized. In the optical length variation optical system, light is efficiently gathered on an optical fiber included in a light pickup block.

Fifth Embodiment

The fifth embodiment is identical to the third embodiment except that the prism h6 included in the optical length variation optical system employed in the third embodiment is replaced with a first prism and a second prism.

FIG. 20 schematically shows the components of an optical length variation optical system employed in the present embodiment. All the components of a tomographic observation/diagnosis device realized with an optical imaging device in accordance with the present invention other than the optical length variation optical system are identical to those of the first embodiment. An overall configuration of an optical coherence tomography system will therefore be omitted.

The optical length variation optical system employed in the present embodiment consists mainly of a light introduction block h3, a pair of a first diffraction grating h4 and a first positive lens h5, a front prism h18, a rear prism h19, a pair of a second positive lens h7 and a second diffraction grating h8, and a light pickup block h11. The light introduction block h3 is composed of an incidence SM optical fiber 8 and a third positive lens 2 offering a positive power. The first diffraction grating h4 serves as a spectrum dispersing element for spatially dispersing the spectrum of light, and the first positive lens h5 offers a positive power. The front prism h18 serves as a phase modulation element for substantially linearly changing the phases of angular frequency components of the light dispersed by the spectrum dispersing element. The rear prism h19 is designed to correct a light path. The second positive lens h7 serves as a spectrum reuniting element for reuniting the phase-modulated angular frequency components of the spatially dispersed light into single light, and offers a positive power. The fourth positive lens h9 offers a positive power. These optical elements are optically interconnected.

According to the present embodiment, the first positive lens h5 and second positive lens h7 are realized with lenses offering the same focal length. The first diffraction grating h4 is located substantially at the position of the front focus of the first positive lens h3. The front prism h18 is located substantially at the position of the rear focus of the first positive lens h5 and the front focus of the second positive lens h7. The second diffraction grating h8 is located substantially at the position of the rear focus of the second positive lens h7.

The front prism h18 is a wedged prism made of a glass that is a light-transmissive material. The prism h18 is vibrated with a direction substantially perpendicular to, as indicated with arrows in FIG. 21, a direction in which light travels through the prism and a direction in which the spectrum of the light is dispersed spatially as an axis. Thus, a group delay is varied with the passage of time, and an optical length is varied.

For vibrating the front prism h18, a mechanism having the front prism h18 attached to a shaft having a galvanometer is widely adopted. Any other mechanism will also do.

Moreover, the rear prism h19 for correcting a light path is designed to bring the direction of propagation of light bent largely by the front prism h18 back to the original direction. According to the present embodiment, the wedged portion of the rear prism has the same angle as that of the front prism h18, and the refractive index of the rear prism is the same as that relative to the front prism h18. The rear prism is located upside down immediately behind the front prism h18. Moreover, the rear prism h19 is devoid of a working assembly but held stationary.

Figure 22:
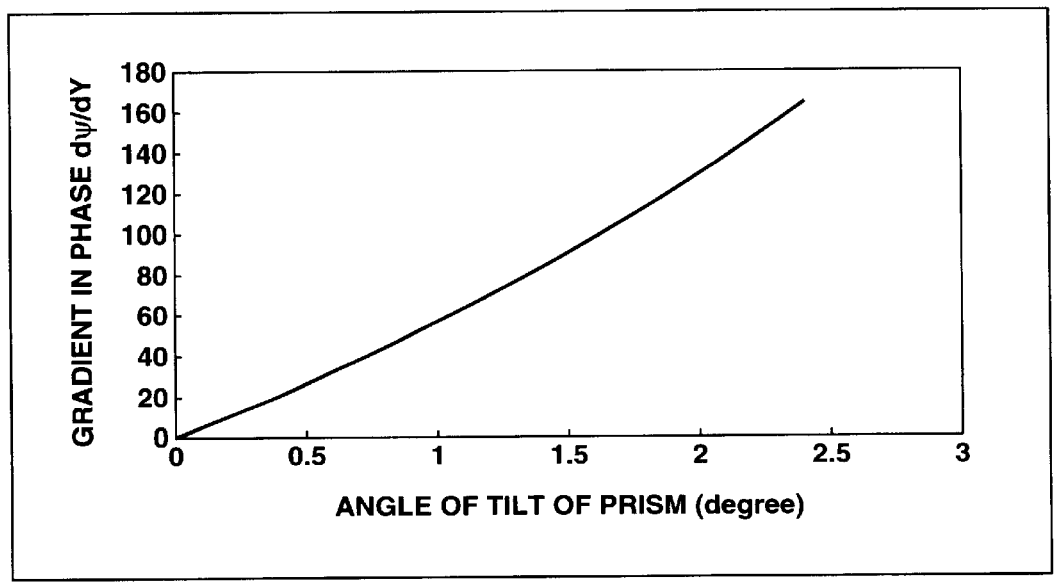

FIG. 22 is a graph indicating a gradient in a phase of light produced by the front prism h18 in relation to an angle of tilt of the front prism h18 with respect to the first diffraction grating 4.

As seen from FIG. 22, when the angle of tilt of the front prism h18 is changed, the gradient in the phase varies.

In the optical length variation optical system employed in the present embodiment, a light signal is spatially dispersed into angular frequency components by the first diffraction grating h4 in the vicinity of the front prism h18. When the angle of tilt of the front prism h18 is changed with the passage of time in order to vary the gradient in the phase with the passage of time, a group delay varies. Eventually, an optical length can be varied.

According to the present embodiment, an angle at which the front prism h18 is vibrated may be set to as small a value as several tens of milli-radians for the purpose of vibrating the front prism h18 quickly. Nevertheless, the focal length for the first positive lens h5 and second positive lens h7 should merely be increased. Otherwise, the spatial frequency of the first diffraction grating h4 and second diffraction grating h8 should merely be raised. Otherwise, the magnitude of dispersion should merely be increased by tilting a diffraction grating. Consequently, a group delay length can be increased. This results in an optical length variation optical system capable of varying an optical length quickly and largely.

According to the present embodiment, an ordinary axi-symmetric lens is used as the fourth positive lens h9 located behind the second diffraction grating h8. Alternatively, the fourth positive lens h9 may be realized with a cylindrical lens similarly to that employed in the fourth embodiment. This results in an optical length variation optical system offering higher efficiency in gathering light on an optical fiber included in a light pickup block.

Figure 23:
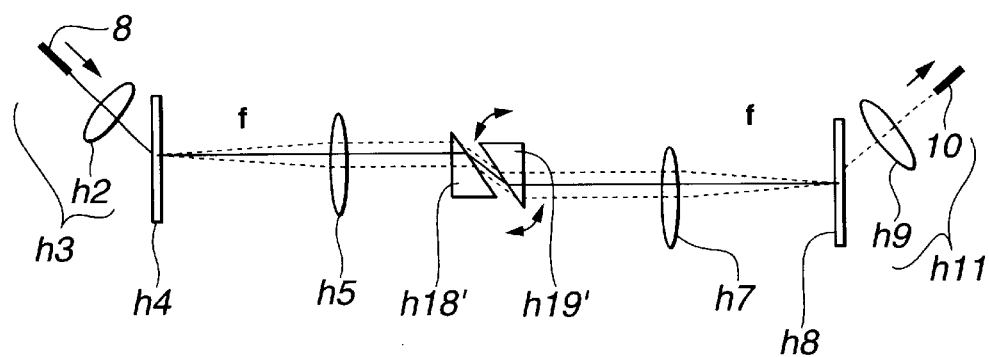

As shown in FIG. 23, the rear prism h19' shaped like a wedge may be located substantially at the position of the rear focus of the first positive lens h5 and the front focus of the second positive lens 7. The front prism h18' whose wedged portion has the same angle as that of the rear prism h19' and which offers the same refractive index as the rear prism h19' may be located immediately ahead of the rear prism h19'. The front prism h18' may be held stationary. The rear prism h19' may be vibrated with a direction substantially perpendicular to both of a direction, in which light travels through the rear prism h19', and a direction, in which the spectrum of the light is spatially dispersed, as an axis. Nevertheless, the same advantages as those of the present embodiment can be provided.

Sixth Embodiment

Figure 24:
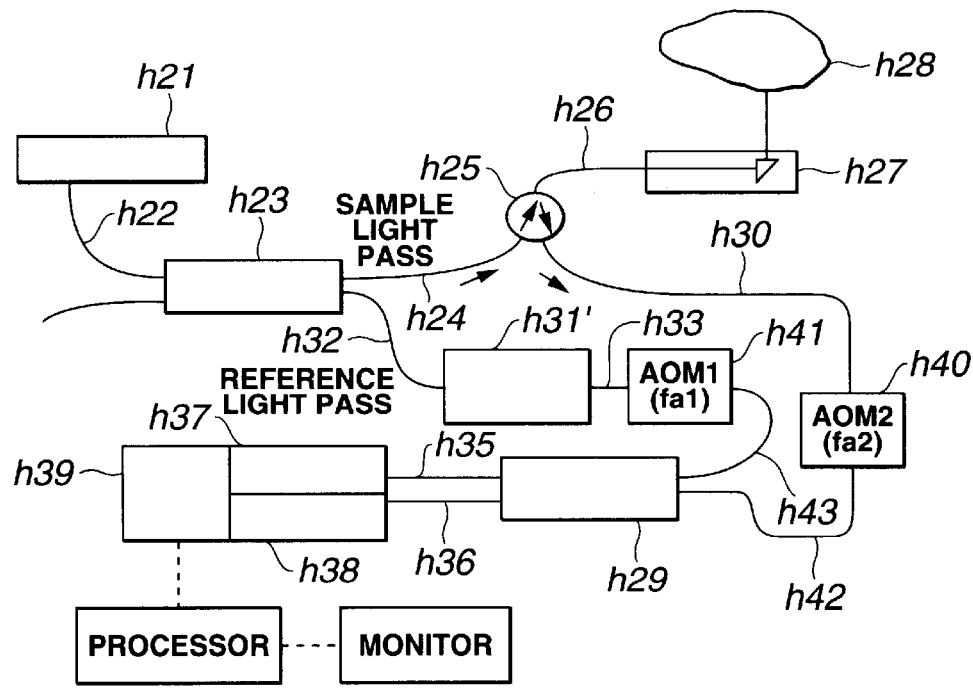
FIG. 24 to FIG. 26 are concerned with the sixth embodiment.
Figure 25:
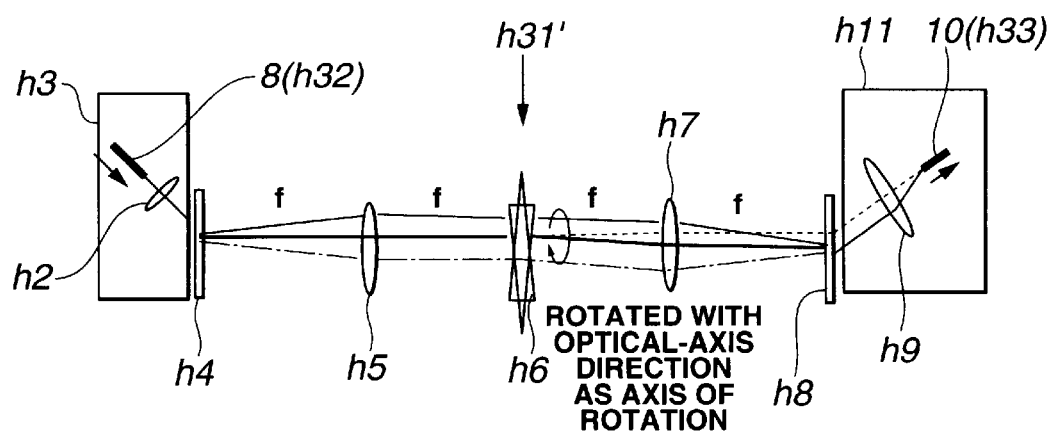
Figure 26:
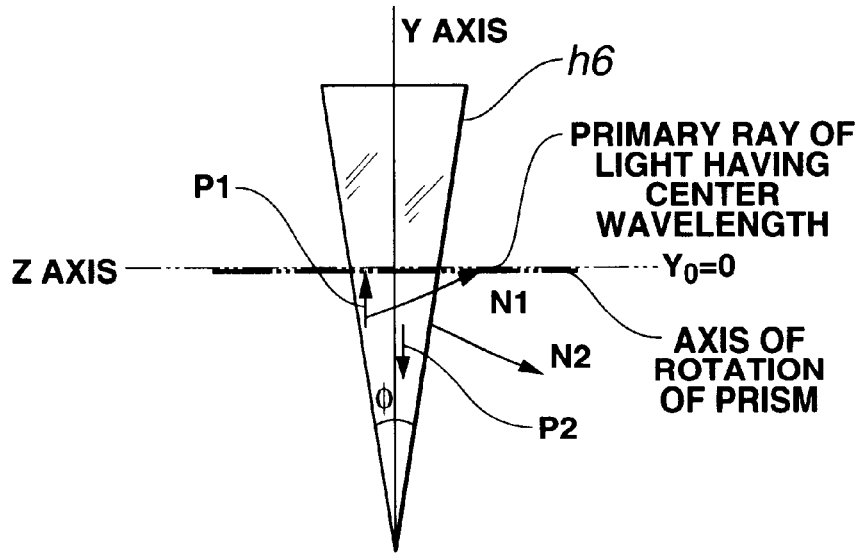

FIG. 24 to FIG. 26 show an optical tomography structure observation device realized with an optical imaging device in accordance with the sixth embodiment of the present invention, and an optical length variation optical system included in the optical imaging device.

An optical coherence tomography (OCT) system in which the optical imaging device in accordance with the present embodiment is included is configured based on a Mach-Zehnder interferometer.

As shown in FIG. 24, in an optical tomography structure observation system realized with the optical imaging device in accordance with the present embodiment, light emanating from a low coherent light source h21 is routed to a first coupler h23 over a single-mode optical fiber h22. The light is then split into sample light and reference light by the first coupler h23.

The sample light is irradiated to an object (object of measurement) h28 by way of a single-mode optical fiber h24, an optical circulator h25, a single-mode optical fiber h26, and a sample light distal optical system h27. Light reflected from the object h28 is returned to the optical circulator h25 by way of the sample light distal optical system h27 and single-mode optical fiber h26. The sample light returned to the optical circulator h25 is selectively guided into a single-mode optical fiber h30 leading to a second acoustooptic element (AOM) h40. The light is then routed to a second coupler h29 over a single-mode optical fiber h42 via the second acoustooptic element h40.

On the other hand, the reference light is routed to an optical length variation optical system h31' over a light introduction single-mode optical fiber h32 led to the optical length variation optical system h31'. The light incident on the optical length variation optical system h31' has an optical length therefor varied. Thereafter, the light is propagated over a single-mode optical fiber h33 for light pickup, and then routed to the second coupler h29 over a single-mode optical fiber h43 via a first acoustooptic element (AOM) h41.

The sample light guided over a sample light path and the reference light guided over a reference light path are synthesized by the second coupler h29. The second coupler h29 outputs a resultant interfering signal. The interfering signal produced by the second coupler h29 is distributed and routed to a first detector h37 and a second detector h38 over single-mode optical fibers h35 and h36 respectively. The first detector h37 and second detector h38 detect the intensity of the light. The first detector h37 and second detector h38 constitute a difference detector h39. When an interfering signal is to be detected, a signal component serving as the interfering signal is acquired but the other component (dc component) is removed.

In the optical length variation optical system h31' employed in the optical tomography structure observation device realized with the optical imaging device in accordance with the present embodiment, unlike the one employed in the first embodiment, the axis of rotation of the wedged prism h6 is, as shown in FIG. 25, coincident with a path along which a principal ray of light having the same wavelength as the center wavelength of the light passes through the wedged prism h6. The other components are identical to those of the first embodiment.

Specifically, the optical length variation optical system h31' employed in the present embodiment consists mainly of a light introduction block h3, a pair of a first diffraction grating h4 and a first positive lens h5, a wedged prism h6, a pair of a second positive lens h7 and a second diffraction grating h8, and a light pickup block h11. The light introduction block h3 is composed of an incidence SM optical fiber 8 corresponding to the light introduction single-mode optical fiber h32 shown in FIG. 24, and a third positive lens h2 offering a positive power. The first diffraction grating h4 serves as a spectrum dispersing element for spatially dispersing the spectrum of light, and the first positive lens h5 offers a positive power. The wedged prism h6 serves as a phase modulation element for substantially linearly changing the phases of angular frequency components of the light dispersed by the spectrum dispersing element. The second positive lens h7 serves as a spectrum reuniting element for reuniting the phase-modulated angular frequency components of the spatially dispersed light into signal light. The light pickup block h11 is composed of a fourth positive lens h9 offering a positive power and an emission SM optical fiber 10 corresponding to the light pickup single-mode optical fiber h33 for light pickup shown in FIG. 24. These optical elements are optically interconnected.

The wedged prism h6 is made of a glass that is a light-transmissive material.

According to the present embodiment, lenses offering the same focal lens are used as the first positive lens h5 and second positive lens h7. Moreover, the first positive lens h5 and second positive lens h7 are arranged so that their optical axes will be aligned with each other. The first diffraction grating h4 is located substantially at the position of the front focus of the first positive lens h3. The wedged prism h6 is located substantially at the position of the rear focus of the first positive lens h5 and the front focus of the second positive lens h7. The second diffraction grating h8 is located substantially at the position of the rear focus of the second positive lens h7.

The wedged prism h6 is disposed to be able to rotate with a direction substantially parallel to a direction of propagation of light as an axis. The axis of rotation of the wedged prism h6 is, as shown in FIG. 26, coincident with a path along which through which the principal ray of light having the same wavelength as the center wavelength of the light passes through the wedged prism. Herein, the principal ray of light is introduced from the light introduction block h3.

The wedged prism h6 is oriented so that the absolute values of lengths of vectors P1 and P2 will not change despite the rotation of the wedged prism. Herein, the vectors P1 and P2 are defined as orthogonal projections of a unit vector N1 normal to the face of the wedged prism h6 and a unit vector N2 normal to the back thereof.

Incidentally, the normal unit vectors N1 and N2 are defined with an intersection between the z axis and the face or back of the wedged prism h6 as an origin so that the vector N1 or N2 will meet the direction of propagation of light at an acute angle.

According to the present embodiment, a group delay length Lg and a phase delay length Lp are calculated by assigning Yo=0 in the formulae (7) and (8) discussed in relation to the first embodiment. A shift $\Delta F$ in the center frequency of light is calculated using the phase delay length Lp. Herein, Yo=0 is a condition for aligning the axis of rotation of the wedged prism with the path along which the principal ray of light having the same wavelength as the center wavelength of light passes through the wedged prism. Namely, the group delay length Lg, phase delay length Lp, and shift $\Delta F$ in the center frequency of light are expressed as the formulae (28) to (30) below.

$$Lg = (K/\cos\theta) \cdot f \cdot N \cdot \lambda o \cos\alpha \quad (28)$$

$$Lp = 0 \quad (29)$$

$$\Delta F = 0 \quad (30)$$

The formulae (28) to (30) demonstrate that according to the present embodiment, when the wedged prism h6 is rotated, an optical length varies but the center frequency of light does not shift.

For optical heterodyne detection, at least one of the reference light and sample light must undergo a frequency shift. According to the first to fifth embodiments, the frequency shift is produced using the optical length variation optical system h31. According to the present embodiment, the frequency shift in light required for optical heterodyne detection is produced using the first acoustooptic element. (AOM) h41 for handling reference light and the second acoustooptic element h40 for handling sample light. Assume that frequency shifts in light produced by the first acoustooptic element h41 and second acoustooptic element h40 are Fa1 and Fa2, and the center frequency of light is Of. In this case, the center frequency of reference light having passed through the first acoustooptic element h41 is provided as Fo+Fa1. The center frequency of sample light having passed through the second acoustooptic element h40 is provided as Fo+Fa2. A beat frequency Fb of coherent light produced in accordance with the present embodiment is expressed below.

$$Fb = |Fa1 - Fa2|$$

In general, the frequency shifts Fa1 and Fa2 produced by the acoustooptic elements are constant. The beat frequency Fb of coherent light therefore remains constant. When the beat frequency is constant, a transmission band set in a bandpass filter to which an interfering signal is fed after converted into an electric signal can be narrowed. This leads to an improved signal-to-noise ratio.

By the way, according to the first to fifth embodiments, the optical length variation optical system serves as an optical element for changing the center angular frequency of light. The first to fifth embodiments have therefore the merit that an optical coherence tomography system can be configured simply and inexpensively.

According to the sixth embodiment, an acoustooptic element is located on both the paths of reference light and sample light. Alternatively, an acoustooptic element may be disposed on either of the reference light path and sample light path. Nevertheless, the same advantages as those of the sixth embodiment can be provided.

Moreover, the light pickup block may be configured using the same cone lenses as those employed in the second embodiment. Nevertheless, the same advantages as those of the sixth embodiment can be provided.

Furthermore, according to the present embodiment, the wedged prism h6 is used as a phase modulation element included in the optical length variation optical system h31'. The same phase modulation element and light pickup block as those included in the optical length variation optical systems employed in the third to fifth embodiments may be adopted. Nevertheless, when a point on the phase modulation element which does not change the phase of an angular frequency component of light is aligned with a point thereon through which a center angular frequency component thereof passes, the same advantages as those of the sixth embodiment can be provided.

Seventh Embodiment

The seventh embodiment will be described in conjunction with FIG. 27 to FIG. 30B.

Figure 27:
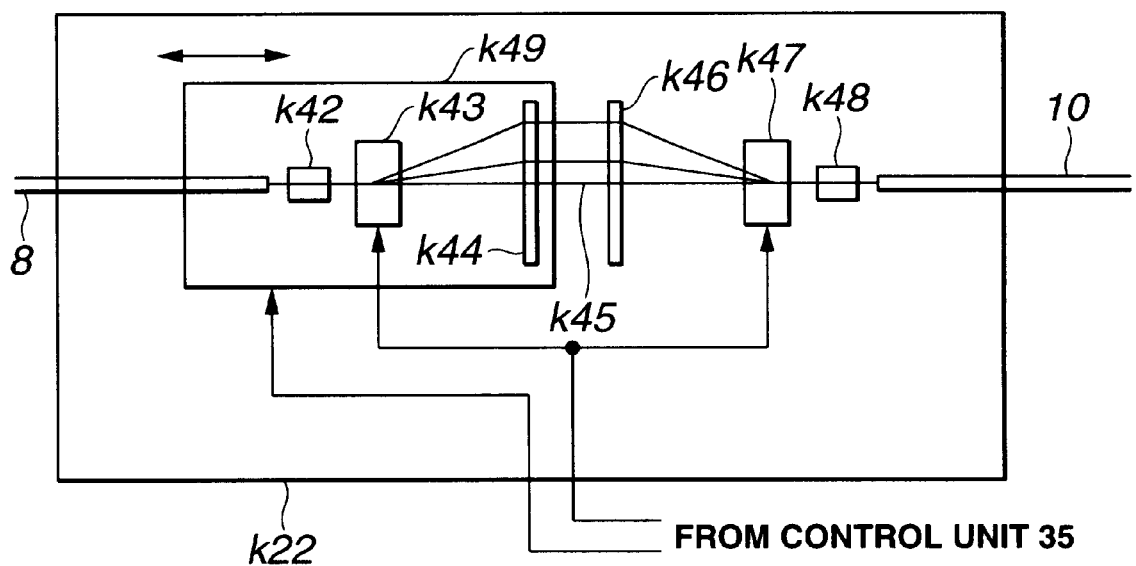

FIG. 27 shows the components of the optical length variation optical system 9 shown in FIG. 1.

As shown in FIG. 27, the optical length variation optical system 9 consists mainly of a first collimator k42, a first acoustooptic deflector k43, a first Fresnel lens k44, a second Fresnel lens k46, a second acoustooptic deflector k47, a second collimator k48, and a movable stage k49. The optical length variation optical system 9 varies an optical length for light by about several millimeters for the purpose of detecting light scattered or reflected from a specified range of a living tissue in a depth direction, that is, the direction of an optical axis. The first collimator k42 quickly converts light emitted from the incidence SM optical fiber 8 into light of parallel rays. The first acoustooptic deflector k43 deflects the light beam. The first Fresnel lens k44 makes the deflected light beam parallel to an optical axis k45. The second Fresnel lens k46 routes the light parallel to the optical axis k45 to the second acoustooptic deflector k47. The second acoustooptic deflector k47 aligns incident light with the optical axis k45. The second collimator k48 efficiently routes the light to the emission SM optical fiber 10. The movable stage k49 is movable along the optical axis according to the length of the optical scanner probe.

The Fresnel lenses k44 and k46 are thin lenses each having a lot of prisms arranged in the form of stepped setbacks.

The incidence SM optical fiber 8, first collimator k42, first acoustooptic deflector k43, and Fresnel lens k44 are fixed to the movable stage k49 and moved together with the movable stage k49. In other words, a variation of an optical length due to a difference in the length of one optical scanner probe from another is adjusted using the movable stage k49.

Figure 28:
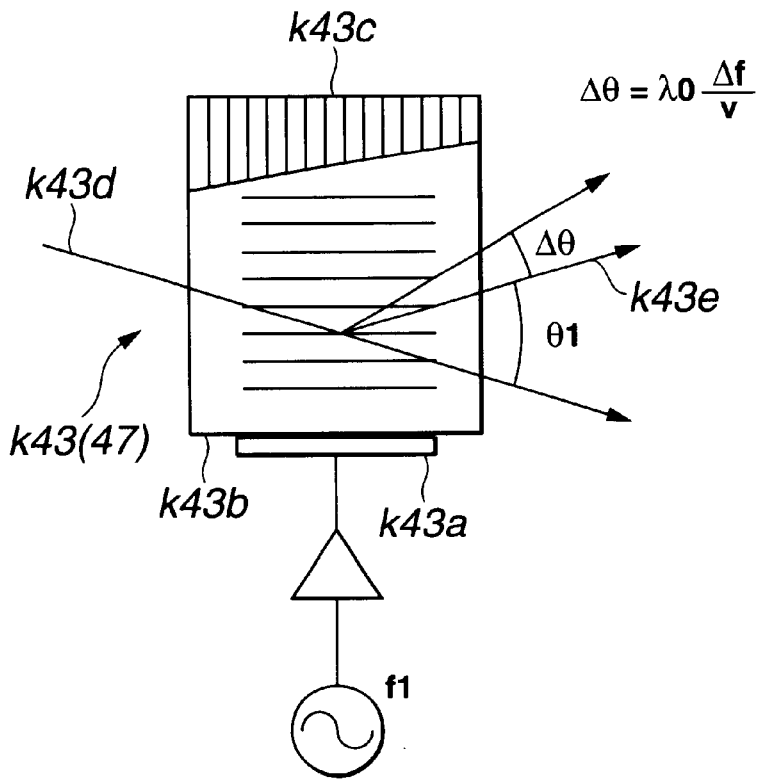

FIG. 28 shows the details of the acoustooptic deflector k43 or k47.

The acoustooptic deflector is an optical element for applying ultrasonic waves to a medium to change the refractive index of the medium, and thus diffracts light to control the direction of light. The acoustooptic deflector k43 (k47) consists of a transducer k43a, an optical medium k43b, and a sound absorbing medium k43c. The transducer k43a is made of LiNbO$^3$ or the like and generates ultrasonic waves. The optical medium k43b is made of a fused quartz, tellurite glass, gallium phosphide, indium phosphide, or the like. For example, when light k43d is routed to the optical medium k43b and ultrasonic waves f1 are applied to the transducer k43a, the refractive index of the optical medium k43b changes. Consequently, first-order diffracted light k43e is generated. Assuming that the first-order diffracted light is θ1, it is expressed as follows:

$$θ1=λ0×f1/v \tag{31}$$

where λ0 denotes the wavelength of light in a vacuum, f1 denotes an ultrasonic frequency, and v denotes a sound velocity.

When the ultrasonic frequency is changed from f1 to Δf, an angle of displacement Δθ of the diffracted light is expressed as the formula below.

$$Δθ=λ0×Δf/v \tag{32}$$

A variation of an optical length will be described in conjunction with FIG. 29.

Figure 29:
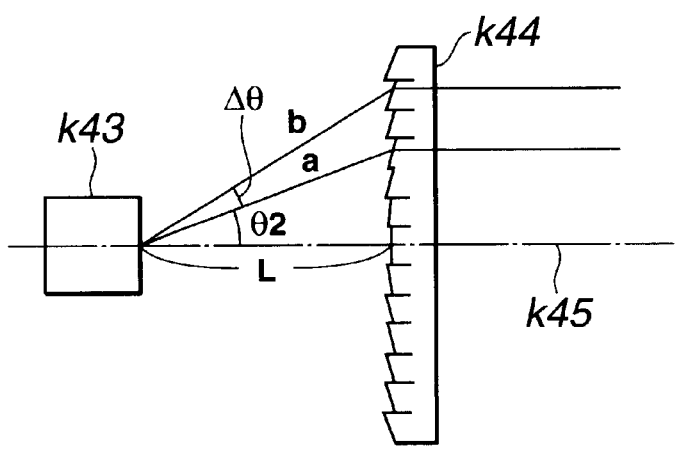

As shown in FIG. 29, the acoustooptic deflector k43 and Fresnel lens k44 are disposed so that they will be separated from each other by a distance corresponding to the focal length L for the Fresnel lens k44. A difference between an optical length a for light deflected by an angle θ2 with respect to the optical axis k45 by the acoustooptic deflector k43 and an optical length b for light deflected by an angle of θ2+Δθ is calculated as expressed below.

$$b-a=L/\cos θ2-L/\cos(θ2+Δθ) \tag{33}$$

Light emitted from the incidence SM optical fiber 8 is collimated by the first collimator k42, and deflected by the first acoustooptic deflector k43. The first Fresnel lens k44 causes the deflected light to travel parallel to the optical axis k45. Consequently, the optical length for the light is varied by a magnitude corresponding to the difference calculated according to the formula (33).

According to the present embodiment, light is routed to the emission SM optical fiber 10 by reversing the operations described previously. In this case, the variation of the optical length is double the variation calculated according to the formula (3). When light is irradiated for scanning under the conditions below, the variation of the optical length is plotted as shown in FIG. 30A or FIG. 30B.

$v=5.1$ km/sec $λ0=1.3$ μm $L=20$ cm

Figure 30A:
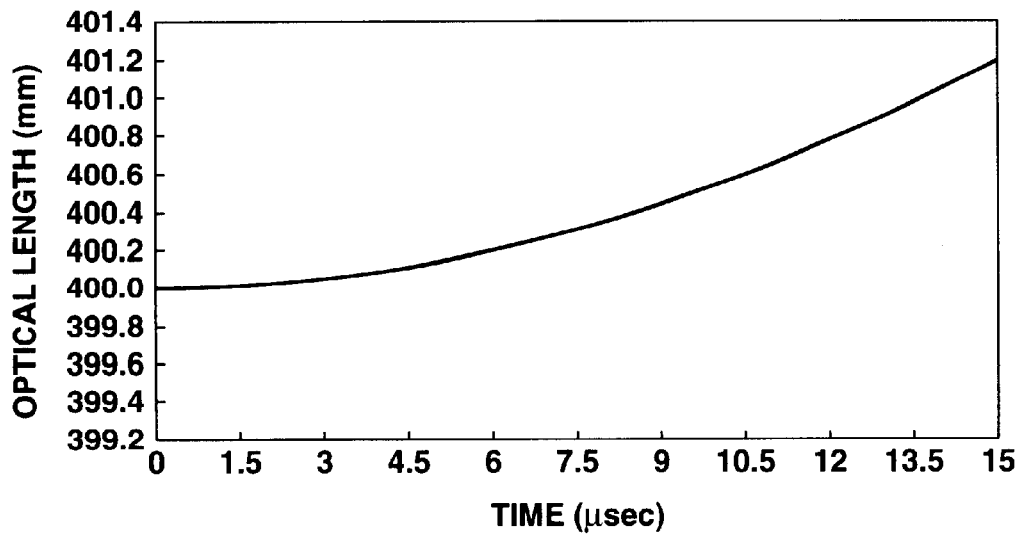
FIG. 30A is the second explanatory diagram concerning the actions to be performed in the optical length variation optical system.
Figure 30B:
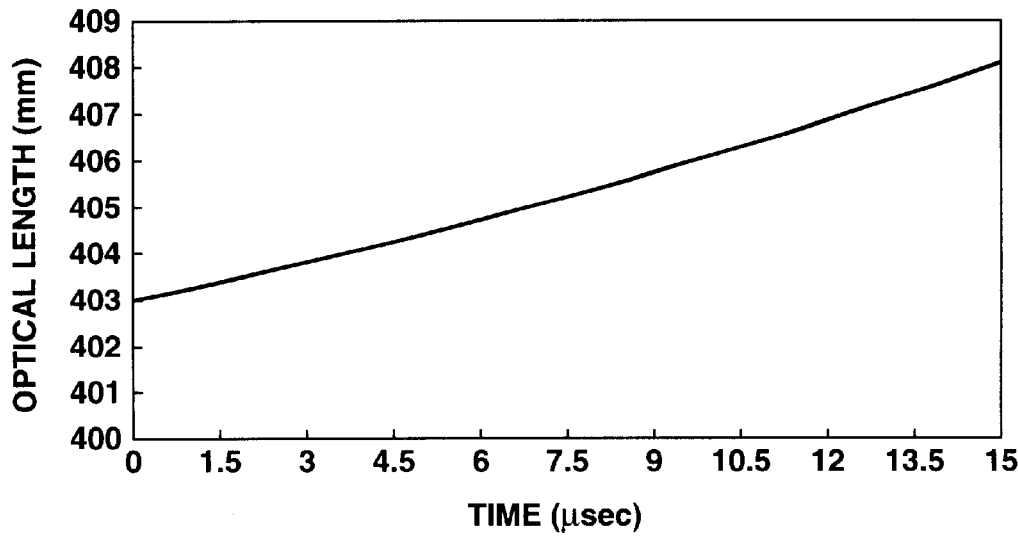
FIG. 30B is the third explanatory diagram concerning the actions to be performed in the optical length variation optical system.

Δf=300 M Hz/15 μs (For example, the frequency is changed to produce a sawtooth waveform.)

θ2=0° or θ2=7° (When θ2=0°, that is, when light is propagated along the optical axis k45, the variation of the optical length is plotted as shown in FIG. 30A. When θ2=7°, that is, when light is propagated at an angle of 7° with respect to the optical axis 45, the variation of the optical length is plotted as shown in FIG. 30B. Specifically, when θ2=0°, the variation of the optical length is about 1.2 mm. When θ2=7°, the variation of the optical length is 5 mm.) When θ2=7°, compared with when θ2=0°, the variation of the optical length is constant. Specifically, when θ2=7°, that is, when light is propagated at an angle or off the optical axis, the optical length can be varied largely and linearly. Consequently, an excellent interfering signal can be produced. According to the present embodiment, θ2 is set to 7°.

As mentioned above, according to the present embodiment, the frequency of ultrasonic waves to be applied to the acoustooptic deflector k43 or k47 should merely be changed. Nevertheless, compared with a conventional mechanical scanning means such as a motor, a driving means employed in the present embodiment can achieve fast driving. Consequently, successive optical tomographic images can be quickly produced with a high signal-to-noise ratio.

Moreover, the linearity in the variation of the optical length is high, and the efficiency in the variation is high. When an optical element included in the optical length variation optical system is driven in proportion to the sine of an angle of rotation or displacement of 90° or 27°, the variation of an optical length is quite nonlinear. This degrades the efficiency in variation and the signal-to-noise ratio.

Figure 31:
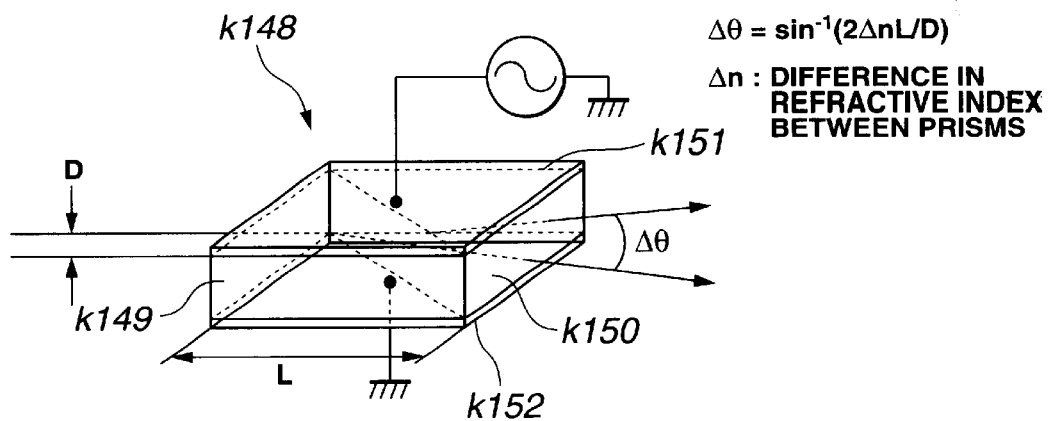

FIG. 31 shows the structure of a first variant of the acoustooptic deflectors k43 and k47 serving as an optical scanning means and being shown in FIG. 27.

An electrooptic deflector kl48 of the first variant is, like the acoustooptic deflectors k43 and k47, an optical element for deflecting light. The electrooptic deflector k148 may be substituted for the acoustooptic deflectors k43 and k47. Nevertheless, the same advantages as those described above can be provided.

The electrooptic deflector k148 is, as shown in FIG. 31, made by bonding electrooptic crystals k149 and k150 so that the optic axes of the crystals will extend mutually oppositely, and placing electrodes k151 and k152 on the crystals. Light having a diameter D is routed to the electrooptic crystal k149, and a voltage V is applied to the electrodes k151 and k152. Consequently, the refractive indices for the electrooptic crystals k149 and k150 become different from each other by Δn. As a result, the optical axis of the electrooptic deflector is displaced by Δθ.

Δθ, the length L of an electrooptic crystal, and the diameter D of light have the relationship expressed by the following formula:

$$\Delta\theta = \sin^{-1}(2\Delta nL/D) \tag{34}$$

where Δn varies with the applied voltage V. Namely, light can be deflected by changing the applied voltage V.

Figure 32A:
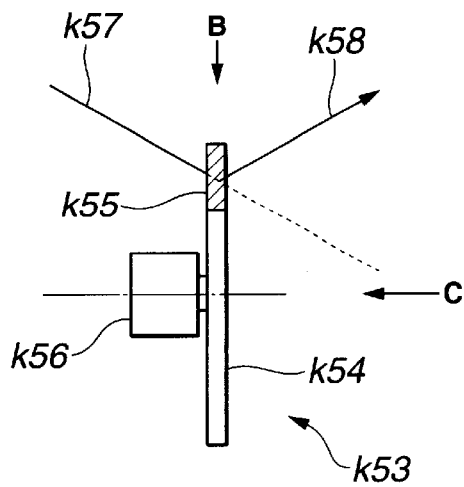
FIG. 32A is the first diagram showing the second variant of the optical scanning means.
Figure 32B:
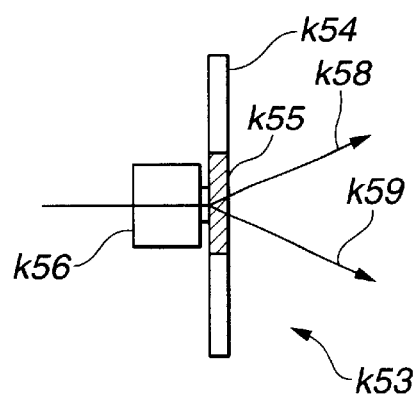
FIG. 32B is the second diagram showing the second variant of the optical scanning means.
Figure 32C:
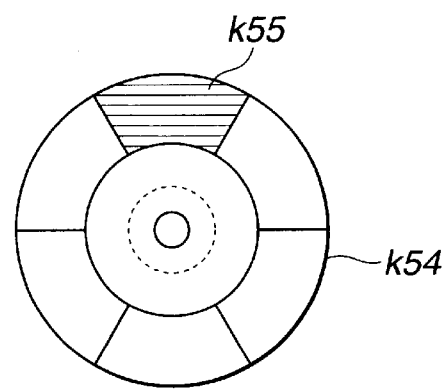
FIG. 32C is the third diagram showing the second variant of the optical scanning means.

FIG. 32A to FIG. 32C show the structure of a hologram scanner k53 that is a second variant of the acoustooptic deflectors k43 and k47. The hologram scanner k53 is, like the acoustooptic deflectors k43 and k47, an optical element for deflecting light.

FIG. 32A shows the side view of the hologram scanner k53. FIG. 32B shows the top view of the hologram scanner, that is, shows the hologram scanner seen from a direction B in FIG. 32A. FIG. 32C shows the right-hand side view of the hologram scanner, that is, shows the hologram scanner seen in a direction C in FIG. 32A.

As seen from FIG. 32A to FIG. 32C, the hologram scanner k53 of the second variant has a plurality of hologram elements k55 arranged concentrically on a rotary disk k54. The rotary disk is rotated using a motor k56. When light k57 is routed to the hologram element k55, the light k57 is deflected while being diffracted. This results in light k58. When the rotary disk is further rotated using the motor k56, the light k58 is changed to light k59, that is, an angle of deflection is changed according to the position of the hologram element k55 on which light falls. Linear gratings or hologram lenses may be used as the hologram elements.

The hologram scanner k53 of the second variant is inexpensive compared with the acoustooptic elements and electrooptic element.

Figure 33:
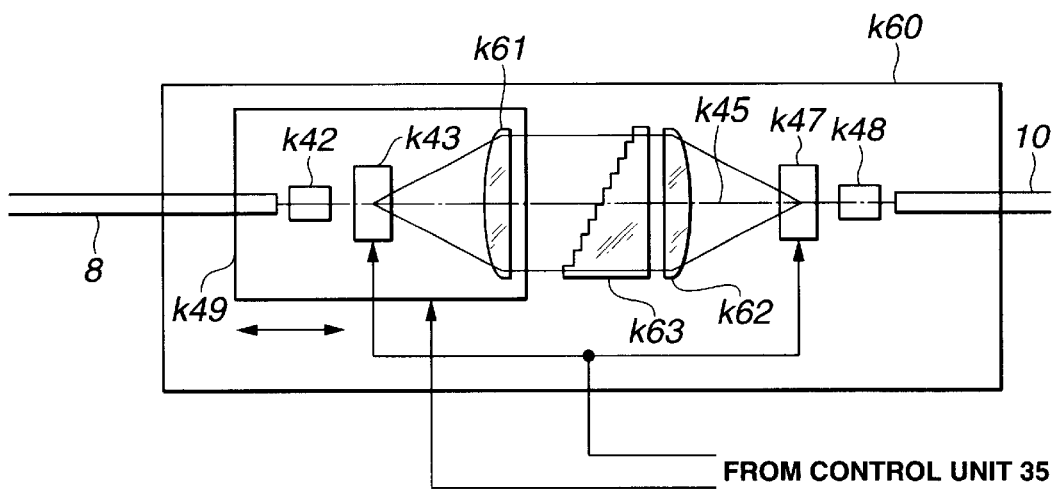

FIG. 33 shows the components of a variant of the optical length variation optical system 9 shown in FIG. 1. Only differences from the optical length variation optical system 9 will be described. The same reference numerals will be assigned to identical components, and the description of the components will be omitted.

An optical length variation optical system k60 that is a variation of the optical length variation optical system 9 has, as shown in FIG. 33, first and second convex lenses k61 and k62 disposed in place of the Fresnel lenses k44 and k46. A stepped optical block k63 is interposed between the first and second convex lenses k61 and k62.

Figure 34:
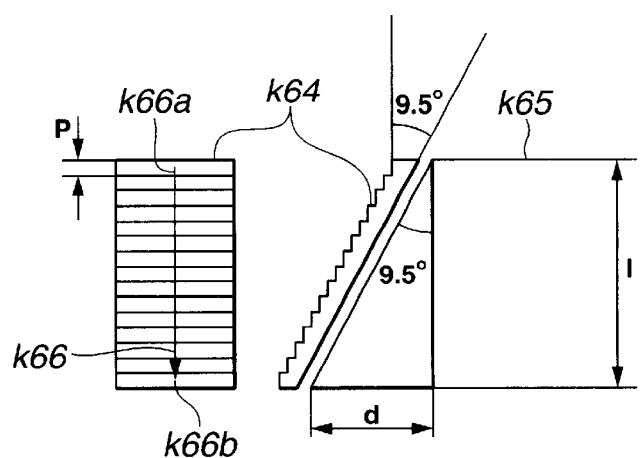

The optical block k63 is, as shown in FIG. 34, made by bonding a micro-prism array k64 to a triangular prism k65. For example, the micro-prism array consists of 200 microscopic prisms offering a refractive index n=1.5, and being stepped at an angle θ=9.5 with a pitch p=0.3 mm between adjoining prisms. The triangular prism k65 offers a refractive index n=1.5, and has a length l=60 mm and a thickness d=10 mm.

Light emitted from the incidence SM optical fiber 8 is collimated into light of parallel rays having a diameter φ of about 0.2 mm by a first collimator k42, and deflected by a first acoustooptic deflector k43. The deflected light is propagated parallel to an optical axis k45 by the first convex lens k61. The parallel light is transmitted by the optical block k63.

When the first acoustooptic deflector k43 deflects light so that light will impinge on a point on a light path k66 to pass through the optical block k63, an optical length for the light varies depending on the point on the optical block.

For example, a difference in optical length between light impinging on a point k66a and light impinging on a point k66b is calculated by multiplying a difference between distances propagated by the light beams by a difference between refractive indices offered by the optical block. In the above case, the optical length difference is calculated as d×(n−1.0)=60×(1.5−1.0)=5 mm. The optical block exhibits a resolving power of 25 μm calculated by dividing 5 mm by the number of stepped micro-prisms that is 200. Furthermore, the light transmitted by the optical block k63 is routed to one point on the second acoustooptic deflector k47 owing to the second convex lens 62, and introduced to the emission SM optical fiber 10 in the same manner as that traveling in the optical length variation optical system 9 (See FIG. 33).

The pitch between adjoining ones of the micro-prisms constituting the optical block, the number of micro-prisms, the length of the optical block, and the thickness thereof are not limited to the aforesaid values. By modifying the values, the resolving power of the optical block and a scanned range can be varied.

In the optical length variation optical system k66 that is a variant of the optical length variation optical system 9, a maximum optical length difference can be varied readily by modifying the optical block.

Eighth Embodiment

Figure 35A:
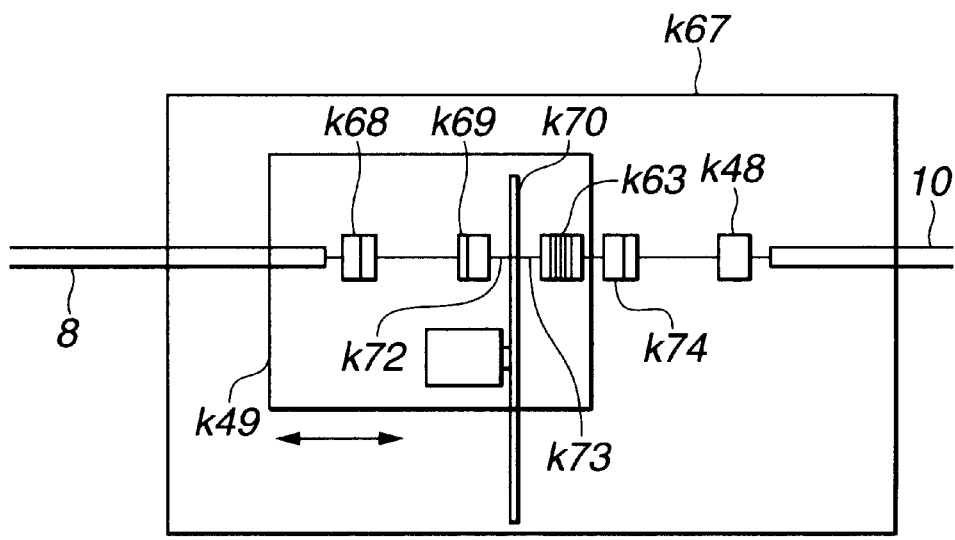
Figure 35B:
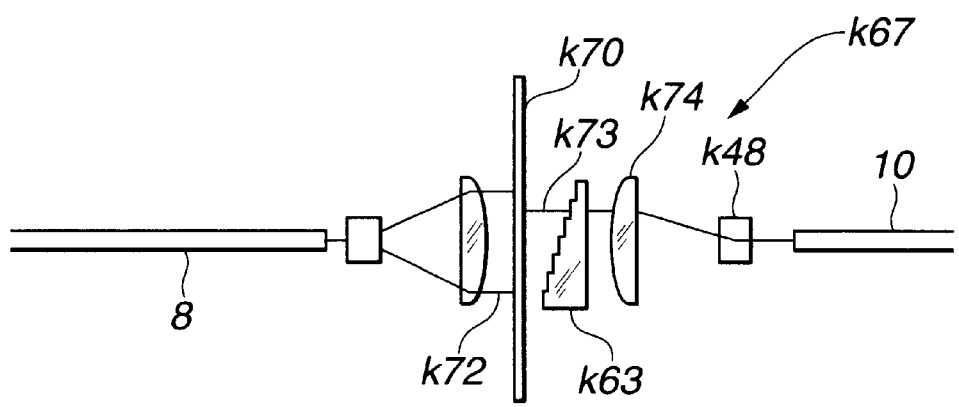
FIG. 35B is the second diagram showing the components of the optical length variation optical system.

FIG. 35A and FIG. 35B show the components of an optical length variation optical system employed in the eighth embodiment of the present invention. Differences of the optical length variation optical system employed in the present embodiment from the optical length variation optical system 9 will be described below. The same reference numerals will be assigned to identical components, and the description of the identical components will be omitted.

As shown in FIG. 35A and FIG. 35B, an optical length variation optical system k67 employed in the present embodiment consists mainly of a first cylindrical lens k68, a second cylindrical lens k69, a rotary disk k70, an optical block k63, a third cylindrical lens k74, and a second collimator k48. The first cylindrical lens k68 fans out light emitted from the incidence SM optical fiber 8. The second cylindrical lens k69 converts the fanned-out light into light of parallel rays. The rotary disk k70 has a plurality of oblong slits k71a to k71h (see FIG. 36) bored therein, and can be rotated. Part of the light k72 of parallel rays is passed through the slits k71a to k71h, and recomposed into light k73. The third cylindrical lens k74 causes the light k73 to fall on the emission SM optical fiber 10.

The first cylindrical lens k68 is made by bonding convex and concave cylindrical lenses while displacing them by 90°, and thus fans out light.

Light emitted from the incidence SM optical fiber 8 is fanned out by the first cylindrical lens k68, and recomposed into light of parallel rays k72 by the second cylindrical lens k69.

Figure 36:
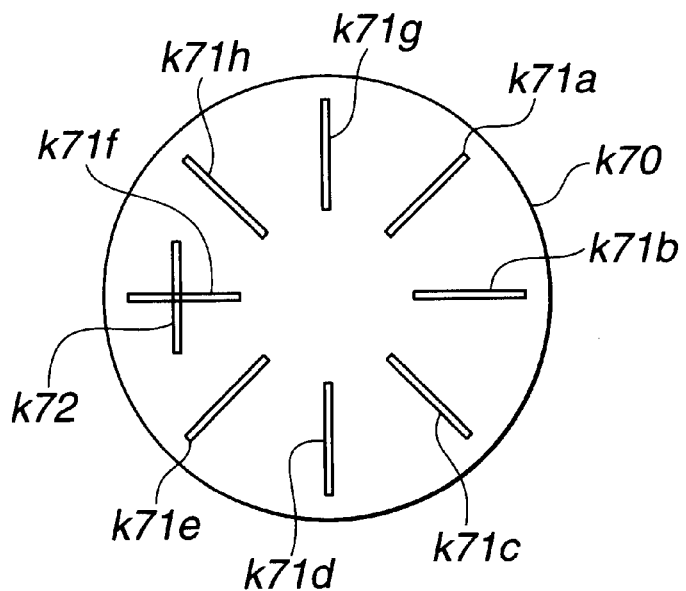

As shown in FIG. 36, the rotary disk k70 has the plurality of oblong slits k71a to k71h bored therein. When the rotary disk k70 is rotated, the slits traverse the light of parallel rays k72. Consequently, light passing through the rotary disk k70 is converted into the light k73. Since the angle of rotation of the rotary disk changes, the light hits a different point on the optical block k63.

For example, the eight slits of the rotary disk k70 have a width of 0.1 mm and a length of about 10 mm, and are equidistantly arranged radially. When the rotary disk is rotated at 24000 rpm, 3200 points on the optical block are hit by light per sec.

Assuming that an image on a screen is composed of 512 scanning lines, 6.25 images are produced per sec. Incidentally, the width and length of the rotary disk, the number of slits thereof, and the rotating speed thereof are not limited to the foregoing values. By modifying the values, a scanning speed can be varied.

The light k73 quickly hitting the optical block k63 is transmitted by the optical block k63. The path of the light varies depending on a point on the optical block k63 to be hit by the light. Furthermore, the light k73 is routed to the emission SM optical fiber 10 owing to the cylindrical lens k74 and second collimator k48.

Figure 37:
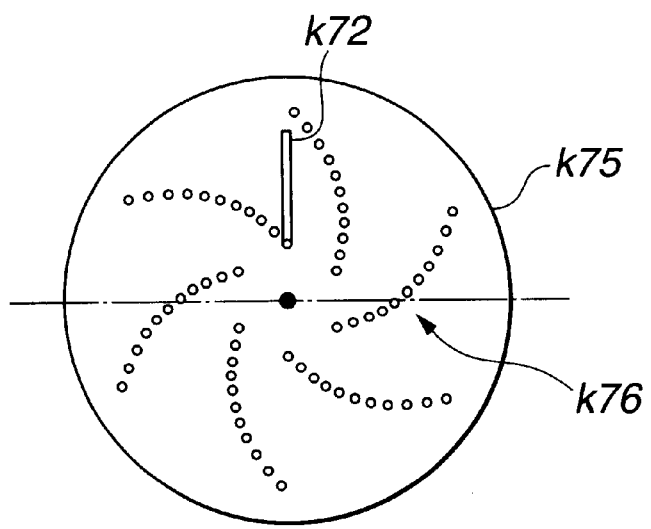

FIG. 37 shows the structure of a variant of the rotary disk shown in FIG. 35. A second rotary disk k75 has a plurality of pinholes k76 bored therein. The pinholes traverse the light of parallel rays k72 while being displaced. In other words, when the second rotary disk k75 is rotated, the optical block can be hit with the light similarly to with the light k73 in FIG. 35. This type of rotary disk is generally known by the name of Nipkow's disk.

According to the present embodiment, an expensive component such as an acoustooptic deflector is unnecessary. A scanned range or a range scanned with light is wide, and a high resolving power can be offered. Incidentally, the angle of deflection by which the acoustooptic deflector can deflect light is small.

Ninth Embodiment

Figure 38:
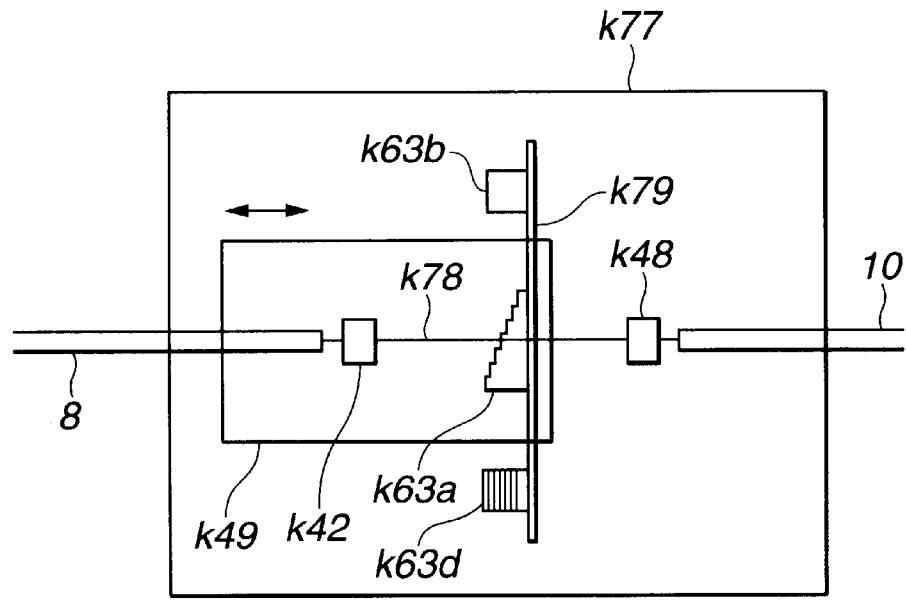
FIG. 38 to FIG. 41 are concerned with the ninth embodiment.

FIG. 38 shows the components of an optical length variation optical system employed in the ninth embodiment of the present invention. Differences from the optical length variation optical system k67 shown in FIG. 35A will be described. The same reference numerals will be assigned to identical components, and the description of the components will be omitted.

Figure 39:
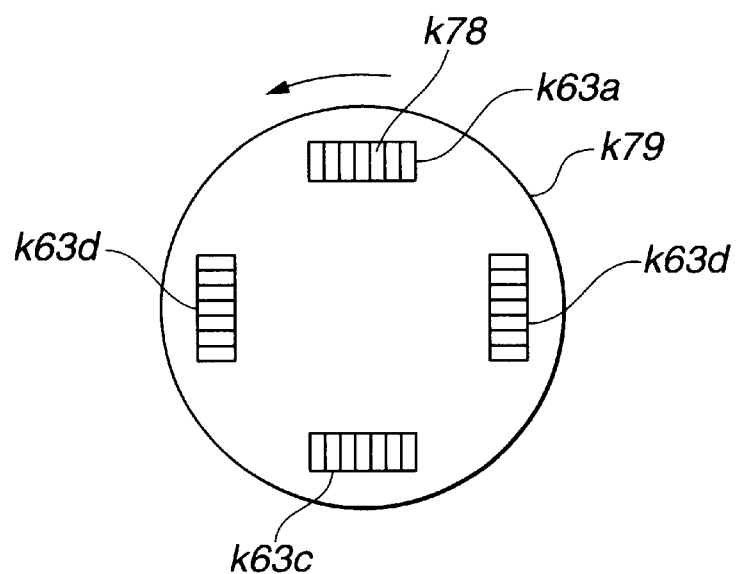

As shown in FIG. 38, an optical length variation optical system k77 employed in the present embodiment consists mainly of a first collimator k42 and a third rotary disk k79 (see FIG. 39). The first collimator k42 collimates light emitted from the incidence SM optical fiber 8 and producing light of parallel rays k78. The third rotary disk k79 has optical blocks k63a to k63d, which resembles the optical block k63, fixed thereto.

According to the present embodiment, the light k78 is not deflected but travels along the optical axis. The optical blocks k63a to k63d traverse the light, whereby the optical length for the light is varied.

According to the present embodiment, four optical blocks are equidistantly arranged. As the number of optical blocks increases, the number of hit points per one turn of the rotary disk increases.

Figure 40:
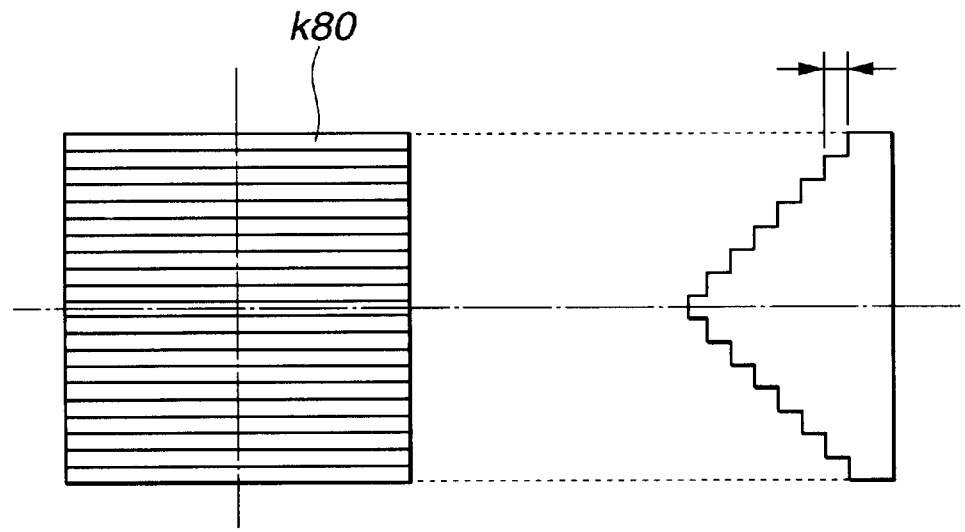
Figure 41:
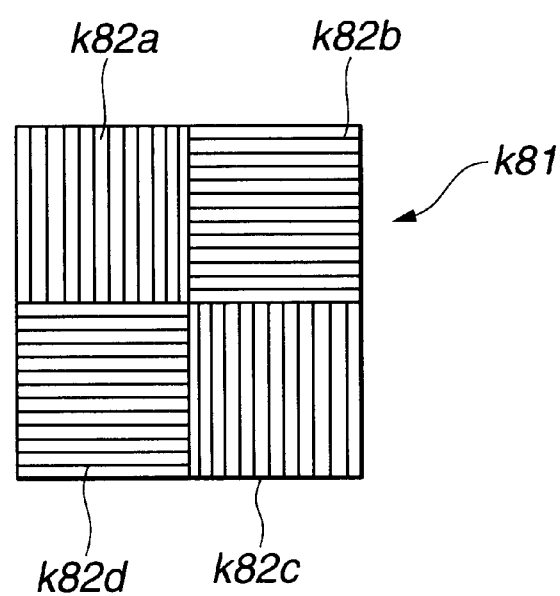

Moreover, an optical block k80 may be unified with a rotary disk as shown in FIG. 40. The optical block k81 is hit with light at a rate of two points per turn. Otherwise, a rotary disk k81 may be, as shown in FIG. 41, made by bonding optical blocks k82a to k82d that resemble the optical block k81 shown in FIG. 40.

As mentioned above, according to the present embodiment, an expensive optical element such as an acoustooptic deflector is unnecessary. A signal-to-noise ratio can be improved without decay in the intensity of light.

Tenth Embodiment

Figure 42:
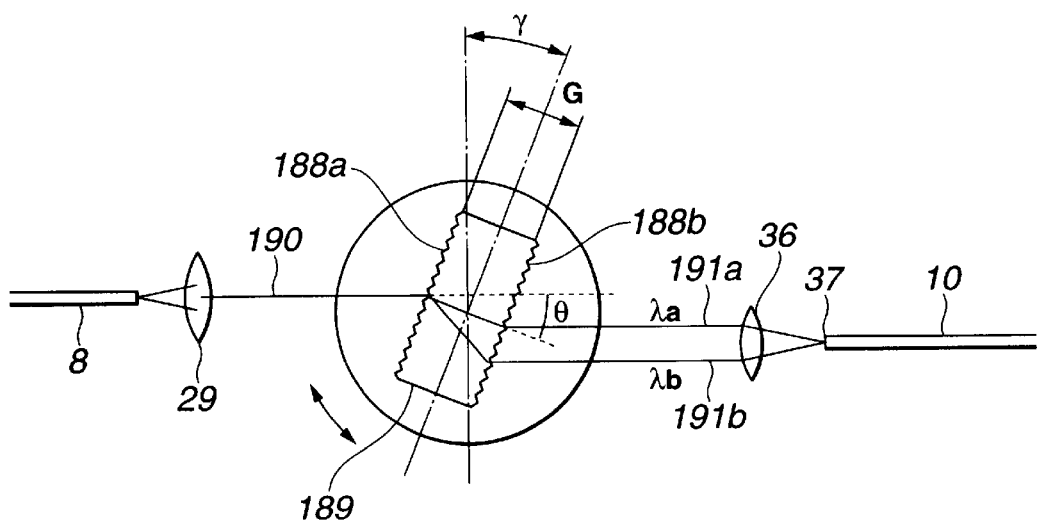
FIG. 42 to FIG. 44 are concerned with the tenth embodiment.
Figure 43:
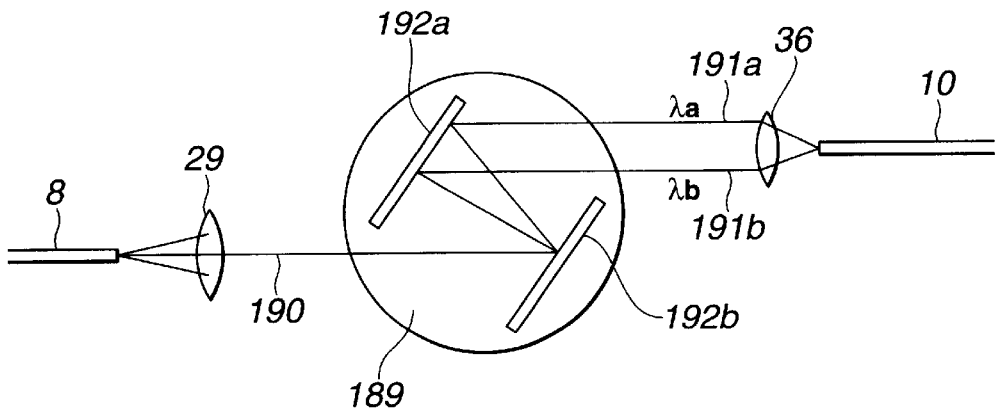
Figure 44:
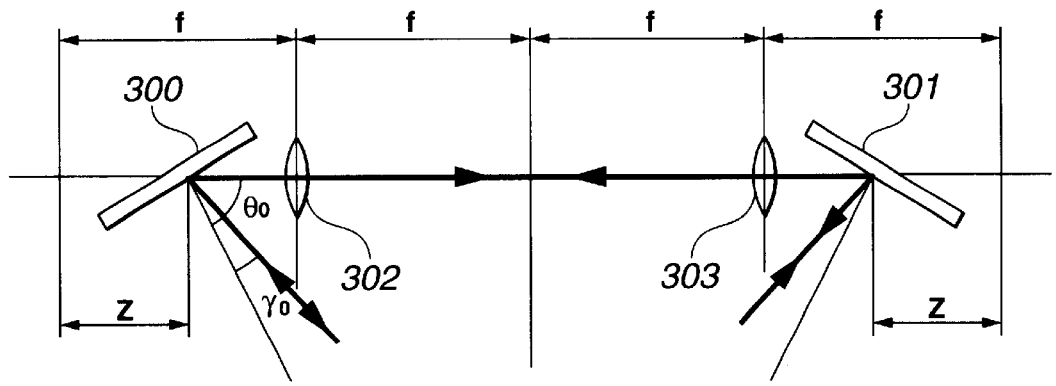

FIG. 42 to FIG. 44 are concerned with the tenth embodiment of the present invention. FIG. 42 shows the components of an optical length variation optical system. FIG. 43 shows the components of a variation of the optical length variation optical system. FIG. 44 is an explanatory diagram concerning the details of the components of the optical elements shown in FIG. 43.

The tenth embodiment is nearly identical to the first embodiment. Only differences will be described below. The same reference numerals will be assigned to the same components, and the description of the components will be omitted.

(Constituent Features and Operations)

In the optical length variation optical system 9 employed in the present embodiment, unlike in the one employed in the first embodiment, light emitted from the incidence SM optical fiber 8 is, as shown in FIG. 42, collimated into incident light of parallel rays 190 by a collimator lens 29 and routed to a pair of transmissive diffraction gratings 188a and 188b. Rays of the incident light having a small wavelength are diffracted by a small angle of diffraction by the diffraction grating 188a. Rays thereof having a large wavelength are diffracted by a large angle of diffraction. The diffraction grating 188b is opposed to the diffraction grating 188a parallel thereto. Diffracted light beams 191a and 191b are therefore parallel to the incident light 190 and routed to the emission SM optical fiber 10 owing to a collimator lens 36. The optical length for the light 191a having small wavelengths differs from the optical length for the light 191b having large wavelengths according to the wavelength and an angle of rotation y shared by the pair of transmissive diffraction gratings 188a and 188b. A phase change that differs with a wavelength occurs, and a propagation time changes. The foregoing changes will be described in conjunction with formulae. The relationship among an angle of rotation γ of the diffraction gratings 188a and 188b, a pitch p, a diffraction order m, a wavelength λ, and an angle of diffraction θ is expressed as follows:

$$\theta = \gamma - \sin^{-1}(\sin \gamma - 2\pi cpm/\omega)$$

where c denotes a light velocity and ω denotes the frequency of light.

A difference l in optical length between light transmitted by the pair of diffraction gratings 188a and 188b and light passing through no diffraction grating is expressed as follows:

$$l = G(1 - \cos \theta)/\cos(\gamma - \theta)$$

where G denotes a distance between the diffraction gratings 188a and 188b. The absence of the diffraction gratings on the path of light is comparable to a phase change in light, φ, that is expressed below.

$$\phi = \omega l/c = \omega l G(1 - \cos \theta)/c \, \cos(\gamma - \theta)$$

When light undergoes a group delay (a change in propagation time), the optical length for the light is expressed as follows:

$$\Delta lg = c \, tg = -c\delta\phi/\delta\omega$$

where tg denotes the group delay and is expressed as tg=−δφ/δω.

The pair of transmissive diffraction gratings 188a and 188b is fixed to a rotary stage 189. Assume that the wavelength λ is 1.3 μm, a wavelength bandwidth is 60 nm, a pitch between adjoining ones of slits constituting the diffraction grating is 50 mm, and a diffraction order is 1. In this case, when the rotary stage 189 is reciprocated several times, a propagation time changes along with a variation of several millimeters of the optical path for light. When an electromagnetic coil is used in combination with a resonant scanner utilizing resonance, the rotary stage can be reciprocated several times at a high speed comparable to a frequency of several kilohertz. Consequently, the pair of diffraction gratings can be quickly hit with light.

(Advantages)

The present embodiment can provide the same advantages as the first embodiment. In addition, the arrangement of optical elements is so simple that costs can be reduced. Moreover, since rapid scanning is enabled, real-time observation is realized.

FIG. 43 shows a variant of the present embodiment. A difference from the pair of diffraction gratings shown in FIG. 42 lies in a point that a pair of reflective diffraction gratings 192a and 192b is substituted for the pair of transmissive diffraction gratings. The other optical elements are nearly identical to those shown in FIG. 42.

Aside from the diffraction gratings disposed parallel to each other, prisms, acoustooptic elements, or any other dispersion elements may be opposed to each other. Nevertheless, the same advantages as those described above can be provided.

When the pair of diffraction gratings shown in FIG. 42 is employed, the diffraction gratings bring about phase dispersion expressed as follows:

$$\phi'' = \delta^2 \phi / \delta \omega^2$$

where $\phi$ denotes a phase and w denotes an angular frequency.

Assuming that a coherence length required by light emanating from a light source is lco, the phase dispersion causes the coherence length lco to increase to be a coherence length lco' expressed below.

$$lco' = \text{approx.} \ \sqrt{(1+15(ln)^2 \phi''2/(lco/c)^4)} \cdot lco$$

This leads to a poor resolving power in a depth direction.

Employed as a practical arrangement of the optical elements shown in FIG. 43 is a dispersion compensation optical system including, as shown in FIG. 44, diffraction gratings 300 and 301 and lenses 302 and 303. Assuming that a focal length for the lenses 302 and 303 is f, the distance of the diffraction gratings from the foci of the lenses is Z, an angle of diffraction of the diffraction gratings is θ, and a pitch between adjoining ones of slits constituting the diffraction gratings is N, the phase dispersion is expressed below.

$$\phi'' = \lambda^3 Z / \pi (cN \cos \theta)$$

The phase dispersion is thus approximated to 0 with the angle of rotation set to a certain value. Consequently, a coherence length required by light traveling through an optical length variation optical system becomes equal to that required by light emanating from a light source.

Moreover, addition of a pair of stationary diffraction gratings resembling the pair of transmissive diffraction gratings 188a and 188b capable of reciprocating enables compensation of dispersion.

The present variant can provide the same advantages as the embodiment shown in FIG. 26. In addition, a degradation of a resolving power in a depth direction can be compensated.

Eleventh Embodiment

Figure 45:
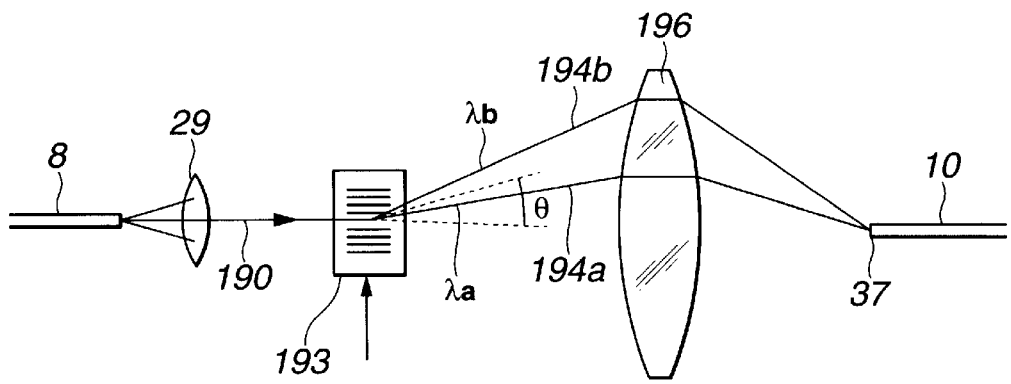
FIG. 45 shows the components of an optical length variation optical system employed in the eleventh embodiment.

FIG. 45 shows the components of an optical length variation optical system employed in the eleventh embodiment of the present invention.

The eleventh embodiment is nearly identical to the first embodiment. Differences alone will be described below. The same reference numerals will be assigned to identical components, and the description of the components will be omitted.

(Constituent Features and Operations)

In the optical length variation optical system 9 employed in the present embodiment, light emitted from the incidence SM optical fiber 8 falls, as shown in FIG. 45, on an acoustooptic element 193 after being collimated to be light of parallel rays 190 by a collimator lens 29. Rays of the light 190 having a small wavelength are diffracted by a small angle of diffraction by the acoustooptic element 193 and propagated along a light path 194a. In contrast, rays thereof having a large wavelength are diffracted by a large angle of diffraction thereby and propagated along a light path 194b. A lens 195 exhibits chromatic aberration, and part of the lens 195 exhibiting especially intense a chromatic aberration and lying away from the optical axis is used to converge the light on the end 37 of the emission SM optical fiber 10.

The optical length for the rays having a short wavelength and traveling along the path 194a is different from that for the rays having a large wavelength and traveling along the path 194b. The optical length difference depends on the wavelength and an angle θ (with respect to a path of a ray of light emanating from the light source which has the same wavelength as the center frequency of the light). The angle θ varies depending on the frequency of a driving voltage to be applied to the acoustooptic element. Consequently, a phase change that differs with the wavelength occurs, and a propagation time changes.

(Advantages)

As mentioned above, the present embodiment provides the same advantages as those of the first embodiment. In addition, the frequency of a driving voltage to be applied to the acoustooptic element is as high as about megahertz. This enables rapid scanning. Moreover, the frequency of the driving voltage to be applied to the acoustooptic element may be set to the value of a heterodyne frequency of a demodulated signal.

Twelfth Embodiment

The twelfth embodiment is concerned with the detailed components of the optical coupler 6, optical scanner probe 20, scanning means 19, and scanning drive unit 22 employed in the first embodiment.

"Scanning single-mode fiber optic catheter-endoscope for optical coherence tomography" written by Tearney et. al (Optics Letters, P.543–545, Vol. 21, 1996) has disclosed a rotary scanner probe for optical coherence tomography. In the rotary scanner probe, an optical fiber rotates as an integral part of a shaft for rotation. An optical rotary joint is needed to splice the rotating optical fiber to a stationary optical fiber. The optical rotary joint must be manufactured with very high precision, and is generally very expensive. This poses a problem that a signal-to-noise ratio deteriorates because of an insertion loss attributable to the fact that the ends of fibers to be joined are located apart and internal reflection.

In contrast, according to the patent publication No. WO97/32182, a mirror located in the distal part of a probe is rotated using a rotation shaft independent of an optical fiber. This obviates the necessity of the optical rotary joint. However, when the rotation shaft is realized with a flexible shaft so that it can be inserted into a living body, irregular rotation occurs because of resistance stemming from bending of the flexible shaft.

Moreover, when a probe is passed through a forceps port of an endoscope, the property of causing birefringence of an optical fiber lying through the probe changes along with angling of the endoscope. Consequently, the intensity of coherent light changes.

According to the patent publication No. WO97/32182, there is a case where high-power laser light for use in treatment is introduced to an observation optical fiber. In practice, the observation optical fiber is a single-mode optical fiber and the core of the optical fiber has as small a diameter as several micrometers. If treatment laser light were introduced to the observation optical fiber, the optical fiber itself would be damaged to hinder observation. Anyhow, it is impossible to select an optical fiber suitable for transmission of treatment laser light in terms of its specifications.

A probe to be applied to a living body must be detached from an observation device so that it can be cleaned, sterilized, disinfected, or replaced with a new one because of its degraded optical properties.

Some low coherent light sources employed for optical coherence tomography can continuously glow only for a short period of time. When an optical imaging device including such a light source is not operated, if the light source is caused to glow, the service life of the light source is shortened greatly. In particular, a light source emits invisible light or low-power light, it may be unaware that light is reflected from a region to be observed.

According to the patent publication No. WO97/32182, there is a case where high-power laser light for use in treatment is introduced into an observation optical fiber. When an optical imaging device including the observation optical fiber is not operated, if the laser light is kept emitted, a transmission fiber or any other optical element is heated and consequently has its service life shortened.

Figure 46:
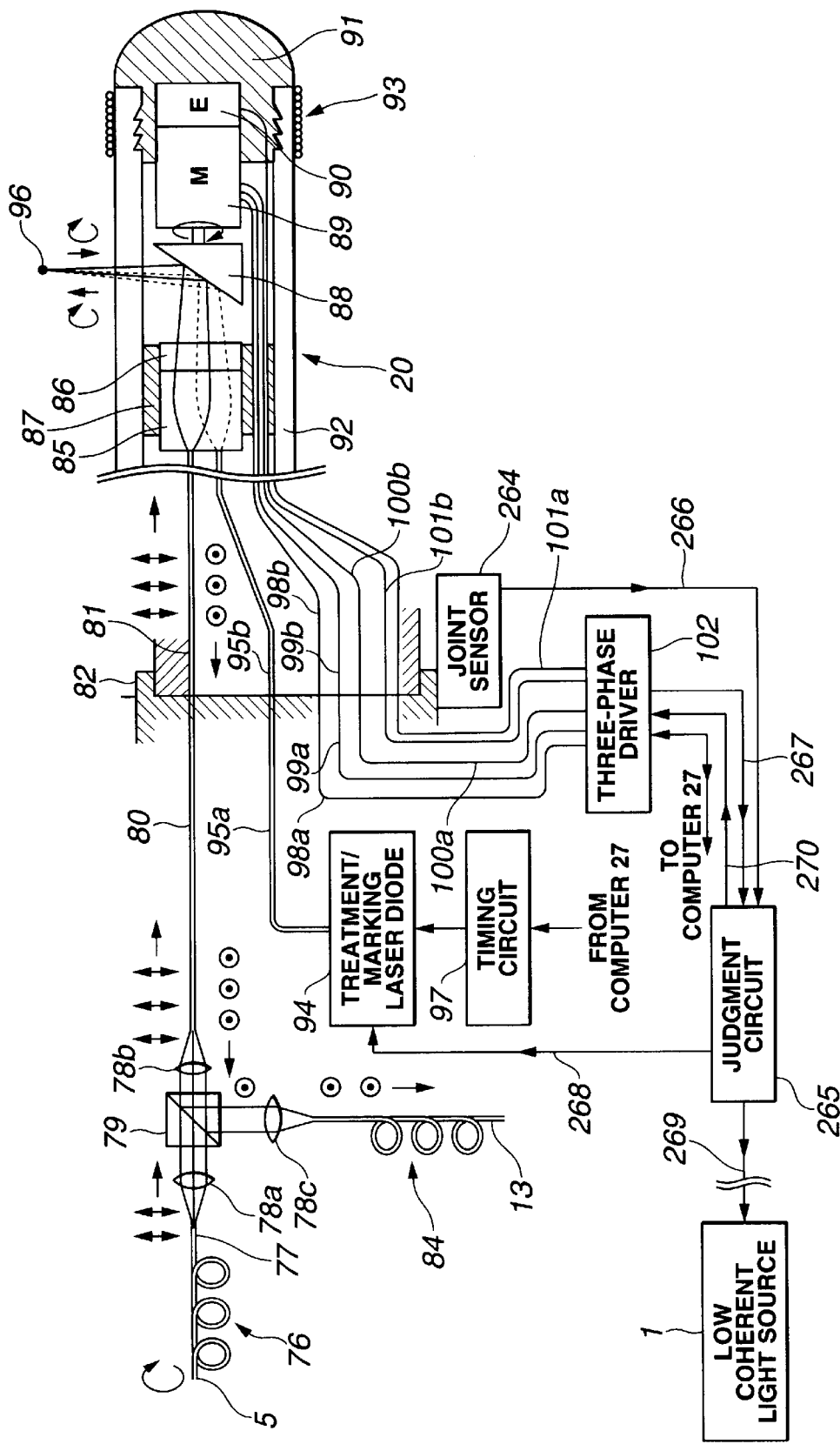
FIGS. 46 to FIG. 51 are concerned with the twelfth embodiment.

Referring to FIG. 46, the optical coupler 6 consists mainly of collimator lenses 78a, 78b, and 78c, and a polarization beam splitter (hereinafter PBS) 79. The scanning means 19 consists mainly of a rotary mirror 88, a motor 89, and an encoder 90. The scanning drive unit 22 is realized with a three-phase driver 102.

Light propagated over the third SM optical fiber 5 is converted into linearly polarized light, which vibrates up and down in the sheet of the drawing, by a polarization controller (PC) 76, and routed to the emission end 77 of the controller. Resultant light is routed to the PBS 79 owing to the collimator lens 78a. The PBS 79 does not reflect the linearly polarized light that vibrates up and down in the sheet of the drawing, but transmits it. The light transmitted by the PBS 79 is routed to a first polarization-maintaining optical fiber 80, which realizes the SM optical fiber 21a, owing to the collimator lens 78b.

The polarization-maintaining (hereinafter PM) optical fiber is an optical fiber capable of propagating light while maintaining two orthogonal planes of polarization exhibited by the light, or more particularly, maintaining one of the two orthogonal planes of polarization on a stable basis.

The first PM optical fiber 80 is spliced to a second PM optical fiber 81. A connector 82 matches the orientations of the planes of polarization of incident light with those of emitted light so that light will be propagated with the planes of polarization maintained. The second PM optical fiber 81 maintains the linearly polarized light that vibrates up and down in the sheet of the drawing. A gradient index lens 85 and a quarter-wave plate 86 are located at the end of the second PM optical fiber 81 in the distal part of the thin tubular probe. The gradient index lens 85 and quarter-wave plate 86 are locked in a light-transmissive sheath 92 while being accommodated by a lens frame 87. The linearly polarized light emitted from the second PM optical fiber 81 is converted into circularly polarized light by the quarter-wave plate 86. Light emitted from the gradient index lens 85 and quarter-wave plate 86 is routed to lateral part of the probe by a rotary mirror 88, and converged at a focus 96 through the sheath 92. Light reflected or scattered from an object located near the focus 96 is routed to the second PM optical fiber 81 via the quarter-wave plate 87 and gradient index lens 85. At this time, the light reflected or scattered from the object is circularly polarized light. The reflected or scattered light is converted into linearly polarized light, which vibrates vertically to the sheet of the drawing, when being transmitted by the quarter-wave plate 86. A Faraday rotator or any other optical rotary power element for rotating the plane of polarization by 450 may be substituted for the quarter-wave plate 86. Nevertheless, the same advantages as those provided with employment of the quarter-wave plate 86 can be provided.

The second PM optical fiber 81 can also hold and propagate linearly polarized light that vibrates vertically to the sheet of the drawing. Light reflected or scattered from an object, that is, linearly polarized light that vibrates vertically to the sheet of the drawing is propagated from the second PM optical fiber to the first PM optical fiber 80 through the connector 82. At this time, the planes of polarization exhibited by the light are maintained. The linearly polarized light that vibrates vertically to the sheet of the drawing is routed to the PBS 79 owing to the collimator lens 78b after being emitted from the first PM optical fiber 80. The PBS 79 reflects only the linearly polarized light, which vibrates vertically to the sheet of the drawing, downwards in the sheet of the drawing. Thereafter, the light emitted from the first PM optical fiber 80 is routed to the end 83 of the fourth SM optical fiber 13 owing to the collimator lens 78c. The light is then converted from linearly polarized light to any polarized light by a polarization controller 84, and propagated over the fourth SM optical fiber 13.

The rotary mirror 88 is attached to the shaft of the motor 89 having the encoder 90 for detecting an angle of rotation, and rotated by the motor 89. The motor 89 and encoder 90 are locked in a distal cap 91. The distal cap 91 is locked in the sheath 92 using a bobbin winder fastener 93. The rotary mirror 88 rotates with the rotation of the motor 89, and circumferentially irradiates light emitted from the light source and circumferentially receives light reflected or scattered from an object.

The motor 89 is a brushless dc motor and driven and controlled by the three-phase driver 102. The motor 89 and three-phase driver 102 are connected to each other over three pairs of driving cables 98a and 98b, 99a and 99b, and 100a and 10b. Each pair of driving cables is spliced to each other at the connector 82. The encoder 90 and three-phase driver 102 are linked by a pair of signal cables 101a and 101b. Signals of phases A, B, and Z (one pulse per rotation) are placed on the signal cables. The three-phase driver causes the rotary mirror 88 to rotate by one turn in response to a signal output from the encoder 90, and outputs information of an angle of rotation at the same time. But for the encoder 90, the rotation of the motor may be controlled based on three driving signals that are mutually different in phase. Even in this case, the rotary mirror can be rotated on a stable basis. The information of an angle of rotation of the motor is input to the computer 27 shown in FIG. 1.

Moreover, a treatment/marking laser diode 94 may be included. Laser light is propagated over laser multi-mode optical fibers 95a and 95b. The end of the multi-mode optical fiber 95b is located near the end of the second PM optical fiber 81 in the distal part of the probe. The emission end of the multi-mode optical fiber 95b is positioned so that the laser light will be focused near the focus 96 at which light emitted from the second PM optical fiber 81 is converged owing to the gradient index lens 85 and rotary mirror 88. Emission of laser light is controlled by a timing circuit 97 according to a command output from the computer 27.

Figure 47:
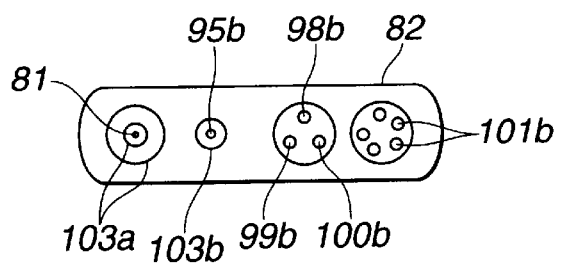

FIG. 47 shows the contacts in the connector 82 (on the side facing the probe). Aligning means 103a and 103b to which the end of the second PM optical fiber 81 and the end of the multi-mode optical fiber 95b are attached are formed for accurate alignment. The connector 82 is sideways oblong. Anyhow, the planes of polarization maintained by the first PM optical fiber 80 can be matched with those maintained by the second PM optical fiber 81.

The connector 82 has a coupling sensing means 264 for sensing coupling of the optical scanner probe to the connector 82, and outputs a coupling sense signal 266. Moreover, the three-phase driver outputs a scanning sense signal 267 when it is sensed based on an output of the encoder 90 or a driving signal that the rotating speed of the mirror driven by the motor 89 has become equal to or larger than a certain value. The coupling sense signal 266 and scanning sense signal 267 are input to a judgment circuit 265. When the coupling sense signal 266 represents logical 1, the judgment circuit 265 outputs a scanning enabling signal 270 to the three-phase driver 270. Rotation for scanning is then started. When both the coupling sense signal 266 and scanning sense signal 267 represent logical 1, a low coherent light emission enabling signal 269 is fed to the low coherent light source 1 or a laser driving enabling signal 268 is fed to the laser diode 94. Even when the timing circuit 97 commands emission of laser light, unless the laser driving enabling signal 268 is fed to the laser diode 94, the laser diode 94 does not emit laser light.

The low coherent light source may be driven only when rotation for scanning is under way with the probe attached to an observation device realized by the optical imaging device in accordance with the present embodiment. This leads to the extended service life of the low coherent light source.

Moreover, the laser diode may be driven only when rotation for scanning is under way with the probe attached to an observation device realized with the optical imaging device in accordance with the present embodiment. This prevents an optical system from being damaged with heat dissipated from an optical fiber or an optical element.

Furthermore, since the motor located in the distal part of the probe is used to rotate the rotary mirror, compared with when the rotary mirror is rotated using a flexible shaft, the connector can be structured simply. Moreover, rotation can be performed on a stable basis owing to the absence of any fluctuating load such as friction between the flexible shaft and sheath.

The optical imaging device in accordance with the present invention realizes an observation device offering a high signal-to-noise ratio and including a radial-scan probe that is free from irregular rotation. Moreover, an electrical system and an optical system can be readily installed at the same time in the observation device.

Moreover, intense laser light for use in treatment that cannot be propagated over a single-mode (SM) optical fiber for propagating signals can be introduced.

Furthermore, when an ordinary optical coupler is employed, it is unavoidable that light being introduced to a probe and light being returned from the probe undergo a loss of ½, or in other words, that light emanating from a light source undergoes a total loss of ¾. In contrast, owing to the combination of a polarization controller, a polarization beam splitter, a PM optical fiber, and a quarter-wave plate (or an optical rotatory power element), light can be propagated high efficiently.

Moreover, a PM optical fiber is used to propagate light within a probe. It will therefore not take place that the polarized state of light traveling over an optical fiber changes along with angling of the probe to adversely affect detection.

Figure 48:
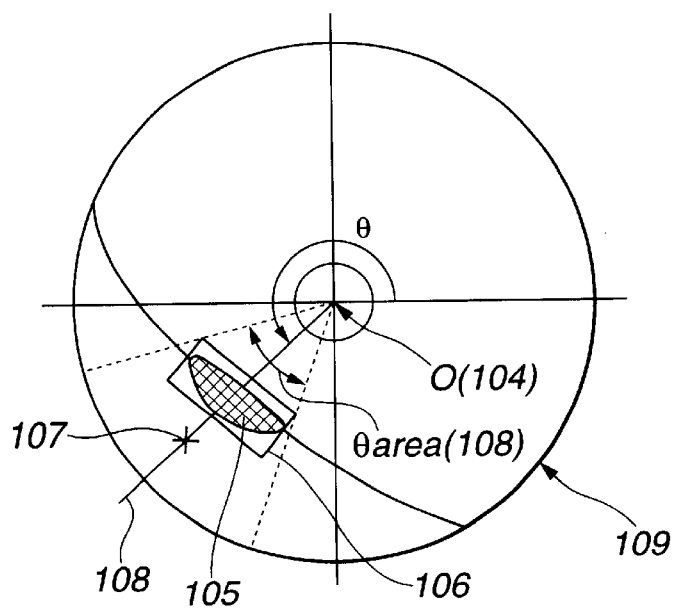

Referring to FIG. 48, a method of treating or marking a target visualized through optical coherence tomography using the laser diode 94 for treatment or marking shown in FIG. 46 will be described below.

Assume that the rotation of the rotary mirror 88 is stopped and the optical length variation optical system 9 is used to change a propagation time. In this case, one-dimensional information of a lesion to which light is irradiated from the probe, that is, information concerning the depth direction of a lesion is acquired as an interfering signal. The lesion is rapidly scanned in the depth direction thereof by continuously rotating the rotary mirror 88. When the acquired information of the lesion is visualized circumferentially, an image 109 shown in FIG. 48 is produced. Straight lines extending radially from the center of rotation O indicate the depth direction of a lesion, and the directions of the straight lines indicate the orientation of the rotary mirror 88.

Figure 49:
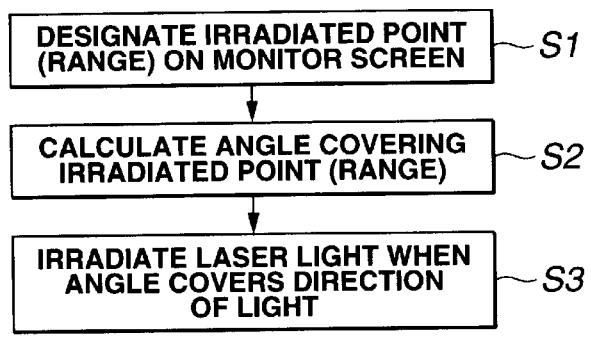

Referring to FIG. 48, a procedure of cauterizing a visualized lesion 105 using laser light will be described in conjunction with FIG. 49. At step S1, an operator specifies the lesion 105 on the monitor, and designates a laser irradiation range 106 using a mouse, a trackball, or any other input unit so that the laser irradiation range 106 will be input to the computer 27.

At step S2, the computer calculates an angle θarea covering a direction in which the rotary mirror 88 should be oriented in order to irradiate laser light, and outputs a command to the timing circuit 97.

At step S3, when the rotary mirror 88 is rotated to orient in a direction covered by the angle θarea, the timing circuit 97 drives the laser diode 94. Consequently, laser light is irradiated to the lesion.

For marking a lesion, an operator draws a mark 107 on an image displayed on the monitor using an input means to designate an intended direction. A laser light irradiation angle θ is calculated in the same manner as the angle θarea is. When the rotary mirror is rotated to orient in a direction 108 in which laser light is irradiated, the timing circuit 97 drives the laser diode 94. Consequently, laser light is irradiated to the lesion in order to mark the lesion.

Since the position of a lesion to be treated or marked is accurately designated in an image, the reliability of treatment improves, and the precision of biopsy improves owing to the guidance of a mark.

Figure 50:
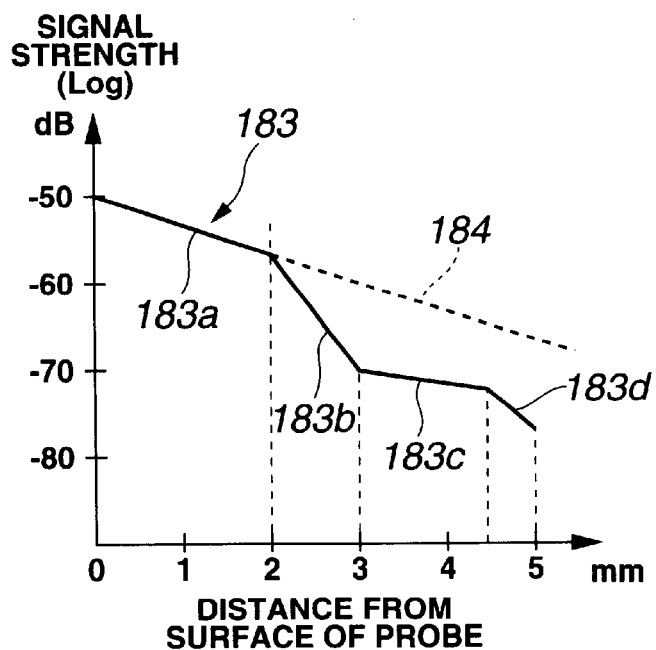

FIG. 50 indicates the intensity of a signal 183. The signal 183 is an interfering signal demodulated by the demodulator 24 included in the optical imaging device shown in FIG. 1 and fed to the computer 27 via the A/D converter. Herein, the interfering signal is acquired by scanning an object in its depth direction with a light propagation time changed using the optical length variation optical system 9. In FIG. 50, the axis of abscissas indicates a distance from the face of the probe (or a depth to the surface of an object when the probe and object are in contact with each other). The axis of ordinates logarithmically indicates the intensity of the signal 183. Light reflected or scattered from the object decays exponentially to a product of the depth to the object by a coefficient based on a scattering coefficient caused by the object (secondly, an optical property of the object such as an absorption coefficient). The axis of ordinates in FIG. 50 is graduated logarithmically in decibels. The exponential decay is plotted as a straight line having a slope proportional to the product of the depth by the coefficient based on the scattering coefficient and absorption coefficient.

As shown in FIG. 50, when the depth of an irradiated point on an object is 2 mm or less, the decay of the signal is as small as indicated with a line segment 183a. Assuming that the object is a living body, when it says that the depth of the irradiated point changes from 2 mm to 3 mm, it means that the irradiated point is shifted from the epithelial tissue to the submucosa. The decay becomes large as indicated with a line segment 183b. When the depth of the irradiated point changes from 3 mm to 4.5 mm, the decay is very small as indicated with a line segment 183c. When the depth thereof is larger than 4.5 mm, the decay becomes as moderate as indicated with a line segment 183d.

Assume that the decay occurs, and that a scanned plane is visualized two-dimensionally as shown in FIG. 48. The signal intensity may be depicted with shades in an image, for example, a high signal intensity may be depicted with a lighter shade. In this case, a shallow region is visualized bright, while a deep region is visualized darkly. This makes it hard to identify the details of a structure depicted in the image.

One of methods for compensating the foregoing drawback is such that decay is thought to be constant as indicated with a straight line 184 in FIG. 50 and compensated. However, especially when an object is a living body, the decay is not constant but varies depending on a depth as indicated with the line segments 183b to 183d in FIG. 50. The compensation is therefore ineffective. Moreover, as far as the living body is concerned, the decay varies depending on a region or an individual. The magnitude of compensation is therefore not constant.

Figure 51:
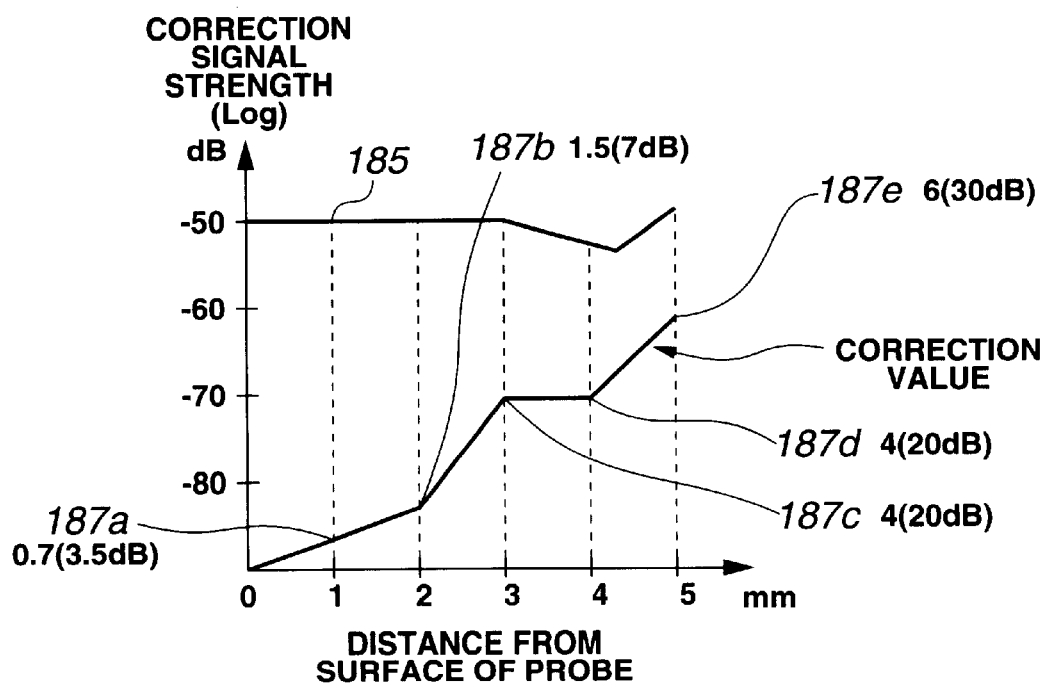

FIG. 51 indicates a method of effectively compensating the intensity of a signal acquired especially from a living body. As shown in FIG. 51, a whole scanned range is divided in depth into several points (in units of 1 mm in FIG. 51). An operator designates magnitudes of compensation (0.7 to 6 indicated with points 187a to 187e) for the respective points using a lever included in an observation device, which is realized with the optical imaging device of the present embodiment, while looking at a view image. A gain associated with each magnitude of compensation (3.5 dB to 30 dB in FIG. 51) is logarithmically added to the magnitude of compensation. Moreover, a gain to be produced by the demodulator 24 shown in FIG. 1 is varied in proportion to the associated gain. Consequently, the intensity of a signal can be compensated to remain substantially constant as indicated with a line segment 185. Eventually, the details of a minute structure can be observed more accurately.

In short, the decay of a signal is compensated in consideration of the fact that the optical properties of an object including a property of scattering light are not uniform among individuals. Consequently, the details of a minute structure can be observed more accurately.

Thirteenth Embodiment

Figure 52:
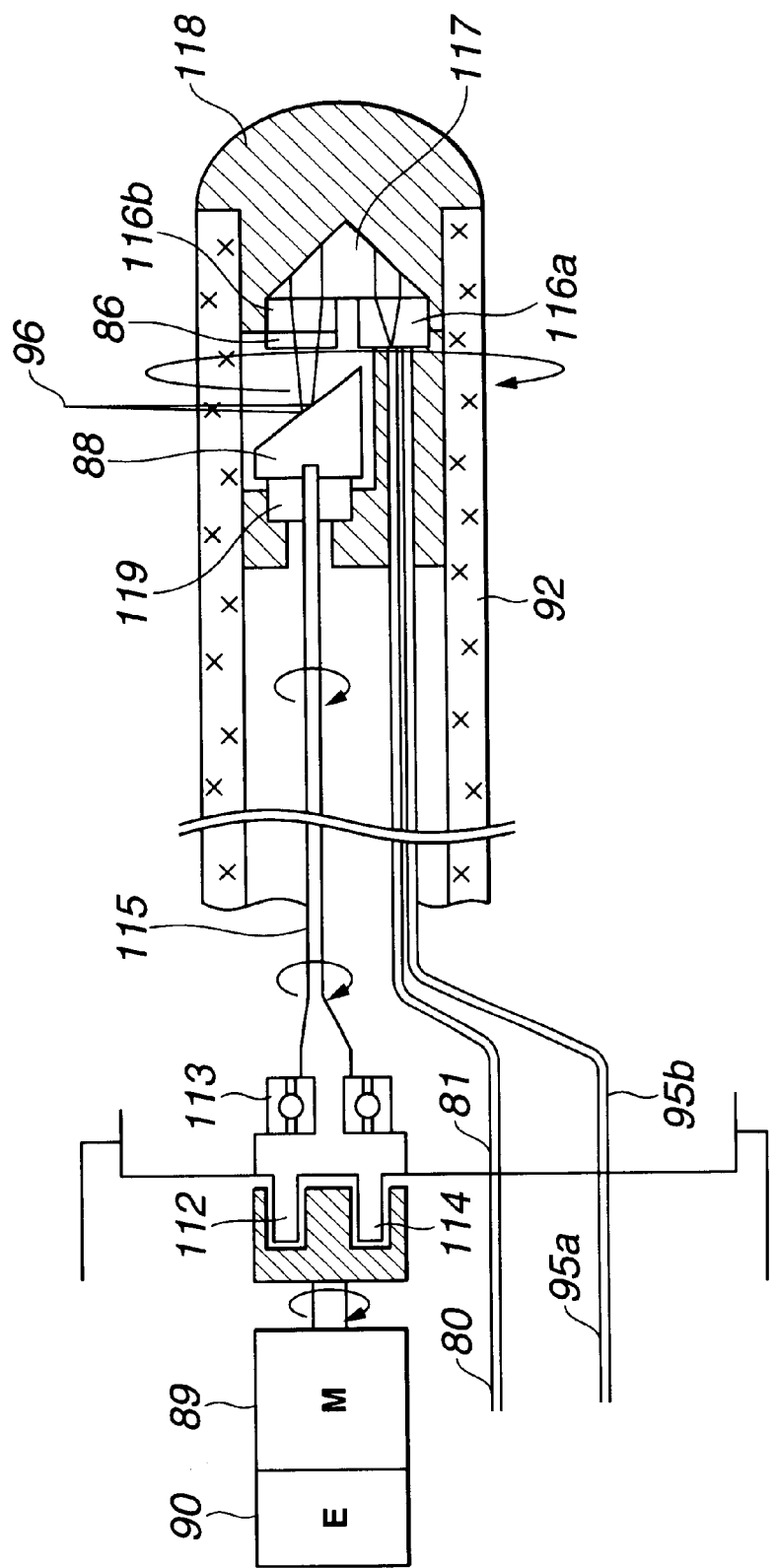
FIG. 52 shows the components of an optical scanner probe and a scanning means employed in the thirteenth embodiment.

FIG. 52 shows the components of an optical scanner probe and a scanning means employed in the Thirteenth embodiment of the present invention.

The patent publication No. WO97/32182 has disclosed a probe having a mirror located in the distal part thereof. The mirror is rotated using a rotation shaft independent of an optical fiber. Light emitted from the optical fiber is routed to the rotating mirror using a lens and a rectangular prism. An object is then scanned with the light. When a probe is inserted in an endoscope, a probe body and the rotation shaft for bearing and rotating the mirror make a relative movement along with angling of the endoscope. The rotary mirror is therefore displaced in the axial direction of the probe. This causes the focus of a lens exhibiting the highest resolving power and offering a high contrast to become uncertain. This is user-unfriendly.

Moreover, the displacement of the mirror in the axial direction of the probe brings about a variation of an optical length. This poses a problem in that a reconstructed two-dimensional image does not represent an exact shape or size because of the displacement.

Moreover, according to the patent publication No. WO97/32182, the mirror located in the distal part of the probe is rotated with the rotation shaft independent of the optical fiber. Light emitted from the optical fiber is routed to the rotating mirror using the lens and rectangular prism. An object is then scanned with the light. However, the distance from the lens to the object is so large that the numerical aperture of the lens cannot be improved. The spot of converged light is therefore large. This poses a problem in that a resolving power in a direction perpendicular to the optical axis deteriorates. Besides, it is hard to compactly design the distal part of the probe.

The thirteenth embodiment is nearly identical to the twelfth embodiment. Differences alone will be described below. The same reference numerals will be assigned to identical components, and the description of the components will be omitted.

(Constituent Features and Operations)

According to the present embodiment, the differences of the components shown in FIG. 52 from the components shown in FIG. 46 are as described below. First, the scanning means shown in FIG. 46 uses the motor 89, which is located in the distal part of a probe, to drive the rotary mirror 88, while the scanning means shown in FIG. 52 uses a rotation shaft 115 borne by a bearing 119 to drive the mirror. Moreover, the motor 89 and encoder 90 are disposed in a main unit of an optical imaging device but not in the distal part of the probe. The rotation of the motor 89 is conveyed to the rotation shaft 115 via a coupler receptacle 112 and a coupler 111 through conveyer pins. The coupler receptacle 112 is included in a detachable connector 110 as a portion to be coupled to the device. The coupler 111 is included in the detachable connector 110 as a portion to be coupled to the probe. The conveyer pins are attached to the coupler 111. The coupler 111 is held freely rotationally in the detachable connector 110 by means of a bearing 113.

Secondly, in the components shown in FIG. 46, the rotary mirror 88 is opposed to the gradient index lens 85 and quarter-wave plate 86. In the components shown in FIG. 52, a rectangular prism 117 for turning a light path, a quarter-wave plate 86, and gradient index lenses 116a and 116b corresponding to two divisions of the gradient index lens 85 are included so that the gradient index lenses will be juxtaposed. The other components are identical to those shown in FIG. 46.

Incidentally, needless to say, SM optical fibers may be substituted for the PM optical fibers shown in FIG. 52.
(Advantages)

As mentioned above, the present embodiment can provide the same advantages as the twelfth embodiment. In addition, since the motor and encoder are disposed in the main unit of the optical imaging device but not in the probe. The probe can therefore be manufactured inexpensively. Moreover, intense laser light for use in treatment which cannot be propagated over an SM optical fiber for signals can be propagated.

Moreover, the PM optical fiber is used to propagate light within the probe. It will therefore not take place that the polarized state of light in the probe varies with angling of the probe. Detection will not be adversely affected.

Moreover, a range of an object capable of being visualized with a high signal-to-noise ratio, a high resolving power, and a high contrast can be held constant despite low costs. Maneuverability can be improved.

Moreover, the numerical aperture of a condenser can be improved, or in other words, the resolving power thereof can be improved. Moreover, the distal part of the probe can be designed compactly.

Fourteenth Embodiment

Figure 53:
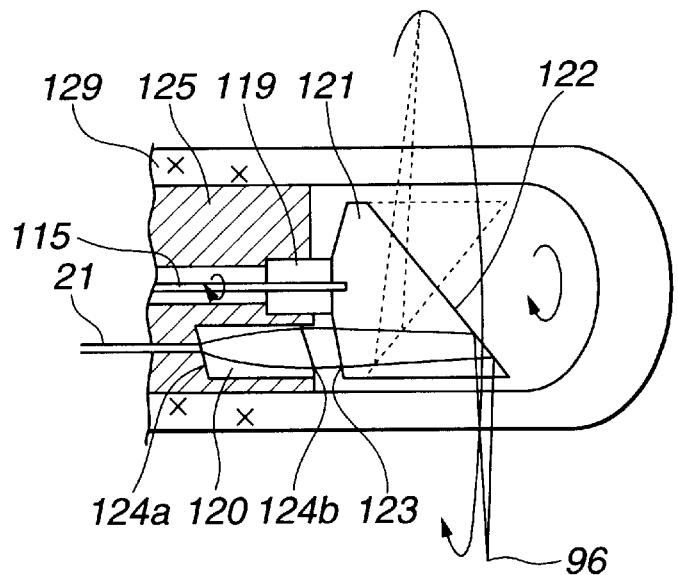
FIG. 53 to FIG. 55 are concerned with the fourteenth embodiment.
Figure 54:
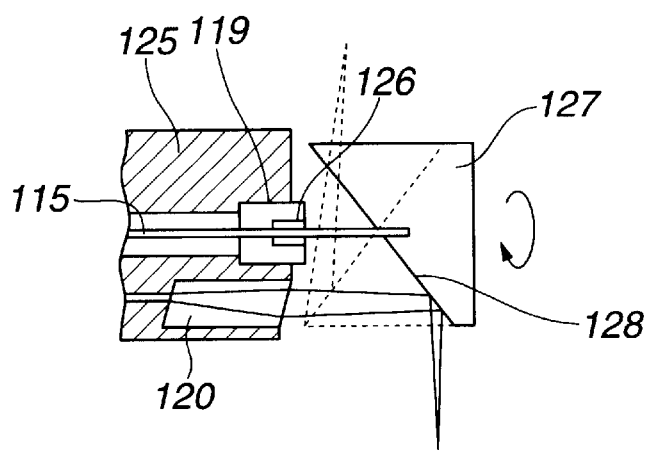
Figure 55:
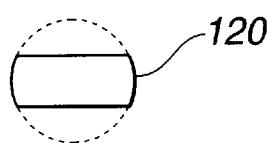

FIG. 53 to FIG. 55 are concerned with the fourteenth embodiment of the present invention. FIG. 53 shows the structures of an optical scanner probe and a scanning means. FIG. 54 shows the structure of a variant of the scanning means shown in FIG. 53. FIG. 55 shows a gradient index lens, which is shown in FIG. 53 and FIG. 54, seen along the optical axis.

The fourteenth embodiment is nearly identical to the thirteenth embodiment. Differences alone will be described below. The same reference numerals will be assigned to identical components, and the description of the components will be omitted.
(Constituent Features and Operations)

The difference from the thirteenth embodiment lies, as shown in FIG. 53, in a point that a rotary prism 121 is substituted for the rotary mirror 88. Moreover, the back of the rotary prism is coated with a reflection film such as a multilayered dielectric to serve as a reflecting surface 122.

The present embodiment obviates the necessity of a means for turning a light path such as the rectangular prism 117 shown in FIG. 52 and employed in the thirteenth embodiment. The fourth SM optical fiber 21 shown in FIG. 1 and a gradient index lens 120 are mounted in a locking member 125 that holds a bearing 119. The bearing 119 bears the rotary prism 121 and a rotation shaft 115 so that they can rotate freely. Light emitted from the gradient index lens 120 is reflected from the reflecting surface 122, transmitted by a light-transmissive distal cap 129 having the end thereof machined hemispherically, and then converged at a focus 96.

Light reflected or scattered from an object reversely travels the light path, and enters the fourth SM optical fiber 21. Herein, the end of the fourth SM optical fiber 21 as well as the incident surface 124a and emission surface 124b of the gradient index lens 120 are polished obliquely to the optical axis and substantially parallel to one another. This is intended to prevent occurrence of return light derived from interface reflection. For the same reason, the incident surface 123 of the rotary prism 121 is polished obliquely to the optical axis.

FIG. 54 shows a variant of the present embodiment. A rotary mirror 127 having a reflecting surface 128 facing the rotation shaft 115 is substituted for the rotary prism 121 shown in FIG. 52. For retaining the rotary mirror in place, a flange-like sliding member 126 is mounted in the bearing 119.

FIG. 55 shows the gradient index lens 120, which is shown in FIG. 53 and FIG. 54, seen along the optical axis. For disposing the gradient index lens in a space that is narrow in the radial direction of the prove while keeping the numerical aperture thereof large enough, the gradient index lens has the top and bottom thereof polished to be flat and is thus flattened.
(Advantages)

As mentioned above, the present invention provides the same advantages as the thirteenth embodiment. In addition, since a light path need not be turned, the distal part of the probe can be thinned and the length of a distal rigid part can be shortened.

Fifteenth Embodiment

Figure 56:
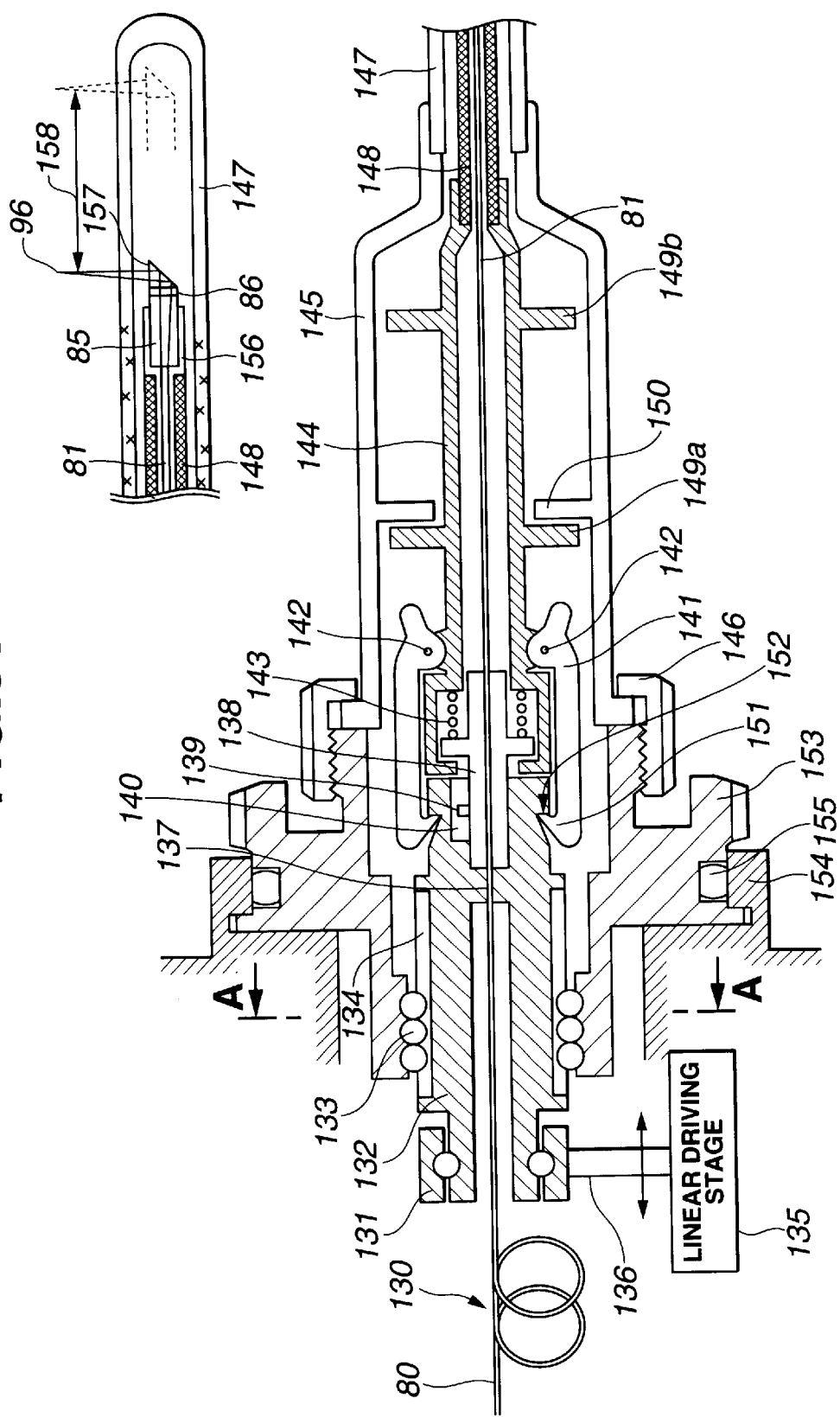
FIG. 56 and FIG. 57 are concerned with the fifteenth embodiment.
Figure 57:
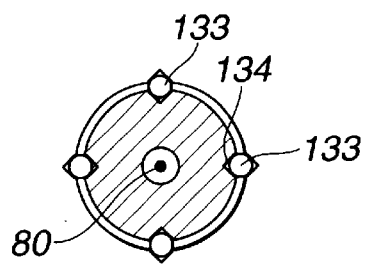

FIG. 56 and FIG. 57 are concerned with the fifteenth embodiment. FIG. 56 shows the structures of an optical scanner probe and a scanning means. FIG. 57 is a sectional view showing the A—A cutting plane of the structure shown in FIG. 56.

The fifteenth embodiment is nearly identical to the first embodiment. Differences alone will be described below. The same reference numerals will be assigned to identical components, and the description of the components will be omitted.
(Constituent Features and Operations)

In the twelfth to fourteenth embodiments, an optical element such as a rotary mirror located in the distal part of an optical scanner probe is rotated in order to reflect light from the circumference of the rotary mirror and thus irradiate the light for scanning. A produced image is therefore circular. According to the present embodiment, an optical element is moved linearly to produce an image representing a region located by the side of the probe.

To be more specific as shown in FIG. 56, in an optical scanner probe employed in the present embodiment, the end of the first PM optical fiber 80 is locked in a fiber joint 137 formed as an integral part of an advancement/withdrawal shaft 132. One end of the second PM optical fiber 81 is locked in a ferrule 138 opposed to the fiber joint 137. The fiber joint 137 and ferrule 138 are attachable or detachable and engaged with the cylindrical side wall. The angular relationship between the fiber joint and ferrule is maintained by a detent 139 and a detent receptor 140. The fiber joint 137 and ferrule 138 are attachable or detachable owing to mounting levers 141, claws 151, concave parts 152, and springs 143. The mounting levers 141 are attached to a coupling shaft 144 and can pivot with axes 142 as fulcra. The claws 151 are formed as distal parts of the mounting levers 141. The concave parts 152 are formed in the advancement/withdrawal shaft 132 and engaged with the claws 151. The mounting levers 141 are brought into contact with the advancement/withdrawal shaft 132 with the axes 142 as fulcra by means of springs that are not shown. When the fiber joint 137 and ferrule 138 are joined, they are brought into contact with each other due to the resiliency of the springs 143. The first PM optical fiber 80 and second PM optical fiber 81 are joined reliably while planes of polarization are maintained.

The other end of the second PM optical fiber 81 is held in a lens frame 156 and coupled to the gradient index lens 85.

The quarter-wave plate 86 and a prism 157 are joined to the gradient index lens 85. Light emitted from the second PM optical fiber 81 is converged on the gradient index lens 85, transmitted by the quarter-wave plate 86, and reflected laterally from the prism 157. The light is then transmitted by a light-transmissive sheath 147 and converged at the focus 96.

Light reflected or scattered from an object is routed to the second PM optical fiber 81 by reversing the foregoing light path. The lens frame 156 is fixed to one end of a hollow flexible shaft 148 realized with a multilayered multi-turn metallic coil. The other end of the flexible shaft 148 is locked in the coupling shaft 144. An end of the sheath 147 is locked in a connector housing 145.

The connector housing 145 is freely detachably attached to a rotary ring 153, which is mounted on the optical imaging device, using an attaching nut 146. The connector housing 145 and rotary ring 153 have a concave part to be engaged with a detent projection that is not shown.

The rotary ring 153 is held in a housing 154 of an observation device realized with the optical imaging device so that the rotary ring 153 can rotate freely. A frictional member 155 realized with a compressed O ring is clamped by the rotary ring 153 and the housing 154 of the observation device. Therefore, the rotary ring 153 may be turned manually but will not be rotated with a torque stemming from a twist of the sheath 147.

By turning the rotary ring 153, the sheath 147 and flexible shaft 148 can be rotated in any direction. The distal part of the sheath 147 will hardly be rotated because of friction when inserted in a forceps passage hole in an endoscope. The flexible shaft 148 is held in the sheath while causing little friction, and can therefore be rotated freely.

Moreover, the advancement/withdrawal shaft 132 can freely slide laterally in FIG. 56 owing to linear bearings 133 attached to the rotary ring 153 and V-shaped grooves 134 bored in the advancement/withdrawal shaft 132. FIG. 57 shows the A—A cutting plane of the sliding unit.

The linear bearings 133 that are balls and the V-shaped grooves 134 enable the advancement/withdrawal shaft 132 to freely slide in lateral directions as seen from FIG. 56. However, the rotation of the advancement/withdrawal shaft 132 is restricted as seen from FIG. 57.

Moreover, an end of the advancement/withdrawal shaft 132 is coupled to a driving shaft 136 with bearings 131 between them so that the advancement/withdrawal shaft can freely rotate. The driving shaft 136 is coupled to a linear driving stage 135 for moving the driving shaft 136 in the lateral directions. The computer 27 controls a position to which the driving shaft is driven to move.

The computer 27 sends a driving control signal to the linear driving stage 135. The movement of the linear driving stage 135 is conveyed to the advancement/withdrawal shaft 132 by way of the driving shaft 136 and bearings 131. The lateral movement of the advancement/withdrawal shaft 132 is conveyed to the ferrule 138, springs 143, mounting levers 141, coupling shaft 144, and flexible shaft 148. This finally causes a distal optical unit, which is composed of the lens frame 156, gradient index lens 85, quarter-wave plate 86, and prism 157, to move laterally. Consequently, observation light is irradiated in order to scan an object laterally. At the same time, the object is scanned in its depth direction owing to the optical length variation optical system 9. Eventually, the object is visualized two-dimensionally, that is, in the depth direction and lateral direction.

A moving range 158 of the distal part is restricted based on a control input fed to the linear driving stage. The moving range 158 is also restricted by a projection 150 formed on the inner surface of the connector housing 145 and restriction members 149a and 149b formed on the coupling shaft 144.

The electronic and mechanism restrictions are achieved to such an extent that the prism 157 will not touch the tip of the inner wall of the sheath 147 despite relative advancement or withdrawal between the sheath 147 and flexible shaft 148. Moreover, a range within which the electronic restriction is effected falls within a range within which the mechanism restriction is effected. Moreover, the mechanism restriction members may be designed to not only restrict movement of the probe connector but also restrict relative sliding between the advancement/withdrawal shaft 132 inserted in the main unit of the observation device and the rotary ring 153. Otherwise, the mechanism restriction members may be formed on the inner wall of the distal part of the sheath 147 serving as the distal part of the probe or may be formed on the lens frame 156.

Moreover, a slack loop 130 is preserved for fear the first PM optical fiber 80 may be highly strung with excessive tension when the distal optical unit is moved within the moving range.

Needless to say, SM optical fibers may be substituted for the PM optical fibers shown in FIG. 56. In this case, the quarter-wave plate 86 may be excluded.

(Advantages)

As mentioned above, the present embodiment provides the same advantages as those of the first embodiment. In addition, since mechanically restricting means are included, it can be prevented that an optical element such as a prism located in the distal part of a probe strikes the inner surface of the sheath and damages it. Consequently, optical deterioration can be prevented. In particular, when the restricting means are formed on a connector, an advancement/withdrawal shaft and others are prevented from withdrawing when the probe is detached from the observation device.

Moreover, for scanning an object linearly, a flexible shaft may be rotated in any desired direction and held intact. Therefore, even when the probe is inserted in a forceps channel in an endoscope or any other thing causing great friction, a scanned plane can be set at a desired position on an object.

In the structure shown in FIG. 56, the whole probe and flexible shaft are rotated together. Alternatively, the sheath of the probe may be immobilized and the flexible shaft alone may be rotated. Nevertheless, a scanned plane can be set at any desired position on an object. The same advantages as those provided by the structure shown in FIG. 56 can be provided.

Sixteenth Embodiment

Figure 58:
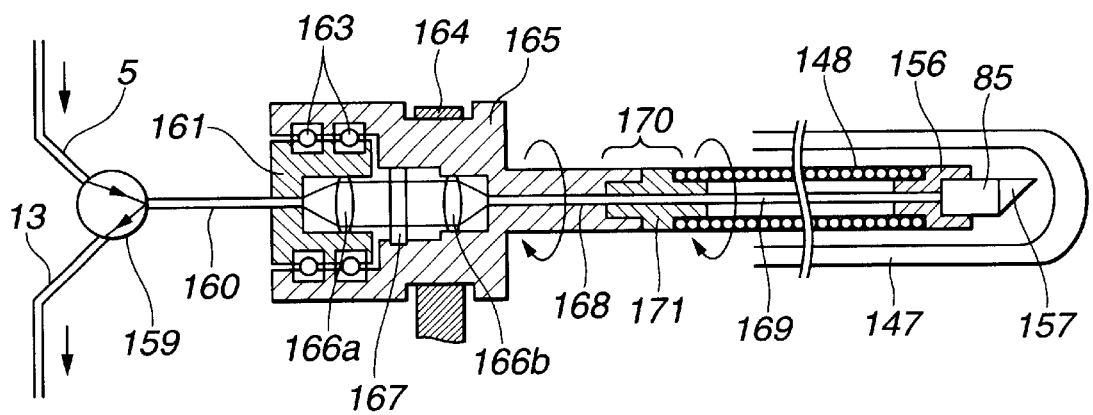
FIG. 58 to FIG. 62 are concerned with the sixteenth embodiment.
Figure 59:
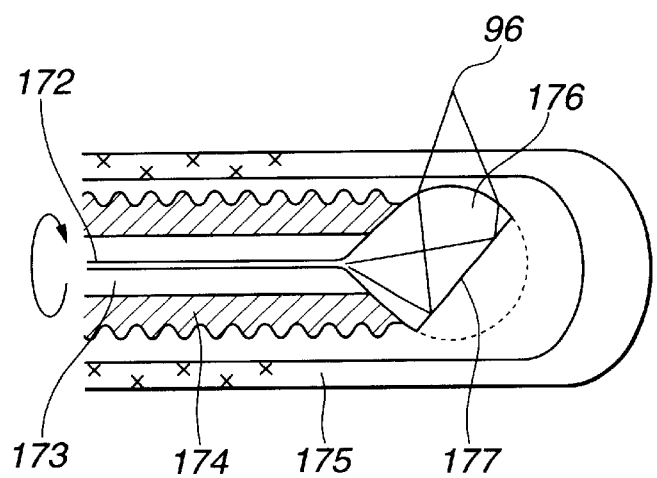
Figure 60:
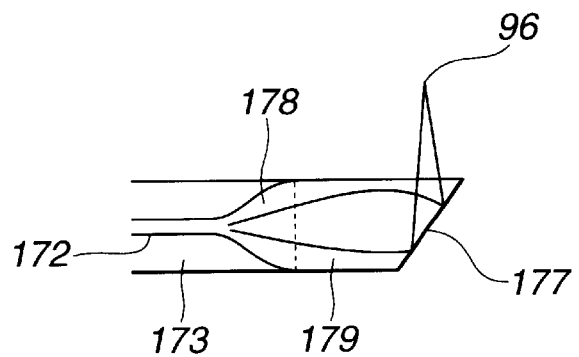
Figure 61:
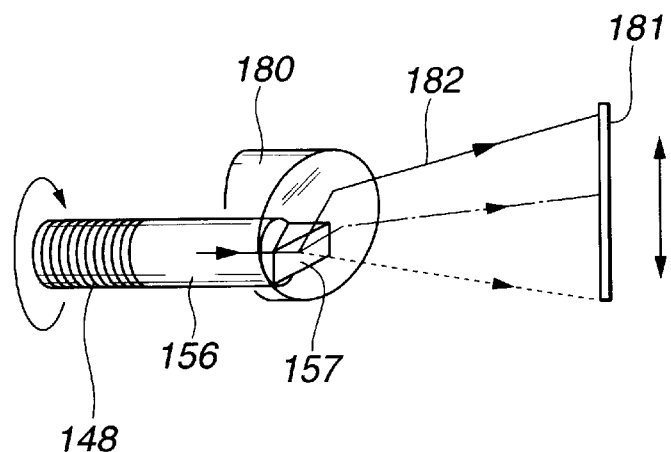
Figure 62:
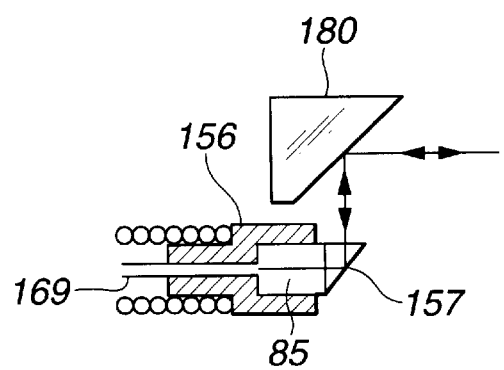

FIG. 58 to FIG. 62 are concerned with the sixteenth embodiment. FIG. 58 shows the structure of a major portion of an optical imaging device. FIG. 59 is an explanatory diagram concerning the first variant of an optical scanner probe shown in FIG. 58. FIG. 60 is an explanatory diagram concerning the second variant of the optical scanner probe shown in FIG. 58. FIG. 61 is an explanatory diagram concerning the third variant of the optical scanner probe shown in FIG. 58. FIG. 62 is a sectional view showing a cutting plane along the optical axis containing a stationary mirror shown in FIG. 61.

The sixteenth embodiment is nearly identical to the twelfth embodiment. Differences alone will be described below. The same reference numerals will be assigned to identical components, and the description of he components will be omitted.

(Constituent Features and Operations)

As shown in FIG. 58, according to the present embodiment, an optical circulator 159 is substituted for the optical coupler 6 shown in FIG. 1. The optical circulator 159 highly efficiently routes light emitted from the third SM optical fiber 5 to a seventh SM optical fiber 160, and highly efficiently propagates the light impinging on the seventh SM optical fiber 160 to the fourth SM optical fiber 13. Moreover, the third SM optical fiber 5 is fully isolated from the fourth SM optical fiber 13.

When the optical coupler 6 is employed, even in 100% of light routed to the seventh SM optical fiber 160 returns, up to a quarter of light emitted from the third SM optical fiber 5 is propagated to the fourth SM optical fiber 13. In contrast, when the optical circulator 159 is employed, the efficiency in propagating return light to the fourth SM optical fiber can be improved to be double or more.

Light emanating from the light source is propagated over the third SM optical fiber 5, passed through the optical circulator 159, and routed to the seventh SM optical fiber 160. Light emitted from the end of the seventh SM optical fiber 160 is routed to a third PM optical fiber 168 by way of a collimator lens 166a, a sheet polarizer 167, and a collimator lens 166b within the optical scanner probe. A plane of polarization defined by the sheet polarizer 167 and one of planes of polarization maintained by the third PM optical fiber 168 are agreed with each other. The end of the seventh SM optical fiber 160 and the collimator lens 166a are locked in a locking member 161. The sheet polarizer 167 and third PM optical fiber 168 are locked in a rotator 165. The locking member 161 and rotator 165 are joined with bearings 163 between them so that they can rotate freely.

At this time, the seventh SM optical fiber 160 is controlled by a polarization controller (PC), which is not shown, formed on the seventh SM optical fiber 160 so that light emitted from the seventh SM optical fiber 160 will be circularly polarized light. Consequently, a stable amount of light is propagated to the third PM optical fiber 168.

In the optical scanner probe, the rotator 165 is driven to rotate using a belt 164. The third PM optical fiber 168 is spliced to the fourth PM optical fiber 169 using a coupler 171 so that the third and fourth PM optical fibers can be held unspliced. The rotator 165 and a connector 170 formed with the coupler 171 each have attaching screws and rotation restriction members which are not shown. The third PM optical fiber 168 and fourth PM optical fiber 169 are spliced to each other so that the planes of polarization maintained by the third PM optical fiber will be agreed with those maintained by the fourth PM optical fiber.

The flexible shaft 148 realized with a multilayered multi-turn coil is preferably joined to the coupler 171. The other end of the fourth PM optical fiber 169 and the gradient index lens 85 and prism 157 which are in close contact with each other are locked in the lens frame 156 together with the other end of the flexible shaft 148. Moreover, the flexible shaft, gradient index lens 85, and other optical members can rotate freely within the light-transmissive sheath 147.

Light routed to the third PM optical fiber 168 is propagated to the fourth SM optical fiber 169 with the planes of polarization exhibited by the light maintained in the connector 170. The light is converged on the gradient index lens 85 in the distal part of the probe, deflected substantially at right angles by the prism 157, and irradiated from the lateral part of the probe. The rotator 165 is rotated with a driving force exerted by the belt 164. The rotation is conveyed to the flexible shaft 148 via the connector 170. This causes the fourth PM optical fiber 169, gradient index lens 85, and prism 157 to rotate together. An object is scanned in a direction of light irradiation. Light reflected or scattered from the object located in the direction of light irradiation is routed to the fourth PM optical fiber 169 by way of the prism 157 and gradient index lens 85. The light is then propagated over the fourth PM optical fiber 169 and third PM optical fiber 168, passed through the collimator lens 166b and sheet polarizer 167, and then routed to the end of the seventh SM optical fiber 160 via the collimator lens 166a.

At this time, one of the planes of polarization maintained by the third PM optical fiber 168 is agreed with the plane of polarization defined by the sheet polarizer 167. It will not take place that light decays because of disagreement of a mode of polarization. The light is propagated to the end of the seventh SM optical fiber 160. Light reflected or scattered from the object and propagated over the seventh SM optical fiber 160 is routed to the fourth SM optical fiber 13 owing to the optical circulator 159.

(Advantages)

As mentioned above, according to the present invention, PM optical fibers are used to propagate light within a probe. It will therefore not take place that detection is adversely affected because the polarized state of light traveling over an optical fiber changes with angling of the probe.

The detailed structure of a radial scan type probe has been disclosed in the patent publication No. WO97/32182. A distal optical system composed of a lens frame, a gradient index lens, a prism, and other elements is disposed in the distal part of the probe. It is therefore hard to design the probe compactly, though a compact probe is highly needed for such a usage there the probe is inserted in a small-diameter endoscope or for studies of alimentary organs or blood vessels. Besides, assembling and adjustment is very complex and requires many man-hours. Moreover, in the disclosed structure, light reflection occurs at a joint between an emission end of an optical fiber and a lens or between a lens and a prism. This leads to a deteriorated signal-to-noise ratio.

A jacket 174 shown in FIG. 59 may be substituted for the flexible shaft 148 shown in FIG. 58. The jacket 174 has an irregular surface that facilitates rotation and sliding within a light-transmissive sheath 175, and is made of a highly rigid fibrous polymer enabling conveyance of a torque. The jacket 174 sheathes an optical fiber composed of a core 172 and a cladding 173. A spherical lens 176 directly fused to the core has a reflecting surface 177 that is a portion of the spherical lens 176 coated with a reflective film. Light emitted from the core 172 of the optical fiber is deflected substantially at right angles owing to the reflecting surface 177, and then converged at a convergence point 96 by the spherical lens 176. Incidentally, the optical fiber may be a PM optical fiber or SM optical fiber.

The structure shown in FIG. 59 requires a small number of components and a small number of assemblies, and enables inexpensive manufacturing. Moreover, it is unnecessary to bond a lens and a prism or join lens frames. A very small probe can be manufactured and is suitable for studies of blood vessels that require a thin instrument.

Moreover, instead of the spherical lens 176 shown in FIG. 59, a core enlargement portion 178 may be formed at the end of an optical fiber as shown in FIG. 60. A gradient index lens or a refractive index distribution optical fiber 179 may be fused to the core enlargement portion 178. At this time, the end surface of the optical fiber 179 may be polished obliquely as a reflecting surface 177. This enables a more compact probe than that realized with the structure shown in FIG. 59.

A rotary scanner probe for optical coherence tomography disclosed in the U.S. Patent Publication No. 532150 can visualize a region located laterally to the probe. However, a tomographic image of a region located ahead of the probe cannot be produced, though it can be produced by a typical endoscope. The patent publication No. 532150 has disclosed examples of a probe capable of producing a tomographic image of a region located ahead of the probe. However, according to the examples, an object ahead of the probe is scanned using a piezoelectric element or a fiber bundle. For this scanning, a completely different radial scan method and driving method are adopted. For switching images representing a front region and a lateral region, a probe must be replaced with another, and an observation device must be replaced with another. This is labor-intensive and no cost-efficient.

As a variant of the optical scanner probe shown in FIG. 58, a probe may be structured as shown in FIG. 61 and FIG. 62. Specifically, a stationary mirror 180 is disposed to face light emitted from the prism 157. Observation light 182 that is light emitted from the prism 157 and deflected by the stationary mirror 180 is irradiated to an object located ahead of the probe. The object is scanned with the light that traces a trajectory 181 responsively to the rotations of the flexible shaft 148, lens frame 156, and prism 157. In this case, the same components as those required for radial scanning may be used to realize linear scanning of an object located ahead of the probe. This will prove convenient.

According to the present embodiment, a scanner probe means can scan an object located ahead thereof while enabling employment of the same scanning means and observation device, that is, optical imaging device as a radial scan type probe.

Seventeenth Embodiment

Figure 63:
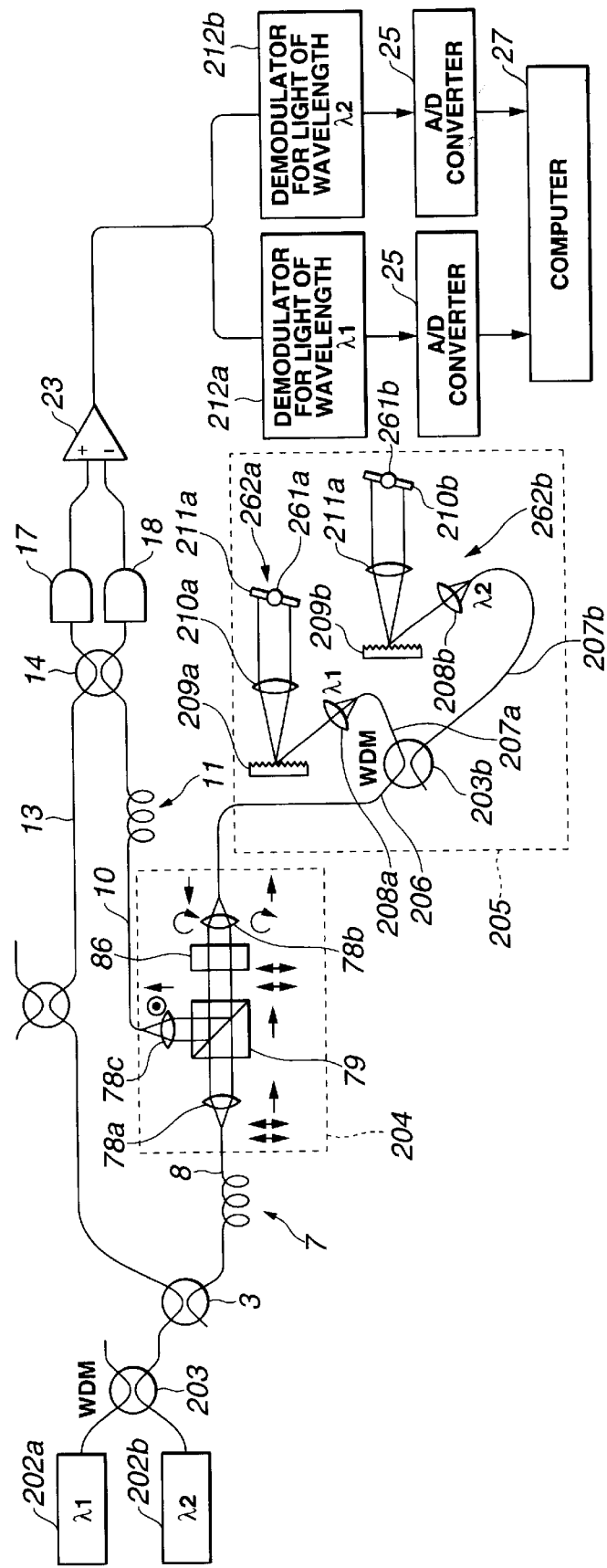
FIG. 63 to FIG. 68 are concerned with the seventeenth embodiment.
Figure 64:
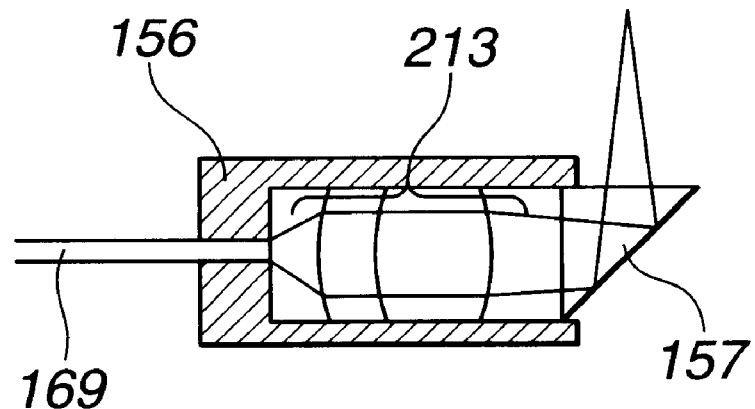
Figure 65:
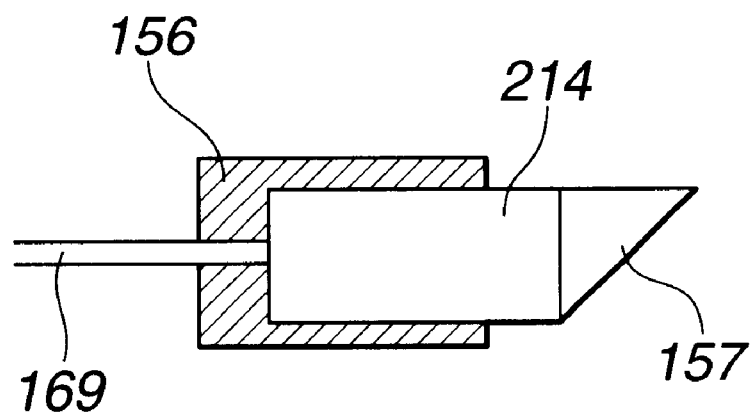
Figure 66:
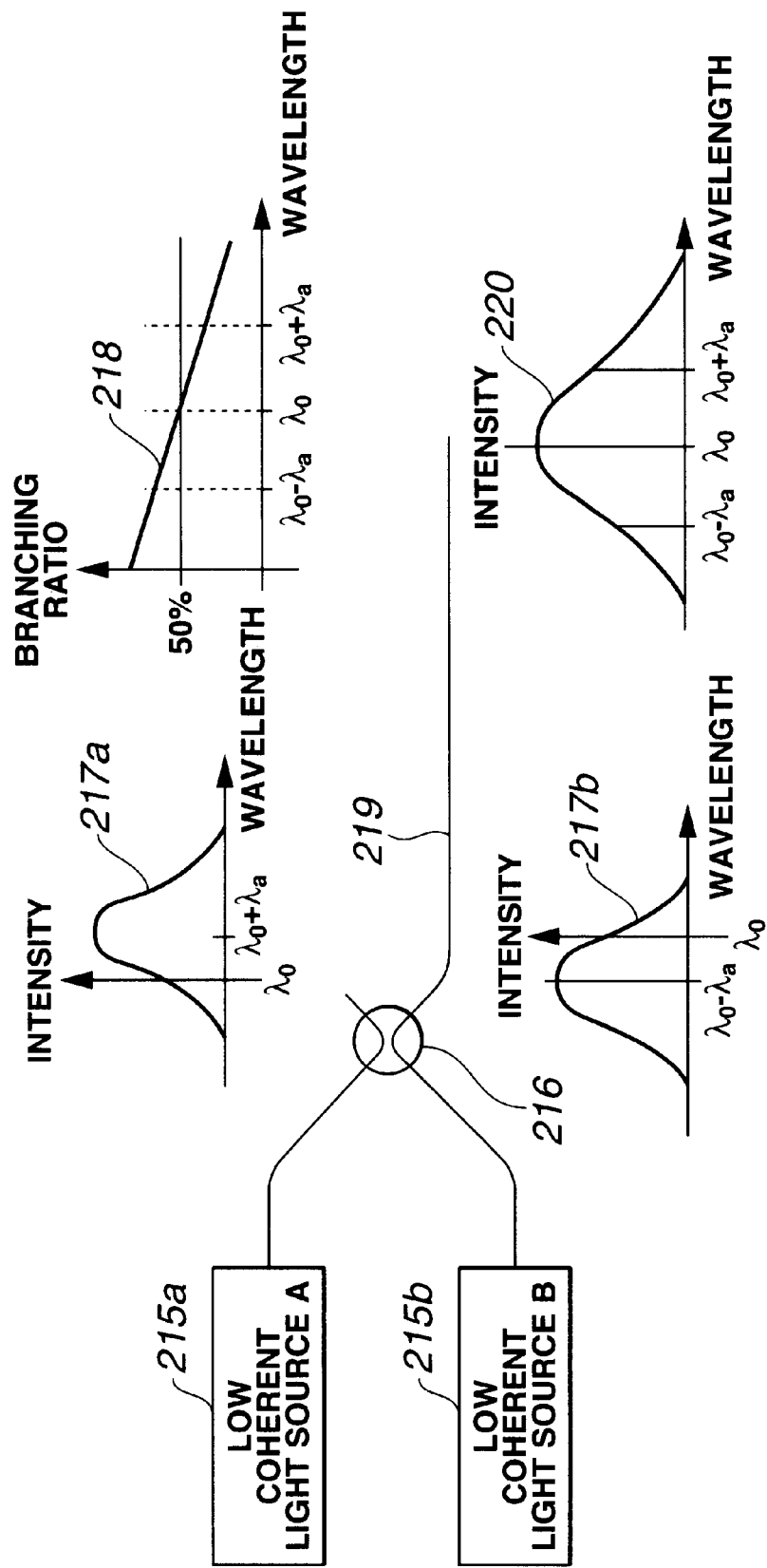
Figure 67:
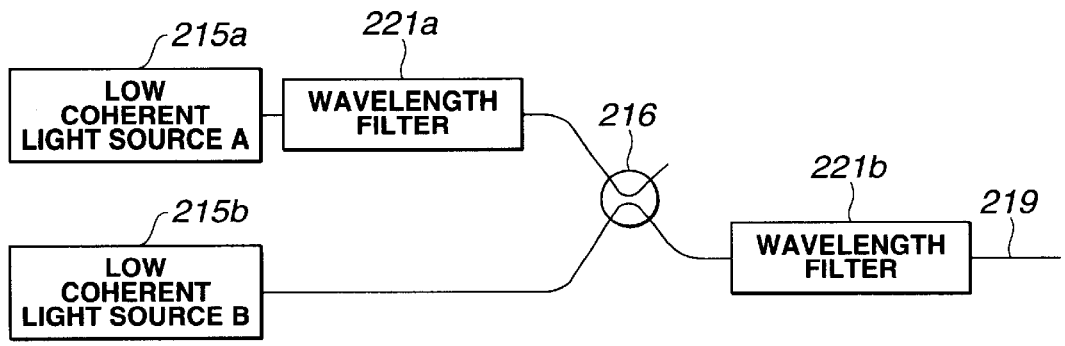
Figure 68:
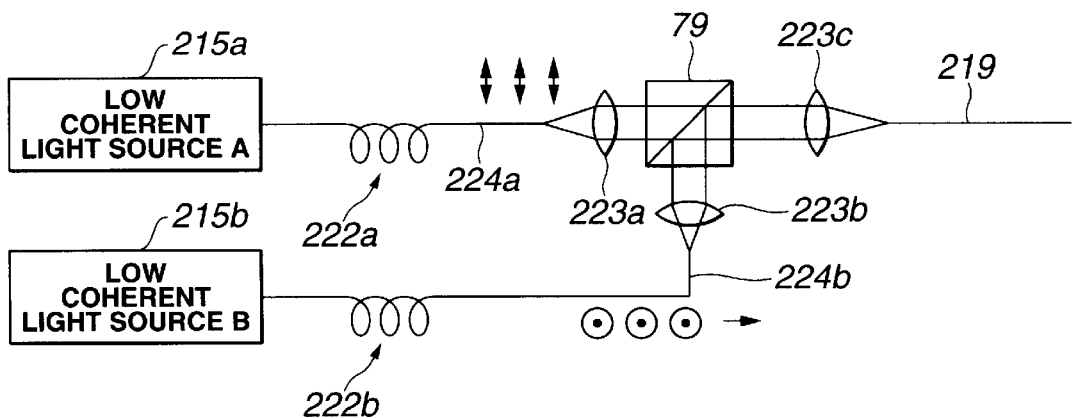

FIG. 63 to FIG. 68 are concerned with the seventeenth embodiment of the present invention. FIG. 63 shows the configuration of an optical imaging device. FIG. 64 shows the structure of an optical system located in the distal part of an optical scanner probe employed in the optical imaging device shown in FIG. 63. FIG. 65 shows the structure of a variant of the optical system located in the distal part of the optical scanner probe employed in the optical imaging device shown in FIG. 63. FIG. 66 shows an arrangement for multiplexing two light beams emanating from two low coherent light sources shown in FIG. 63 to produce light of an expanded spectrum. FIG. 67 shows an arrangement for multiplexing two light beams emanating from two low coherent light sources shown in FIG. 63 to finally produce light whose spectrum displays the normal distribution. FIG. 68 is an explanatory diagram concerning an example of the arrangement shown in FIG. 66 for realizing highly efficient multiplexing of light beams.

The seventeenth embodiment is nearly identical to the first embodiment. Differences alone will be described below. The same reference numerals will be assigned to identical components, and the description of the components will be omitted.

(Constituent Features and Operations)

In the optical imaging device in accordance with the present embodiment, as shown in FIG. 63, a wavelength division multiplexer (hereinafter WDM) 203 multiplexes light emanating from a low coherent light source 202a and having a center wavelength $\lambda 1$ with light emanating from a low coherent light source 202b and having a center wavelength k2. The WDM is realized by utilizing the ability of an optical coupler to multiplex the wavelengths of light beams, and can multiplex light beams highly efficiently. Light resulting from multiplexing of the light beams emanating from the two light sources corresponds to light emanating from the low coherent light source 1 shown in FIG. 1.

An optical branching unit 204 and a reflective delay line unit 205 are included as an equivalent of the optical length variation optical system 9 shown in FIG. 1. The optical branching unit 204 highly efficiently routes polarized light emitted from the incidence SM optical fiber 8 to an eighth SM optical fiber 206. Moreover, the optical branching unit 204 highly efficiently routes light returned from the reflective delay line unit 205 to the emission SM optical fiber 10. The optical branching unit 204 can therefore be used as a propagation time changing means realized based on a Mach-Zehnder interferometer when combined with a reflective delay line.

In the optical branching unit 204, a collimator lens 78a is used to route linearly polarized light that vibrates up and down in the sheet of the drawing to a polarization beam splitter (hereinafter PBS) 79. Beforehand, the linearly polarized light is controlled by the polarization controller (PC) 7, and emitted from the incidence SM optical fiber 8. The PBS 79 highly efficiently transmits the linearly polarized light that vibrates up and down in the sheet of the drawing. The linearly polarized light falling on the quarter-wave plate 86 is converted into circularly polarized light, and routed to the eighth SM optical fiber 206 by a collimator lens 78b. The light impinging on the eighth SM optical fiber 206 is demultiplexed by a WDM 203b. Consequently, light whose wavelength corresponds to the center wavelength $\lambda 1$ of light emanating from the low coherent light source 202a is routed to a ninth SM optical fiber 207a. Light whose wavelength corresponds to the center wavelength $\lambda 2$ of light emanating from the low coherent light source 202b is routed to a tenth SM optical fiber 207b.

The light routed to the ninth SM optical fiber 207a has a propagation time thereof changed by a first delay line 262a composed of a collimator 208a, a diffraction grating 209a, a lens 210a, and a galvanometer mirror 211a, and then returned to the ninth SM optical fiber 207a. Specifically, light emitted from the ninth SM optical fiber 207a falls on the diffraction grating 209a owing to the collimator 208a. The light diffracted by the diffraction grating 209a is Fourier-transformed by the lens 210a. The propagation time of the light is changed by reciprocating the galvanometer mirror 211a, which is located on the image plane of the lens 210a, with an axis of reciprocation 261a as a center. The light is then returned to the ninth SM optical fiber 207a. The reciprocation causes the propagation time to change. Moreover, the axis of reciprocation 261a is deviated from the light path of the light whose center wavelength corresponds to the center wavelength $\lambda 1$. The reciprocation causes the optical length for the light to vary depending on the magnitude of deviation. Consequently, a Doppler shift occurs as a function of the magnitude of deviation of the axis of reciprocation 261a from the path of the light whose center wavelength corresponds to the center wavelength $\lambda 1$ and the reciprocating speed.

Likewise, the light routed to the tenth SM optical fiber 207b has a propagation time thereof changed by a second delay line 262b composed of a collimator 208b, a diffraction grating 209b, a lens 210b, and a galvanometer mirror 211b, and then returned to the tenth SM optical fiber 207b.

At this time, the first delay line 262a produces the heterodyne frequency of the light whose wavelength corresponds to the center wavelength $\lambda 1$, while the second delay line 262b produces the heterodyne frequency of the light whose wavelength corresponds to the center wavelength $\lambda 2$. The heterodyne frequencies can be set to mutually independent values by mutually independently determining the magnitudes of deviation of the axes of reciprocation of the galvanometer mirrors from the paths of the light beams whose wavelengths correspond to the center frequencies $\lambda 1$ and $\lambda 2$, and the reciprocating speeds of the galvanometer mirrors. Furthermore, a scanned range of an object in a depth direction of the object can be set mutually independently between the light whose wavelength corresponds to the center wavelength $\lambda 1$ and the light whose wavelength corresponds to the center wavelength $\lambda 2$.

The light returned to the ninth SM optical fiber 207a and the light returned to the tenth SM optical fiber 207b are multiplexed by the WDM 203b and propagated over the eighth SM optical fiber 206. Light emitted from the eighth SM optical fiber 206 to the collimator lens 78b is converted from circularly polarized light to linearly polarized light that vibrates vertically to the sheet of the drawing by means of the quarter-wave plate 86. The PBS 79 highly efficiently reflects the linearly polarized light towards the collimator lens 78c. The light is then propagated over the emission SM optical fiber 10. The optical branching unit 204 highly efficiently routes light emitted from the incidence SM optical fiber 8 to the delay line unit 20 owing to the foregoing optical elements. Moreover, the optical branching unit 204 routes light returned from the delay line unit 205 to the emission SM optical fiber 10.

When the optical branching unit 204 is replaced with an optical circulator, the routing of light can be achieved more highly efficiently.

The optical scanner probe 20, scanning means 19, and scanning drive unit 22 included in the configuration shown in FIG. 63 are identical to those of the sixteenth embodiment shown in FIG. 58 except that the optical system disposed in the distal part of the probe is structured as shown in FIG. 64.

As shown in FIG. 64, light emitted from the fourth PM optical fiber 169 is converged on an apochromatic lens 213 shaped like a tablet and held in a lens frame 156 together with the emission end of the fourth PM optical fiber 169. The light is then deflected by a prism 157. The apochromatic lens 213 is designed to exhibit a minimal chromatic aberration for the light whose wavelength corresponds to the center wavelength $\lambda 1$ and the light whose wavelength corresponds to the center wavelength $\lambda 2$. The apochromatic lens 213 therefore focuses both the light beams of difference wavelengths at the same point.

Moreover, the optical system disposed in the distal part of the probe may be structured as shown in FIG. 65. Referring to FIG. 65, a gradient index lens 214 causing low-level dispersion is substituted for the apochromatic lens 213 shown in FIG. 64. The structure shown in FIG. 65 provides the same advantage as that shown in FIG. 64. The gradient index lens 214 causing low-level dispersion is a gradient index lens made of a material dispersing at a low level both the light whose wavelength corresponds to the center wavelength $\lambda 1$ and the light whose wavelength corresponds to the center wavelength $\lambda 2$. The gradient index lens 214 exhibits a little chromatic aberration for both the light whose wavelength corresponds to the center wavelength $\lambda 1$ and the light whose wavelength corresponds to the center wavelength $\lambda 2$, and focuses them at substantially the same point.

The optical coupler 14 causes light returned from the optical scanner probe 20 and light returned from the delay line unit 205 to interfere with each other. The detectors 17 and 18 and differential amplifier 23 convert an interfering signal, which is modulated based on a heterodyne frequency, into an electric signal. The light whose wavelength corresponds to the center wavelength $\lambda 1$ and the light whose wavelength corresponds to the center wavelength $\lambda 2$ have different heterodyne frequencies that depend on the settings of the first delay line 262a and second delay line 262b respectively included in the delay line unit 205. Demodulators 212a and 212b formed with bandpass filters whose transmission bands contain the heterodyne frequencies or lock-in detectors detect frequency components having the same frequencies as the heterodyne frequencies. The outputs of the demodulators 212a and 212b are fed to the computer 27 via the A/D converters 25.

Alternatively, the two demodulators may not be included. An output of the differential amplifier 23 may be digitized and Fourier-transformed. Nevertheless, the same outputs as those of the A/D converters 25 can be provided.

(Advantages)

As mentioned above, the present embodiment provides the same advantages as the first embodiment. In addition, an optical coherence tomography (OCT) signal having a plurality of wavelengths can be detected in real time. Moreover, when signal components of the plurality of wavelengths are compared with each other and computed as mentioned above, biomedical information in which different metabolisms detectable with different wavelengths are reflected can be detected.

Furthermore, assume that light having a larger wavelength that falls within a spectrum ranging from visible light to near infrared light whose wavelength is about 1.5 $\mu$m is irradiated to a subject that is a living body. In this case, the light is little scattered or absorbed by the subject and therefore little decays. In contrast, irradiation of light having a smaller wavelength leads to a higher resolving power. Therefore, light having a smaller wavelength may be irradiated in order to scan a superficial region, and light having a larger wavelength may be irradiated in order to scan a deep region. Consequently, a shallow region can be visualized with an emphasis put on a resolving power, while a deep region can be visualized with a high contrast attained. At this time, it would be more advantageous if a chromatic aberration is not corrected in the distal part of the optical scanner probe shown in FIG. 64 or FIG. 65.

When three or more light sources are included for emanating light beams of different wavelengths, the corresponding numbers of delay lines and demodulators are included. Thus, biomedical information represented with a signal having a plurality of wavelengths can be detected in the same manner as described above.

Moreover, when the wavelengths of light beams emanating from light sources are close to each other, the propagation times of the light beams may be varied using only one delay line. In this case, a plurality of delay lines need not be included. Apochromatic lenses whose chromatic aberrations are minimized relative to the respective wavelengths should be used as the collimator lens 208a and lens 210a. The reason why the apochromatic lenses should be used will be described. Namely, the rays of the light beams whose wavelengths are the center wavelengths $\lambda 1$ and $\lambda 2$ impinge on different points on a galvanometer mirror because the light beams are dispersed by a diffraction grating. The light beams therefore generally have different heterodyne frequencies.

A means for coupling light beams may not be the WDM but may be a typical optical coupler.

Moreover, instead of coupling a plurality of light beams, light having a large wavelength band may be divided into rays of different wavelengths using a wavelength filter. Even in this case, the same advantages as those described above can be provided.

Now, a description will be made of why it is possible to produce light of an expanded spectrum that requires a smaller coherence length and to improve a resolving power in a depth direction of an object by multiplexing light beams emanating from two light sources like those shown in FIG. 63.

A major determinant of the resolving power of an optical coherence tomography system in a depth direction is a bandwidth of low coherent light. At this time, the aspectral density of the low coherent light shall display the normal distribution. Assuming that the center wavelength of light emanating from a light source is $\lambda 0$ and the half width thereof is $\Delta\lambda$, the resolving power in the depth direction is approximated to the coherence length required by the light as expressed below.

Resolving power in depth direction=approx. coherence length=$2(\ln 2)\lambda 0^2/\pi\Delta\lambda$. In other words, the larger the bandwidth is, the higher the resolving power in the depth direction is.

However, the bandwidth is restricted by a device itself serving as a low coherent light source, such as, a superluminescent diode (SLD) or an amplified spontaneous emission (ASE) light source. Moreover, in general, when an attempt is made to expand the bandwidth, the power of light emanating from a light source decreases to deteriorate a signal-to-noise ratio. It is therefore hard to realize both a high resolving power and a high power (almost equivalent to a high signal-to-noise ratio) using a sole light source. Furthermore, when the spectrum of light emanating from a light source does not display the normal distribution, although a coherence length is not attained, an interfering signal may be produced. This brings about a decrease in the resolving power in the depth direction of the optical coherence tomography system and a decrease in the signal-to-noise ratio thereof.

FIG. 66 shows an arrangement for multiplexing light beams emanating from two light sources and producing light of an expanded spectrum. A low coherent light source A 215a supplies light exhibiting a spectral density 217a, while a low coherent light source B 215b supplies light exhibiting a spectral density 217b. Both the light beams are multiplexed using a wavelength-dependent coupler 216, and propagated over an emission SM optical fiber 219. A branching ratio at which the wavelength-dependent coupler 216 branches light into identical waveguides is, as indicated with a line 218, low relative to the center wavelength $\lambda 0$–$\lambda a$ of the light emanating from the low coherent light source A and high relative to the center wavelength $\lambda 0$–$\lambda a$ of the light emanating from the low coherent light source B.

Consequently, the efficiency in propagating light from the low coherent light source A 215a to the emission SM optical fiber 219 or from the low coherent light source B 215b thereto is higher than that attained with employment of an ordinary optical coupler whose branching ratio is 3:1 in decibel. Thus, light can be propagated highly efficiently.

The spectral density of light resulting from multiplexing should be plotted as a curve 220. In other words, a curve indicating the intensity of the light resulting from multiplexing as a function of wavelength should be approximated to the curve 220 assumed by the normal distribution. From this viewpoint, the spectral densities 217a and 217b of light beams emanating from the low coherent light sources A 215a and B 215b and being multiplexed, and the branching ratio 218 of the wavelength-dependent coupler 216 must be determined. When the spectral density of light dose not display the normal distribution, light other than light traveling over light paths designed to offer a coherence length may be acquired to causes a noise.

However, the spectral densities 217a and 217b of light beams emanating from the low coherent light sources A 215a and B 215b are not always ideal. Even in such a case, an arrangement shown in FIG. 67 finally provides light whose intensity displays the normal distribution. Namely, a wavelength filter 221a is interposed between the low coherent light source A 215a and wavelength-dependent coupler 216. The wavelength filter 221a is realized with a dielectric multilayeted filter interposed between two fiber collimators or a fiber grating. An attenuator including a neutral density (ND) filter for balancing outputs of two light sources may be substituted for the wavelength filter 221a.

Furthermore, a wavelength filter 221b is disposed behind the wavelength-dependent coupler 216. Adjustment performed by the wavelength filters 221a and 221b ensures the normal distribution at last. Consequently, a noise that is light other than light traveling over light paths designed to offer a coherence length can be suppressed.

The wavelength filter may be disposed behind the low coherent light source B 215b. The arrangement shown in FIG. 67 may be disposed in place of the low coherent light source 1 shown in FIG. 1, and may also be disposed on a light path of object or sample light or a light path of reference light. Even in this case, the same advantage as the aforesaid one can be provided.

As mentioned above, light of an expanded spectrum can be produced. Consequently, a coherence length can be shortened, and a resolving power in a depth direction can be improved.

Next, an example of an arrangement for highly efficiently multiplexing light beams emanating from the light sources shown in FIG. 66 will be described below. As shown in FIG. 68, light emanating from the low coherent light source 215a is converted into linearly polarized light, which vibrates up and down in the sheet of the drawing, using a polarization controller (hereinafter PC) 222a. The light is then routed from an emission end 224a to a polarization beam splitter (hereinafter PBS) 79 via a collimator lens 223a. The PBS 79 highly efficiently transmits linearly polarized light that vibrates up and down in the sheet of the drawing. The light is then propagated over an emission optical fiber 219 owing to a collimator lens 223c. Likewise, light emanating from the low coherent light source 215b is converted into linearly polarized light, which vibrates vertically to the sheet of the drawing, using a PC 222b. The light is then routed from an emission end 224b to the PBS 79 owing to a collimator lens 223b. The PBS 79 highly efficiently reflects linearly polarized light that vibrates vertically to the sheet of the drawing. The light is then propagated over the emission optical fiber 219 owing to a collimator lens 223c.

In the arrangements shown in FIG. 66 and FIG. 67, even when the wavelength-dependent coupler is employed, it is hard to multiplex two light beams at an efficiency level of much larger than 50%. The arrangement shown in FIG. 68 enables multiplexing higher efficiently.

Eighteenth Embodiment

Figure 69:
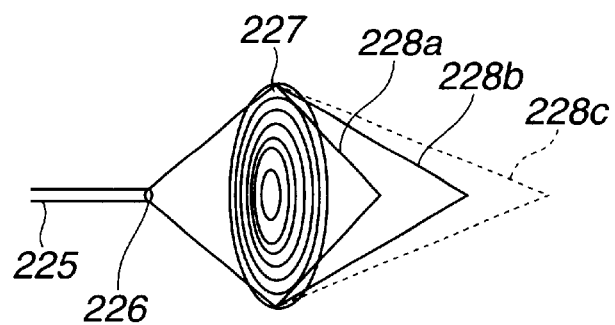
FIG. 69 to FIG. 71 are concerned with the eighteenth embodiment.
Figure 70:
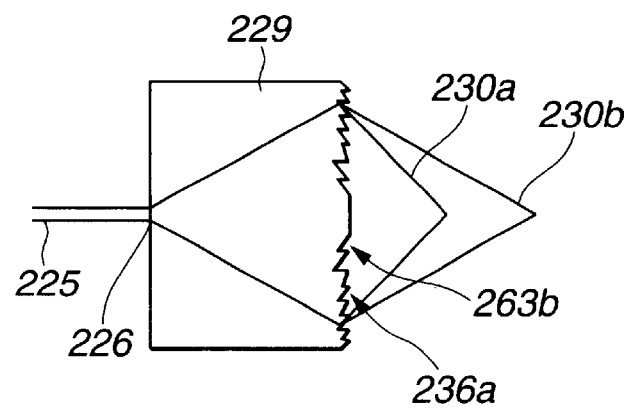
Figure 71:
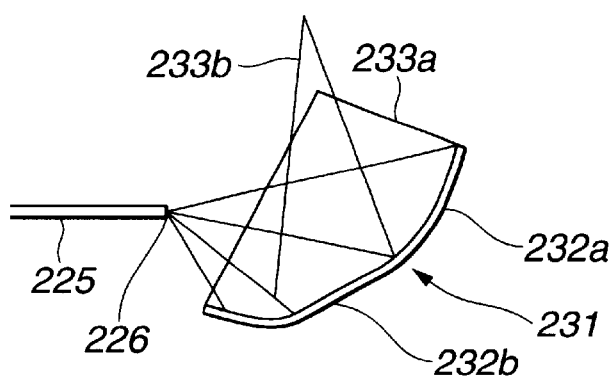

FIG. 69 to FIG. 71 are concerned with the eighteenth embodiment of the present invention. FIG. 69 shows the structure of a distal optical system located in the distal part of an optical scanner probe. FIG. 70 shows the structure of the first variant of the distal optical system, which is shown in FIG. 69, located in the distal part of an optical scanner probe. FIG. 71 shows the structure of the second variant of the distal optical system, which is shown in FIG. 69, located in the distal part of an optical scanner probe.

The eighteenth embodiment is nearly identical to the twelfth embodiment. Differences alone will be described below. The same reference numerals will be assigned to identical components, and the description of the components will be omitted.

A probe included in an optical coherence tomography (OCT) system has a converging optical system in the distal part thereof. When a region to be observed of an object parts from the focus of the converging optical system, the resolving power of an optical imaging device in a direction perpendicular to the optical axis deteriorates abruptly. Besides, a contrast offered by the optical imaging device deteriorates along with a decrease in an amount of converged light. Therefore, an object must be accurately positioned at the focus. This will annoy a user especially when the probe must be inserted into a living body. For overcoming this drawback, the numerical aperture of the converging optical system may be decreased. This leads to an increase in the size of a light spot at the focus. Eventually, the resolving power of the optical imaging device in the direction perpendicular to the optical axis deteriorates terribly for the resolving power thereof in a depth direction.

(Constituent Features and Operations)

In the optical system located in the distal part of the optical scanner probe 20 employed in the twelfth embodiment, the gradient index lens 85 has a sole focus. Unless observation light is converged at or near the point 96, the spot of the observation light has a large diameter. This deteriorates the resolving power of the optical imaging device in a circumferential direction.

In the distal optical system located in the distal part of the optical scanner probe 20 and shown in FIG. 69, light emitted from an emission end 226 of an SM optical fiber 225 is converged on a grating lens (DOF) 227. The grating lens has a plurality of foci, that is, a first-order focus 228a derived from first-order diffraction, a second-order focus 228b derived from second-order diffraction, a third-order focus 228c derived from third-order diffraction, etc. The small-diameter spot of observation light is therefore maintained over a wide range in a depth direction.

FIG. 70 shows the first variant of the distal optical system providing the same advantage as the foregoing one. Light emitted from the emission end 226 of the SM optical fiber 225 is converged on a Fresnel lens 229. The Fresnel lens 229 is composed of numerous circumferential prisms. Prisms 263a out of the circumferential prisms converging light at a first focus 230a and prisms 263b converging light at a second focus 230b are alternately juxtaposed, whereby the Fresnel lens 229 has the first focus 230a and second focus 230b.

FIG. 71 shows the second variant of the distal optical system providing the same advantages as the aforesaid one. Light emitted from the emission end 226 of the SM optical fiber 225 is converged on a condenser mirror 231. The condenser mirror 31 has the perimeter formed as a reflecting surface 232a having a small curvature. Light reflected from the reflecting surface 232a is converged at a first focus 233a. The inside of the condenser mirror is formed as a reflecting surface 232b having a large curvature. Light reflected from the reflecting surface 232b is converged at a second focus 233b.

A lens offering a large refractive index may be disposed as the perimeter of the condenser mirror shown in FIG. 69, and a lens offering a small refractive index may be disposed as the inside thereof. Moreover, the upper half of the condenser mirror shown in FIG. 65 with respect to the optical axis may be realized with a lens offering a large refractive index, and the lower half thereof may be realized with a lens offering a small refractive index.

Furthermore, the refraction lenses may be realized with gradient index lenses.

Moreover, the drawings referenced above show neither a light deflecting means nor an optical scanning means. The light deflecting means and optical scanning means employed in any embodiment of the present invention can be used in combination.

(Advantages)

As mentioned above, the present embodiment provides the same advantages as the twelfth embodiment. In addition, the resolving power of an optical imaging device in a direction perpendicular to the optical axis at a depth other than the depth of the focus of a converging optical system, and the contrast offered by the optical imaging device are improved. Furthermore, even when light is converged at a point other than the focus of the converging optical system, the optical imaging device exhibits high performance. Light can therefore be readily positioned at an object.

Nineteenth Embodiment

Figure 72:
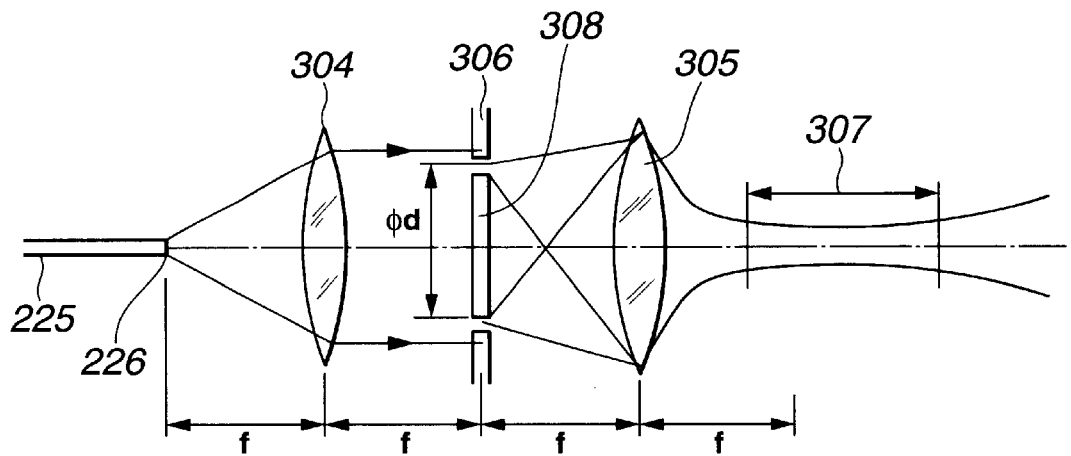
FIG. 72 to FIG. 74 are concerned with the nineteenth embodiment.
Figure 73:
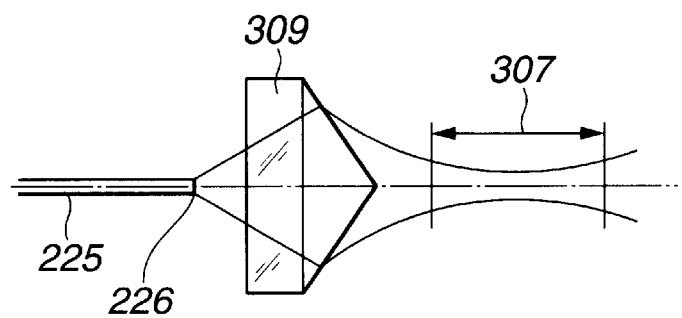
Figure 74:
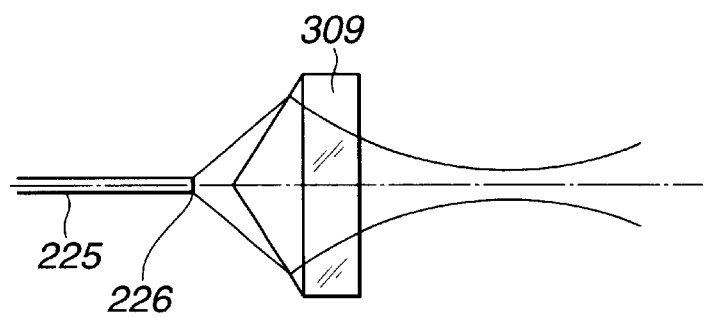

FIG. 72 to FIG. 74 are concerned with the nineteenth embodiment of the present invention. FIG. 72 shows the arrangement of optical elements constituting a major portion of an optical system included in an optical imaging device. FIG. 73 shows the first variant of the optical system shown in FIG. 72. FIG. 74 shows the second variant of the optical system shown in FIG. 72.

The nineteenth embodiment is nearly identical to the twelfth embodiment. Differences alone will be described below. The same reference numerals will be assigned to identical components, and the description of the components will be omitted.

(Constituent Features and Operations)

For keeping observation beam thin over an optical axis, it is conceivable to utilize non-diffracted light that travels with the diameter thereof held unchanged. The non-diffracted light has infinite energy and is therefore unfeasible. Quasi non-diffracted light may be able to be produced.

According to the present embodiment, as shown in FIG. 72, light emitted from the emission end of the SM optical fiber 225 is substantially collimated by a lens 304 disposed at a distance of a focal length f from the emission end. A mask 306 having an annular slit 308 having a diameter $\phi$d is disposed at a distance of the focal length f from the lens 304.

Light transmitted by the mask 306 is converged on a lens 305 separated by the focal length f from the mask 306. The resultant light is quasi non-diffracted light. The quasi non-diffracted light is converged to form a smaller spot than a spot formed with conventionally converged light. The quasi non-diffracted light provides a large depth of focus 307. When an object is located within the depth of focus, a region of the object extending in a direction perpendicular to the optical axis can be visualized with a high resolving power.

FIG. 73 and FIG. 74 show another examples. As shown in FIG. 73, light emitted from the emission end 226 of the SM optical fiber 225 is converged on an axicon (conical) lens 309. The resultant light is quasi non-diffracted light. The quasi non-diffracted light is converged to form a smaller spot than conventionally converged light, and provides the large depth of focus 307. When an object is located within the depth of focus, a region of the object extending in a direction perpendicular to the optical axis can be visualized with a high resolving power. The apex of the cone may be directed in an opposite direction as shown in FIG. 74. Nevertheless, the same advantage as the foregoing one can be provided.

The axicon lens may be realized with a gradient index lens. In this case, a cylindrical axicon lens may be realized.
(Advantages)

As mentioned above, the present embodiment provides the same advantages as the twelfth embodiment. In addition, an optical imaging device offers an improved resolving power in a direction perpendicular to the optical axis at a depth other than the depth of the focus of a converging optical system, and an improved contrast. Furthermore, even when light is converged at a point other than the focus of the converging optical system, the optical imaging device enjoys high performance. Light can therefore be readily positioned at an object.

Twentieth Embodiment

Figure 75:
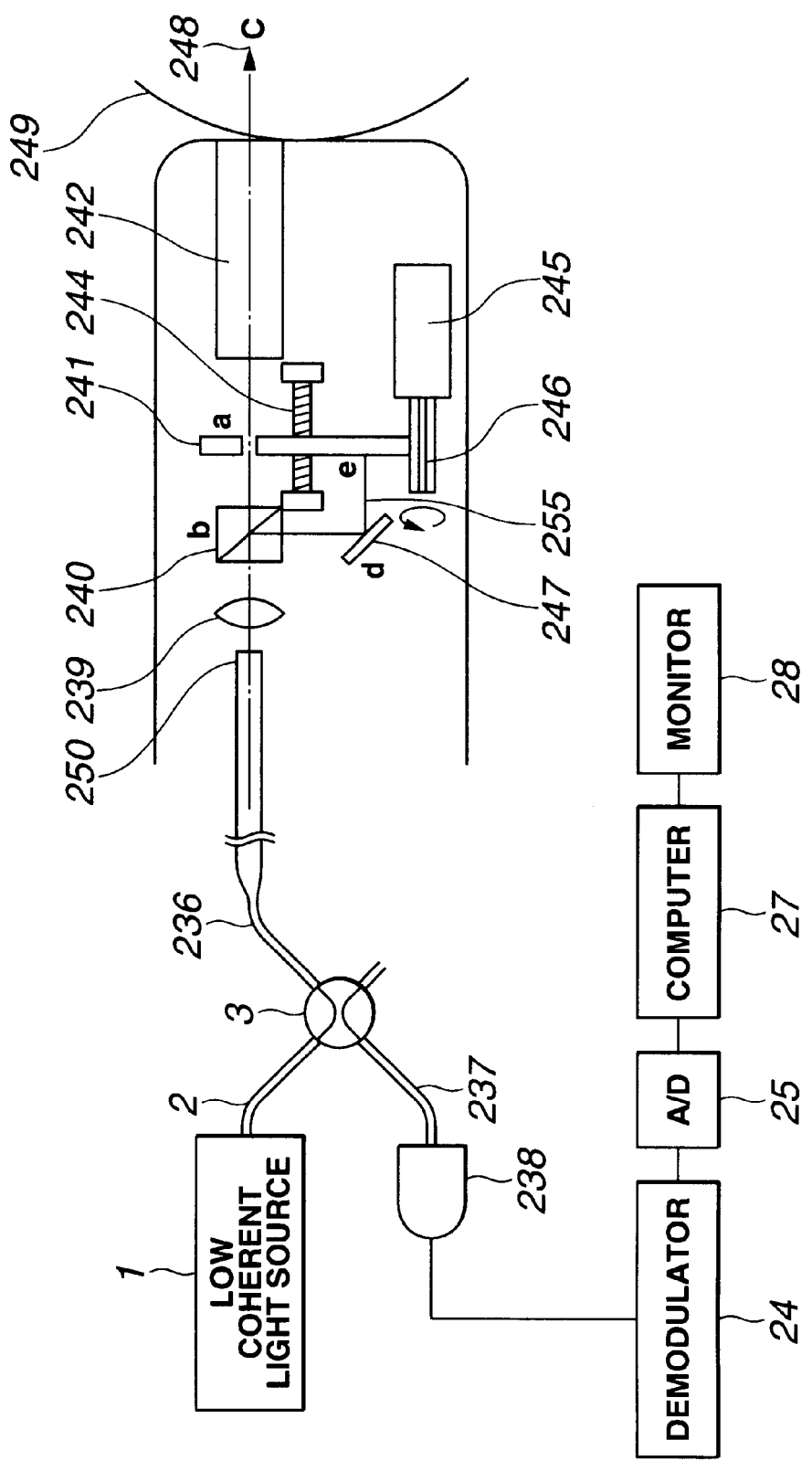
FIG. 75 to FIG. 77 are concerned with the twentieth embodiment.
Figure 76:
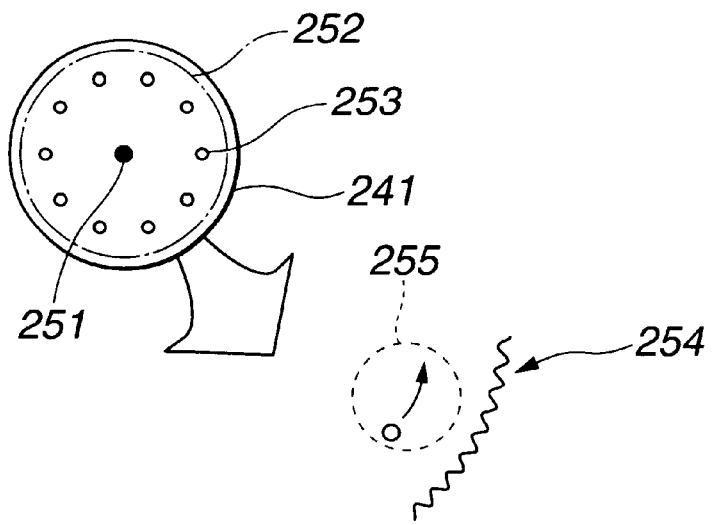
Figure 77:
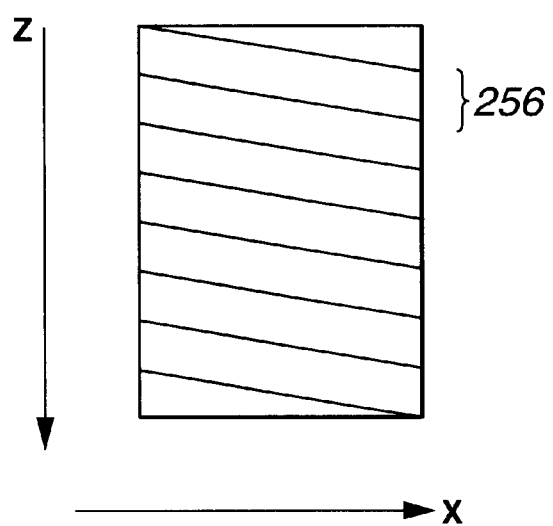

FIG. 75 to FIG. 77 are concerned with the twentieth embodiment of the present invention. FIG. 75 shows the configuration of an optical imaging device having an optical scanner probe, an optical scanning means, and a light propagation time changing means for reference light incorporated in the distal part of an endoscope. FIG. 76 shows the structure of a disk shown in FIG. 75. FIG. 77 is an explanatory diagram concerning a two-dimensional image whose two dimensions are associated with a lateral direction and a depth direction and which is produced using the disk shown in FIG. 76.

The twentieth embodiment is nearly identical to the first embodiment. Differences alone will be described below. The same reference numerals will be assigned to identical components, and the description of the components will be omitted.
(Constituent Features and Operations)

The present embodiment is an example of an optical imaging device having the optical scanner probe 20, optical scanning means 19, and a light propagation time changing means for reference light, which are employed in the first embodiment, incorporated in the distal part of an endoscope. As shown in FIG. 75 and FIG. 76, a disk 241 having pinholes 253 and a mirror portion 252 is incorporated in the distal part 243 of a probe in an endoscope. A female screw 251 is threaded in the center of the disk 241 and engaged with a stationary male screw 244. The periphery of the disk 241 is formed as a peripheral gear 254. The peripheral gear 254 is in driven by a pinion 246 attached to the driving shaft of a motor 245.

When the motor 245 rotates, the peripheral gear 254 rotates. The disk makes a spiral motion due to the actions of the stationary male screw 244 and the female screw 251. The pinholes 253 therefore make a spiral movement.

First, the pinholes 253 traverse light 255 emitted from the end 250 of an optical fiber (an object is scanned in a lateral direction shown in FIG. 77). The pinholes 253 move away from an object 248. The plurality of pinholes 253 draws a plurality of spiral trajectories.

While the pinholes 253 traverse light 255 during one rotation of the disk, an object is scanned by a magnitude 256. Based on information thus acquired, a two-dimensional image having two dimensions X and Z associated with a lateral direction and a depth direction is produced. The optical fiber 236 lying through the probe 243 in an endoscope is an SM optical fiber but may be a multi-mode optical fiber.

The position a of any of the pinholes 253 in the disk 241 should be conjugate to an observed point c. In the optical system, a distance (bac) from the position b of a dichroic mirror 240 to the observed point c should be equal to an optical length for light traveling from the position b of the dichroic mirror 240 to a reflecting surface (bde).

When the above two conditions are met, the observed point in a depth direction conjugate to the position of any of the pinholes serving as coherence gates can be scanned while being matched with the position of an object defined with confocal coordinates. In this case, the larger the numerical aperture of an objective is, the higher the resolving power of the optical imaging device is.
(Advantages)

As mentioned above, according to the present embodiment, the employment of a sole scanning mechanism enables scanning in both a lateral direction and a depth direction (X and Z).

Moreover, a region of an object that is defined with confocal coordinates and an observed point of the object conjugate with the position of any of pinholes serving as coherence gates can be scanned at the same time. This leads to a high resolving power.

Incidentally, the number of optical fibers lying through the optical scanner probe may be one. Since a reference mirror is located in the distal part of the probe, it is unnecessary to adjust an optical length that differs with a difference between individual probes. Moreover, scanning will be unaffected by angling of the probe.

According to the present invention, it is apparent that a wide range of different embodiments can be constructed based on the invention without a departure from the spirit and scope of the invention. The present invention will be limited by the appended claims but will not be restricted by any specified embodiments.

What is claimed is:

1. An optical probe apparatus producing a signal whose components interfere with each other, comprising:
    a soft elongated insertion unit capable of being inserted into a subject;
    a low coherent light source;
    a light introduction block including a single-mode optical fiber over which low coherent light is irradiated from the distal end of said insertion unit to an object in said subject and over which light reflected from said object is detected;
    a convergence block, incorporated in the distal part of said insertion unit, for covering light emitted from said optical fiber at said object and detecting light reflected from said object;
    a scanning/irradiating unit for irradiating said low coherent light emitted from said single-mode optical fiber for the purpose of scanning; and
    an interference block for causing reflected light detected over said single-mode optical fiber and reference light supplied from said light source to interfere with each other,
    wherein said insertion unit has a sheath that is a thin tubular member;
    said scanning/irradiating unit has said light covergence block, which is fused to the distal end of said single-mode optical fiber, and a reflecting surface formed as part of said convergence block enclosed in said sheath; and
    wherein at least said single-mode optical fiber and said convergence block are rotatable together within said sheath for the purpose of scanning.

2. An optical probe apparatus according to claim 1, wherein said convergence block is realized with a spherical lens.

3. An optical probe apparatus according to claim 1, wherein said convergence block is realized with a gradient index device.

4. An optical probe apparatus according to claim 1, wherein said reflecting surface is a curved surface.

5. An optical probe apparatus according to claim 1, wherein said single-mode optical fiber is covered with a fiber jacket, and said fiber jacket is processed in order to reduce abrasion.

6. An optical probe apparatus according to claim 1, wherein said single-mode optical fiber is covered with a fiber jacket, and said fiber jacket is processed in order to improve the rigidity thereof.

7. An optical probe apparatus producing a signal whose components interfere with each other, comprising:

a soft elongated insertion unit capable of being inserted into a subject;

a low coherent light source;

a light introduction block including a single-mode optical fiber over which low coherent light is irradiated from the distal end of said insertion unit to an object in said subject and over which light reflected from said object is detected;

a convergence block, incorporated in the distal part of said insertion unit, for converging light emitted from said optical fiber at said object and detecting light reflected from said object;

a scanning/irradiating unit for irradiating said low coherent light emitted from said singlemode optical fiber for the purpose of scanning; and an interference block for causing reflected light detected over said single-mode optical fiber and reference light supplied from said light source to interfere with each other, wherein said insertion unit has a sheath that is a thin tubular member;

said scanning/irradiating unit has said light convergence block, which is fused to the distal end of said single-mode optical fiber, and a reflecting surface formed as part of said convergence block enclosed in said sheath; and wherein a core of said single-mode optical fiber has expanded section at an end thereof.

* * * * *